United States Patent
Mizobata et al.

[11] Patent Number: 5,892,518
[45] Date of Patent: Apr. 6, 1999

[54] IMAGE GENERATING APPARATUS WITH PIXEL CALCULATION CIRCUIT INCLUDING TEXTURE MAPPING AND MOTION COMPENSATION

[75] Inventors: Norihiko Mizobata, Habikino; Takuya Sayama, Settsu, both of Japan

[73] Assignee: Matsushita Electric Industrial Co., Ltd., Kadoma, Japan

[21] Appl. No.: 687,892

[22] Filed: Jul. 26, 1996

[30] Foreign Application Priority Data

Jul. 28, 1995 [JP] Japan ............................ 7-193932

[51] Int. Cl.$^6$ ........................................ G06T 11/40
[52] U.S. Cl. .................................... 345/431; 345/430
[58] Field of Search ................................ 345/419, 429, 345/430, 431, 432, 433, 434

[56] References Cited

U.S. PATENT DOCUMENTS

| | | | |
|---|---|---|---|
| 5,412,765 | 5/1995 | Yamrom et al. | 345/430 |
| 5,469,535 | 11/1995 | Jarvis et al. | 345/430 |
| 5,485,558 | 1/1996 | Weise et al. | 345/431 |
| 5,659,672 | 8/1997 | Yutaka et al. | 345/430 |

FOREIGN PATENT DOCUMENTS 6162165   6/1994   Japan .

*Primary Examiner*—Cliff N. Vo
*Attorney, Agent, or Firm*—Renner, Otto, Boisselle & Sklar, P.L.L.

[57] ABSTRACT

An image generating apparatus of the present invention includes a pixel calculation circuit for performing a calculation by using two sets of image data, wherein the pixel calculation circuit performs a calculation for a motion compensation processing procedure by using pixel data of a reference image and pixel data of a differential image in the case where the motion compensation processing procedure is performed, and performs a calculation for a texture mapping processing procedure by using pixel data of a mapping image and pixel data in a polygon in the case where the texture mapping processing procedure is performed.

30 Claims, 47 Drawing Sheets

ADD FORWARD PREDICTION IMAGE TO DIFFERENTIAL DATA

D(x,y) + F(x,y) × γ (0.5) = G1(x,y)

$G1(X,Y) = D(x,y) + F(x,y) \times 0.5$

ADD BACKWARD PREDICTION IMAGE TO RESULT OF (b)

G1(x,y) + R(x,y) × γ (0.5) = G2(x,y)

$G2(X,Y) = \{D(x,y) + F(x,y) \times 0.5\} + R(x,y) \times 0.5$
$= \{F(x,y) + R(x,y)\}/2 + D(x,y)$

Fig. 38A

MOTION
VECTOR
Vx = 16.5
Vy = 21
SPECIFY
HORIZONTALLY
BY UNIT OF
HALF-PIXEL

Fig. 38B

MOTION
VECTOR
Vx = 16
Vy = 21.5
SPECIFY
VERTICALLY
BY UNIT OF
HALF-PIXEL

Fig. 38C

MOTION
VECTOR
Vx = 16.5
Vy = 21.5
SPECIFY VERTICALLY
AND HORIZONTALLY
BY UNIT OF
HALF-PIXEL

IMAGE GENERATING APPARATUS WITH PIXEL CALCULATION CIRCUIT INCLUDING TEXTURE MAPPING AND MOTION COMPENSATION

BACKGROUND OF THE INVENTION

1. Field of the Invention

The present invention relates to an image generating apparatus for generating computer graphics (hereinafter, referred to as "CG") and expanding a high efficient coded digital moving picture (hereinafter, referred to as "compressed moving picture expansion"). More specifically, the present invention relates to an image generating apparatus capable of both generating CG in real time by texture mapping and expanding a high efficiency coded digital moving picture by using inter-frame motion compensation, a moving picture expansion mapping apparatus using the image generating apparatus, and a multimedia apparatus.

2. Description of the Related Art

Recently, in order to generate CGs to be displayed on a CRT display and the like in home TV game equipment, personal computers and work stations, a method for mapping previously provided image data (hereinafter, referred to as a "texture image") to a polygonal region (hereinafter, referred to as a "polygon"), that is, a "texture mapping method" is employed. With the texture mapping method, even when a complex three-dimensional stereoscopic shape is approximately drawn with a small number of polygons, a relatively high quality image can be advantageously obtained.

On the other hand, in order to display moving picture data on a CRT display and the like in personal computers or audio-visual devices, a method for displaying previously compressed moving picture data in real time while displaying the moving picture data is desired. By using the compressed moving picture data, both the capacitance of a storage medium and the amount of transmitted data can be reduced.

In order to effectively compress the moving picture data, a method is used for coding only the differential data of the image data over a plurality of frames, that is, a so-called inter-frame prediction coding is employed. The inter-frame prediction coding includes "forward prediction coding", "backward prediction coding" and "bidirectional prediction coding". These methods use respectively different combinations of images to obtain the differential data.

In a sequence of input images, an image to be compressed is referred to as an "input image", an image input prior to the input image is referred to as a "past image", and an image input after the input image is referred to as a "future image". In the forward prediction coding, the differential data between the input image and the past image is coded. In the backward prediction coding, the differential data between the input image and the future image is coded. In the bidirectional prediction coding, the differential data is coded by using the past image and the future image. Hereinafter, the past image and the future image are collectively referred to as a reference image.

Furthermore, a motion compression processing procedure is performed in order to increase compressibility. In the motion compression processing procedure, a difference at the same position in the image is calculated in order to obtain the differential data. Simultaneously, an input image is divided into image blocks having the same size (for example, 16×16 pixels), and the position at which the difference becomes minimum is obtained for each block while horizontally and vertically shifting the position within a corresponding reference image. Then, the block position, at which the minimum difference is established, and the differential data are coded. In this method, in order to obtain the maximum compressibility, the coding is performed while suitably selecting any one of a "forward prediction", "backward prediction" and "bidirectional prediction", or "no prediction" type of motion prediction code. In some cases, the position of the reference image block is obtained not only with one pixel precision, but also with half-pixel precision.

Recently, in the texture mapping method, a method using a compression coded moving picture as a previously prepared texture image, that is, a method for mapping an expanded moving picture on a polygon has been employed. An example of a conventional image generating apparatus for realizing this texture mapping method is disclosed in Japanese Laid-Open Patent Publication No. 6-162165.

The method disclosed in the above patent publication provides an image processing procedure method in which a moving picture can be used as a texture image instead of a conventionally used static image such as a geometrical pattern, a photograph or a handwritten drawing. As a result, CG images of great variety now can be generated. The conventional image generating apparatus includes: data reproduction means for reproducing the compressed moving picture data from an information storage medium; image data expansion means for expanding the compressed moving picture data reproduced from the data reproduction means; and image synthesis means for receiving the expanded image data from the image data expansion means via a bus line and for synthesizing the image data.

With the configuration of the aforementioned conventional example, however, the following problems arise.

First, the configuration of a conventional image generating apparatus will be described with reference to FIG. 27. In FIG. 27, a system bus 2401 serves as a medium for the transmission of data between blocks. A CPU 2402 controls the entire system. A main memory 2403 stores programs and data. An image expansion circuit 2404 decompresses the compressed moving picture data. A CD-ROM decoder 2405 reproduces the data from a CD-ROM 2409 serving as an information storage medium for the image data for the image data or the like. An image synthesis circuit 2406 synthesizes the expanded moving picture data by a texture mapping processing procedure and stores the data to a frame memory 2410. A coordinate transform circuit 2407 obtains coordinates for image synthesis. A DMA controller 2408 transforms the data on the system bus. A frame memory 2410 provides a work memory for image synthesis. A DA converter 2412 performs DA conversion on a signal for displaying the result of image synthesis.

Next, the operation of the image generating apparatus will be described. The compressed moving picture data stored in the CD-ROM 2409 is read out by the CD-ROM decoder 2405 and reproduced. The reproduced compressed moving picture data is transferred to the image expansion circuit 2404 via the system bus 2401. The image expansion circuit 2404 decompresses the compressed moving picture data. The expanded moving picture data is transmitted to the image synthesis circuit 2406 via the system bus 2401. At the same time, coordinates of a plotted image are obtained through the CPU 2402 and the coordinate transform circuit 2407, and are specified to the image synthesis circuit 2406 via the system bus 2401. The image synthesis circuit 2406 synthesizes the moving picture data through texture mapping and the synthesized data is transmitted from the image expansion circuit 2404 onto the coordinates on the frame memory 2410 as directed by the CPU 2402. The synthesized image in the frame memory 2410 is read out by the image synthesis circuit 2406, and is then transmitted to the DA converter 2412. The digital signal is converted by the DA converter 2412 to an analog signal, and an analog signal is output.

FIG. 40 shows an inner configuration of the image expansion circuit 2404 shown in FIG. 27. Hereinafter, the operation of motion compensation processing procedure will be described with reference to FIG. 40.

The compressed moving picture data read out from a CD-ROM decoder is input to the image expansion circuit 2404 via the system bus 2401, as a unit of an image block consisting of 16×16 pixels, for example. The compressed image block data input to the image expansion circuit 2404 through a local bus 3014 is first transformed to an orthogonal transform coefficient image 3002 by a variable-length inverse coding circuit 3001. Subsequently, the orthogonal transform coefficient image 3002 is transformed into a differential image block by an orthogonal transform circuit 3003, said orthogonal transform coefficient image 3002 is in turn stored in a differential image memory 3004. The compressed image block data to be input to the image expansion circuit 2404 includes not only a differential image component but also motion compensation data required for decoding the image block. The motion compensation data corresponds to data indicating the type of motion prediction (i.e., any one of "forward prediction", "backward prediction", "bidirectional prediction" and "no prediction coding") used to code the image block, and the data indicating the type of the position of a reference image block used for the prediction. Based on the contents of the motion compensation data, the motion compensation processing procedure is subsequently performed in a motion compensation circuit 3013. The image block at the position corresponding to the data indicating the position of the reference image block is read out from a reference image memory 3012 via image reading circuits 3007 and 3008. For example, in the case where the image block to be transformed is a block coded by forward prediction, an image block read out from a past image memory 3005 is selected by an average/selection circuit 3009, and is input to an addition circuit 3010. The addition circuit 3010 adds the past image block data and the differential image block data, and the result is written to a generated image memory 3011. In the case where the image block to be transformed is an image block coded by backward prediction, an image block read out from a future image memory 3006 is selected and added to a differential image block. In the case where the image block to be transformed is an image block coded by bidirectional prediction, the average/selection circuit 3009 takes an average of the image block read out from the past image memory 3005 and the image block read out from the future image memory 3006 for each pixel. The result is transmitted to the addition circuit 3010 which adds the result to a differential image block. The result of the addition is stored in the generated image memory 3011. In the case where the data indicating the position of the reference image block is given with half-pixel precision, the image block reading circuits 3007 and 3008 have a reading function corresponding to half-pixel precision, for example, a function of reading out an image block while calculating an average of adjacent two pixels. The expanded moving picture data stored in the generated image memory 3011 is transmitted to the image synthesis circuit 2406 via the system bus 2401. The contents of the generated image memory 3011 are also transmitted to the past image memory 3005 or the future image memory 3006 in the reference image memory 3012 so as to be used for subsequent moving picture expansion. The inner configuration of the conventional image expansion circuit and the operation of motion compensation processing procedure are as described above.

Next, the operation of conventional texture mapping processing procedure performed in the image synthesis circuit 2406 and the frame memory 2410 shown in FIG. 27 will be described with reference to FIG. 41.

The moving picture data transmitted to the image synthesis circuit 2406 is temporarily stored in the frame memory 2410 as texture image data 3101 in the case where the image synthesis circuit 2406 performs the texture mapping operation. Then, the texture image 3101 is read out and transformed by the image synthesis circuit 2406, and is stored (mapped) in the region of a generated image 3102. One pixel 3104 in the texture image 3101 is input to a first multiplication circuit 3107 in the texture mapping circuit 3106. Simultaneously, a pixel 3105 in the generated image region 3102, to which the pixel 3104 is mapped, is input to a second multiplication circuit 3108. The first multiplication circuit 3107 multiplies the pixel 3104 by a multiplier α (where α is a numerical value equal to or larger than 0 and equal to or smaller than 1), while the second multiplication circuit 3108 multiplies the pixel 3105 by a multiplier (1−α). The results of these multiplications are input to an addition circuit 3109, which adds the input values. The result of the addition is stored at the position of the pixel 3105 in the generated image 3102. By sequentially performing the aforementioned operation for all of the pixels in the texture image, the texture mapping processing procedure of an original image in the generated image (which is generally a background image) and a texture image along with semi-transparent synthesis can be realized. The operation of texture mapping processing procedure performed in a conventional image synthesis circuit is as described above.

In the image generating apparatus having the configuration as described above, the compressed moving picture data is transmitted to the image expansion circuit 2404 via the system bus 2401 so as to decompress the moving picture. Then, the expanded moving picture data is transmitted to the image synthesis circuit 2406 via the system bus 2401. The amount of expanded moving picture data is generally extremely large (in the case of a moving picture including 320×240 pixels, about 7 MB/second), and therefore applies a large load on the data transmission ability of the system bus 2401. In addition, in the case where the moving picture is compressed with high efficiency, the inter-frame motion prediction technique is often used. In order to decompress the moving picture compressed based on this technique, it is necessary for the image generating apparatus to include the frame memory. More specifically, if the image expansion circuit 2404 and the image synthesis circuit 2406 are separately provided, a frame memory for image expansion processing procedure and the frame memory 2410 for plotting the image should be also separately provided. Moreover, since the image expansion circuit 2404 and the image synthesis circuit 2406 are connected to each other via the system bus 2401, control such as timing control of the data transmission is complicated. As a result, the system configuration will be complicated.

As described above, the conventional image generator has a number of problems.

SUMMARY OF THE INVENTION

The image generating apparatus of the present invention includes a pixel calculation circuit for performing a calculation by using two sets of image data, wherein the pixel calculation circuit performs a calculation for a motion compensation processing procedure by using pixel data of a reference image and pixel data of a differential image in the case where the motion compensation processing procedure is performed, and performs a calculation for a texture mapping processing procedure by using pixel data of a mapping image and pixel data in a polygon in the case where the texture mapping processing procedure is performed.

According to another aspect of the invention, an image generating apparatus includes: a pixel position specifying circuit for receiving a command signal indicating at least one of a motion compensation processing procedure and a texture mapping processing procedure and for outputting a signal indicating a first pixel position, a signal indicating a second pixel position and a signal indicating a third pixel position, in accordance with the command signal, the first pixel position being a position of a pixel in a reference image block, the second pixel position being a position of a pixel in a generated image block, and the third pixel position being a position of a pixel in a differential image block when the command signal indicates the motion compensation processing procedure, the first pixel position and the second pixel position being positions of pixels in a polygon which is subjected to mapping, and the third pixel position being a position of a pixel in a texture image when the command signal indicates the texture mapping procedure; an image memory access section for outputting a pixel value of the first pixel position as first pixel data in response to a signal indicating the first pixel position, for outputting a pixel value of the third pixel position as third pixel data in response to a signal indicating the third pixel position, and for writing the second pixel data to the second pixel position in response to a signal indicating the second pixel position and second pixel data; and a pixel calculation circuit for performing a calculation between the first pixel data and the third pixel data to output a result of the calculation as the second pixel data.

According to still another aspect of the present invention, an image generating apparatus includes: a control circuit for outputting a command signal indicating a process to be performed in the image generating apparatus; a pixel position specifying circuit, in response to the command signal, for calculating a pixel position in a reference image block for motion compensation to output the pixel position as a first pixel position signal, calculating a pixel position in a generated image block to output the pixel position as a second pixel position signal, and calculating a pixel position in a differential image block which is difference data between the reference image block and the generated image block to output the pixel position as a third pixel position signal in the case where the command signal indicates a motion compensation processing procedure, the pixel position specifying circuit, in response to the command signal, for calculating a pixel position in a texture image to output the pixel position as the third pixel position signal, and calculating a pixel position in a generated polygon to which pixel data at the pixel position indicated by the third pixel position is mapped and written so as to output the pixel position as the first pixel position signal and the second pixel position signal in the case where the command signal indicates a texture mapping processing procedure, the pixel position specifying circuit, in response to the command signal, for newly determining positions of the differential image block, the generated image block and the differential image block or positions of the generated polygon and the texture image in the case where the command signal indicates an image block deter- mination processing procedure and an image block position; an image memory access section, in response to the first pixel position signal, the second pixel position signal and the third pixel position signal, for reading out pixel data from the pixel position indicated by the first pixel position signal to output the pixel data as a first pixel data signal, for reading out pixel data from the pixel position indicated by the third pixel position signal to output the pixel data as a third pixel data signal, and for writing pixel data input by a second pixel data signal to the pixel position indicated by the second pixel position signal; and a pixel calculation circuit, with respect to the pixel data indicated by the input first pixel data signal and the input third pixel data signal, for performing a calculation indicated by the command signal for the pixel data as data with code by a unit of a pixel in the case where the command signal indicates a motion compensation processing procedure, and for performing a calculation indicated by the command signal for the pixel data as data without code by a unit of a pixel in the case where the command signal indicates a texture mapping processing procedure, and for outputting a result of the calculation as the second pixel data signal, wherein the control circuit receives and interprets a control command for image generation operation to indicate contents of processing procedure to the pixel position specifying circuit and the pixel calculation circuit.

According to still another aspect of the invention, a moving picture expansion mapping apparatus includes: a variable-length inverse coding section for performing a variable-length inverse coding processing procedure for a compressed image block obtained by orthogonally transforming and variable-length coding a differential image block obtained by a difference with a reference image block by motion prediction; an orthogonal transform section for receiving and orthogonally transforming a result of the variable-length inverse coding processing procedure; and an image generating apparatus according to claim 1 for receiving a result of the orthogonal transform section, performing a motion compensation processing procedure, and performing a texture mapping processing procedure by using image data obtained by the motion compensation processing procedure, thereby simultaneously implementing an expansion processing procedure and a texture mapping processing procedure for compressed moving picture data.

According to still another aspect of the invention, a multimedia apparatus includes: a CPU; a main memory; a moving picture expansion mapping apparatus according to claim 29; and a frame memory, wherein the frame memory is connected to the moving picture expansion mapping device, stores at least a reference image and a generated image, and expands compressed moving picture data while texture mapping an image obtained by expansion to a surface of a three-dimensional object.

The present invention is achieved so as to solve problems of conventional techniques such as a large amount of memory required for processing procedure, a large amount of data to be transmitted from a motion compensation processing procedure device to a texture mapping processing procedure device or the like. The problems can be solved by performing the moving picture expansion processing procedure using motion compensation and the texture mapping processing procedure with a single memory and with a single processing procedure device.

By devising a processing procedure of motion compensation, a procedure of memory access, and a method for locating the data in a memory, the present invention enables the motion compensation processing procedure with a device for performing the texture mapping and with a device having a configuration similar to that of the memory configuration. As a result, it is possible to perform both texture mapping and motion compensation with a single image generating apparatus and with a single image memory.

In a basic texture mapping processing procedure device, the texture image which is rectangular image data and the generated image which is currently generated. The image data in a texture image corresponding to the image data constituting a polygon in the generated image and the image data which is previously plotted in the generated image are read out from the image memory. Then, the previously plotted image data and the texture image data are subjected to a weighted addition, and the result is written to the image memory as a generated image.

In consideration of the problems of the operation procedure of the texture mapping processing procedure described above, a processing procedure of motion compensation processing procedure as described below has been devised.

A reference image and a differential image for motion compensation processing procedure are stored in the image memory. The image data in the reference image is read out simultaneously with the image data in the differential image. After the reference image data is multiplied by a coefficient as needed, the resultant is added to the differential image data. Then, the resultant of the addition is written to the generated image in the image memory. By performing the processing procedure in this manner, the motion compensation processing procedure can be performed with a device having a similar configuration to that of a texture mapping processing procedure device.

Furthermore, in the motion compensation processing procedure, the bidirectional motion compensation processing procedure may be performed by using two reference images, i.e., a future image and a past image, or the position of a reference image may be specified with half-pixel precision.

In the present invention, the bidirectional motion compensation processing procedure is performed in a procedure as described above by using one of two reference images and a differential image so as to write the result to the image memory again. Then, the written image is regarded as a differential image, and similar motion compensation processing procedure is performed between this differential image and the other reference image, thereby completing the bidirectional motion compensation processing procedure. At this point in time, by setting a coefficient multiplying the reference image data at 0.5, the bidirectional motion compensation processing procedure can be performed precisely.

In the case where the position of a reference image is specified with half-pixel precision, a reference image is read out from the position shifted by a half pixel from the specified position of the reference image with half-pixel precision. Then, differential image data is added to the image data, and the resultant of the addition is written to the image memory again, thereby completing the motion compensation processing procedure. Furthermore, the resultant of the motion compensation processing procedure is used as a new differential image. The position of the reference image is shifted by one pixel, and the image data is read out from the reference image. In such a manner, the motion compensation processing procedure is repeated. By repeating the motion compensation processing procedure for the reference image shifted by a half pixel vertically and horizontally (or either vertically or horizontally) from the position of the reference image specified with half-pixel precision while controlling a coefficient multiplying the reference image data, it is possible to simultaneously obtain a reference image at the position specified with half-pixel precision by averaging the reference image data positioned above, below and on the right and left and to perform the motion compensation processing procedure based on the reference image and a differential image.

As described above, a new processing procedure method is devised. In this processing procedure method, the motion compensation processing procedure is realized by weighted addition of a reference image and a differential image, writing the resultant to a memory and repeating this processing procedure as described above. As a result, the motion compensation processing procedure can be realized by a processing procedure similar to the texture mapping, a memory access procedure, and a method for placing the data in a memory.

Accordingly, the motion compensation processing procedure and the texture mapping processing procedure can be realized with a single image processing procedure device and a single memory. Thus, it is possible to remarkably reduce the area of a circuit of a processing procedure device, the amount of memory, and the amount of data transferred between memories as compared with a processing procedure device and a memory for both motion compensation and for texture mapping.

In addition, the motion compensation processing procedure and the texture mapping processing procedure, which should be sequentially performed in a conventional method, can be performed simultaneously.

Thus, the invention described herein makes possible the advantages of providing an image generating apparatus for expanding a digital moving picture which is coded by using inter-frame motion prediction and for generating CG images by texture mapping so as to simplify the configuration, reduce a circuit area of a processing procedure device, reduce the amount of memory required for processing procedure and reduce the amount of transmitted data by omitting the moving picture data transmission between memories.

This and other advantages of the present invention will become apparent to those skilled in the art upon reading and understanding the following detailed description with reference to the accompanying figures.

BRIEF DESCRIPTION OF THE DRAWINGS

FIG. 38A to FIG. 38C are diagrams showing a prediction image block in the case where the value of a motion vector is given in a unit of a half pixel.

DESCRIPTION OF THE PREFERRED EMBODIMENTS

Figure 1:
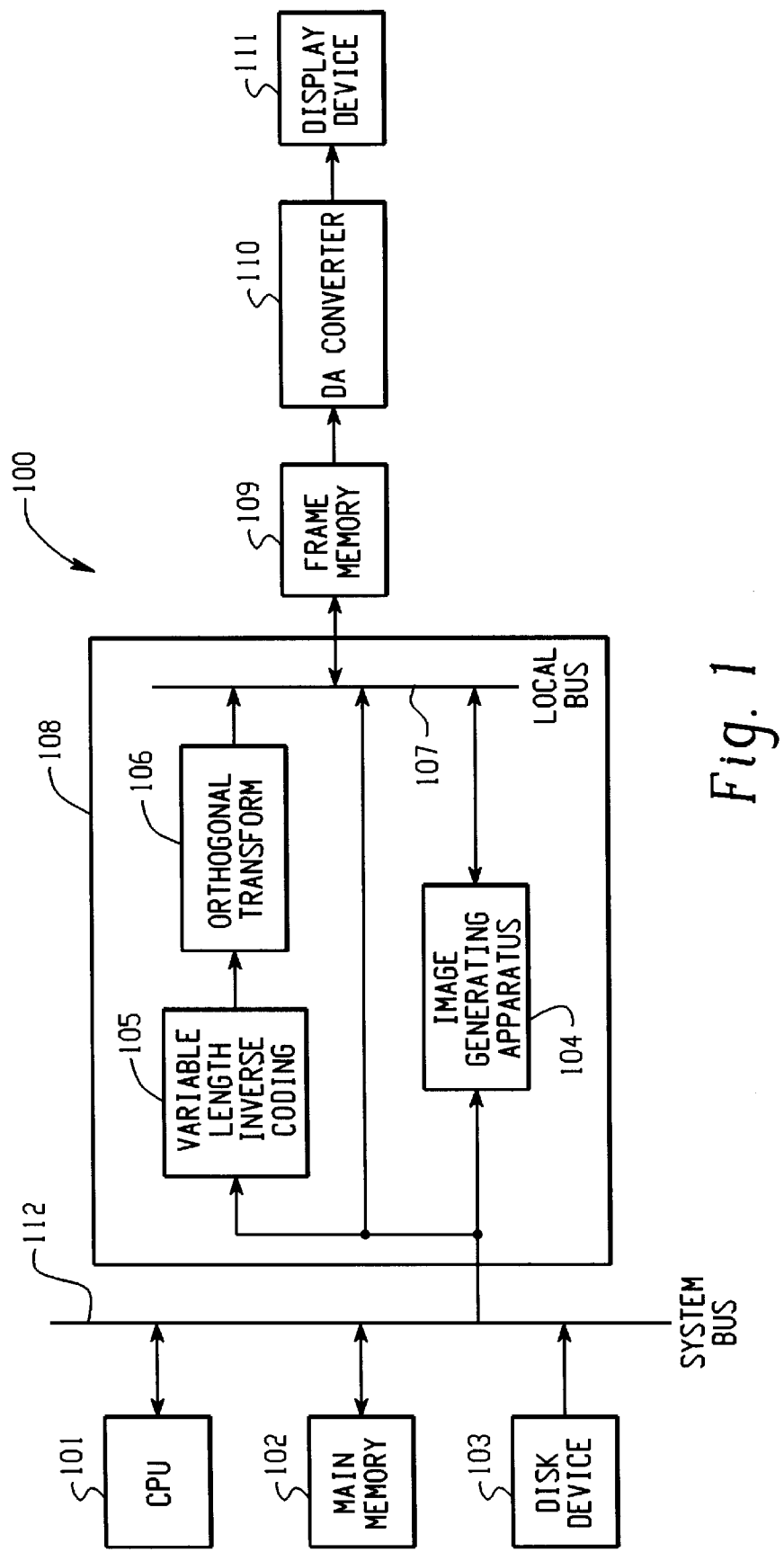
FIG. 1 is a diagram showing the configuration of a multimedia apparatus of Example 1 according to the present invention.

Hereinafter, the function of the present invention will be described.

According to the present invention, with the configuration as described above, it is possible to execute an expansion processing procedure of a digital moving picture compressed by using motion compensation and to execute a texture mapping processing procedure to a polygon in CG creation in a single device. Furthermore, by simultaneously performing the moving picture expansion processing procedure and the texture mapping processing procedure, it is possible to map a moving picture expanded by the moving picture expansion processing procedure to a polygon as a texture image for texture mapping.

In expansion of an image by motion compensation prediction, a block similar to a block region in an image being compressed is retrieved from blocks in a past image (hereinafter referred to as a past image block). Then a difference between the past image block and the image block being compressed is obtained, thereby executing the compression. Alternatively, a block similar to a block region in an image being compressed is retrieved from blocks in a future image (hereinafter, referred to as a future image block). Then, a difference between the future image block and the image block being compressed is obtained, thereby executing the compression. Furthermore, the position of the past image block or the future image block in the image may be specified with half-pixel precision.

The thus compressed image is expanded by selecting a reference image block (a past image block or a future image block) serving as a reference of motion compensation from a past image or a future image, and then adding difference image data (hereinafter, referred to as a differential image block) between the image block in the image being reproduced (hereinafter, referred to as a generated image block) and a reference image block to the reference image block. By similarly performing the processing procedure for all of the blocks constituting the entire image, the expansion processing procedure is executed. Such an expansion processing procedure is referred to as a motion compensation processing procedure. As a reference image, the motion prediction processing procedure for compression coding uses a past image, a future image, and both past image and future image, or no reference image. In some cases, an optimal type of prediction is selected for each block to be subjected to motion prediction. It is necessary to change the type of motion compensation for each image block processed in the motion compensation processing procedure so as to correspond to the selected prediction method.

In the following description, the term "forward motion compensation" refers to an expansion processing procedure started with a past image block, the term "backward motion compensation" refers to an expansion processing procedure started with a future image block, the term "unidirectional motion compensation" refers to an expansion processing procedure started with either a future image block or a past image block, and the term "bidirectional motion compensation" refers to an expansion processing procedure using a past image block and a future image block. Pixel data within the past image block is represented by P(x, y), pixel data within the future image block is represented by F(x, y), pixel data within the reference image block is represented by R(x, y), pixel data within the differential image block is represented by D (x, y), and pixel data within the generated image block is represented by G(x, y). Herein, x and y represent a pixel position within the image block.

On the other hand, in the texture mapping processing procedure, a plotted pixel position within a generated image and a reference pixel position within a texture image are obtained based on vertex coordinate information of a polygon so as to read out the pixel data at the reference pixel position within the texture image. Then, the pixel data is written to the plotted picture pixel position within the generated image. By similarly performing the texture mapping processing procedure for all of the polygons constituting a screen, an image over the entire screen is generated.

Furthermore, motion compensation is performed for one image block. Then a texture mapping processing procedure is performed by using a subsequently generated image block as a texture image. In this manner, it is possible to simultaneously execute the expansion processing procedure and the texture mapping processing procedure of moving pictures. In the present invention, it is possible to simultaneously perform the motion compensation and the texture mapping.

An image generating apparatus according to the present invention includes pixel calculation means for performing a calculation using two image data. The pixel calculation means calculates different image data in accordance with the contents to be processed. More specifically, in the case where the motion compensation processing procedure is performed, a calculation for the motion compensation is performed using the image data of the reference image and the image data of the differential image. In the case where the texture mapping processing procedure is performed, a calculation for the texture mapping is performed using the image data of the texture image and the image data within the polygon. In this manner, the image generating apparatus according to the present invention can perform both motion compensation and texture mapping. As a result, the size of the circuit can be reduced. In addition, since the data transmission which is required in the conventional image generating apparatus is not necessary in the present invention, the amount of memory required for processing can be reduced.

Hereinafter, each of the processing procedures in a basic image generating apparatus according to the present invention will be described in detail. Thereafter, the processing procedure and features of another image generating apparatus of the present invention, and the operation of a moving picture expansion mapping device and a system using these image generating apparatuses will be described.

First, the motion compensation processing procedure of a basic image generating apparatus will be described.

The forward motion compensation processing procedure or the backward motion compensation processing procedure, i.e., the unidirectional motion compensation processing procedure is performed as described below.

The image data G(x, y) of the image block generated by the unidirectional motion compensation is obtained by adding the image data D(x, y) of the differential image block and the image data R (x, y) of the reference image block with the reference image serving as a reference of motion prediction as expressed by the following Equation 1.

$$G(x, y) = R(x, y) + D(x, y) \qquad \text{[Equation 1]}$$

The reference image and the differential image are stored in the image memory. The pixel data in the differential image block of the differential image is sequentially specified by the pixel position specifying means. The pixel data then is read out by the image memory access means to be input to the pixel calculation means. A reference image block, which serves as a reference for the motion prediction of the currently generated image block is selected from the reference image. Then the pixel data within the reference image block is sequentially by the pixel position specified means to be read out by the image memory access means and is input to the pixel calculation means. The pixel calculation means adds two input pixel data. The result of the calculation is sequentially written to the pixel position in the generated image block within the image memory, which is specified by the pixel position specifying means via the image memory access means. By performing the calculation expressed by Equation 1 in this manner, the unidirectional motion compensation processing procedure, that is, the forward direction motion compensation processing procedure or the backward direction motion compensation processing procedure is performed.

Next, bidirectional motion compensation will be described.

The bidirectional motion compensation can be performed by obtaining the average of the result of forward motion compensation and the result of backward motion compensation. The average can be obtained by the following Equation 2.

$$G(x, y) = \{(P(x, y)+D(x,y))+(F(x, y)+D(x,y))\}/2 \qquad \text{[Equation 2]}$$

In the present invention, the calculation expressed by Equation 2 is reduced to the following Equation 3. Thus, processing is performed in accordance with Equation 3.

$$G(x, y) = (P(x, y)/2+D(x,y))+F(x, y)/2 \qquad \text{[Equation 3]}$$

Specifically, half of the pixel data of the past image block is added to the differential image block. Then, half of the pixel data of the future image block is added to this result, thereby completing the bidirectional motion compensation processing procedure.

The image memory stores the past image, the future image and the differential image as the reference images of motion compensation. The pixel data within the differential image block of the differential image is sequentially specified by the pixel position specifying means to be read out by the image memory access means, and is input to the pixel calculation means. The input pixel data is represented by D (x, y). The past image block serving as a reference of the motion prediction of the currently generated image block is selected from the past image. The pixel data within the past image block is sequentially indicated by the pixel position specifying means to be read out by the image memory access means, and is input to the pixel calculation means. The input pixel data is represented by P (x, y). The pixel calculation means calculates: P (x, y)/2+D(x, y). The result of this calculation is sequentially written to the pixel position as directed by the pixel position specifying means in the obtained image block within the image memory via the image memory access means.

When one processing procedure within the generated image block is completed, the currently generated image block is regarded as a reference image block. The pixel data within the difference image block is sequentially indicated by the pixel position specifying means to be read out by the image memory access means, and is input to the pixel calculation means. The input pixel data is represented by P (x, y)/2+D(x, y). A future image block serving as a reference of the motion prediction of a currently generated image block is selected from the future image. The pixel data within the future image block is sequentially indicated by the pixel position specifying means to be read out by the image memory access means and is input to the pixel calculation means. The input pixel data is represented by F (x,y). The pixel calculation means calculates {P(x, y)/2+D (x,y)}+F (x, y)/2. The result of this calculation is sequentially written to the pixel position specified by the pixel position specifying means in the generated image block within the image memory via the image memory access means. By performing the calculation expressed by Equation 3 in the aforementioned manner, the bidirectional motion compensation processing procedure is completed.

Next, the motion compensation processing procedure with half pixel precision will be described. In some cases of motion compensation with half pixel precision, the specified position of the reference image block is shifted by a half pixel from the position where the pixel actually is located. In such a case, an interpolation calculation is performed based on image blocks vertically and horizontally shifted by a half pixel from the specified reference image block position so as to obtain the specified reference image block. The motion compensation processing procedure is performed by using the thus obtained specified reference image block as a reference.

The operation of the unidirectional motion compensation processing procedure with half pixel precision will be described. If the reference image block R(x,y) is specified to the position horizontally shifted by a half pixel from the position where the pixel is actually present, a reference image block R (x, y) is obtained from a reference image block which is on the "left" of the specified position at a distance of a half pixel (represented by R0 (x, y)) and a reference image block which is on the "right" of the specified position at a distance of a half pixel (represented by R1 (x, y)) based on the following Equation 4.

$$R(x, y) = (R0(x, y)+R1 (x, y))/2 \qquad \text{[Equation 4]}$$

In the case where the reference image block R (x, y) is specified to the position vertically shifted by a half pixel from the position where the pixel is actually located, a reference image block R (x, y) is obtained from a reference image block which is "above" the specified position at a distance of a half pixel (represented by R0 (x, y)) and a reference image block which is "below" the specified position at a distance of a half pixel (represented by R2 (x, y)) based on the following Equation 5.

$$R(x, y) = (R0(x, y)+R2(x, y))/2 \qquad \text{[Equation 5]}$$

In the case where the reference image block R (x, y) is specified to the position both vertically and horizontally shifted by a half pixel from the position where the pixel is actually present, a reference image block R (x, y) is obtained from a reference image block which is on the "upper left" of the specified position at a distance of a half pixel (represented by R0 (x, y)), from a reference image block which is on the "upper right" of the specified position at a distance of a half pixel (represented by R1 (x, y)), from a reference image block which is on the "lower left" of the specified position at a distance of a half pixel (represented by R2 (x, y)), and from a reference image block which is on the "lower right" of the specified position at a distance of a half pixel (represented by R3 (x, y)) in accordance with the following Equation 6.

$$R(x, y)=(R0(x, y)+R1(x, y)+R2(x, y)+R3(x, y))/4 \quad \text{[Equation 6]}$$

The motion compensation with half pixel precision is performed in a processing procedure of the aforementioned unidirectional motion compensation or bidirectional motion compensation based on the thus obtained image data of the reference image block and image data of the motion compensation differential image block.

More specifically, the unidirectional motion compensation is calculated in accordance with Equation 7.

In the case where the specified position is horizontally shifted by a half pixel:

$$G(x, y)=(R0(x,y)+R1(x,y))/2+D(x,y)$$

In the case where the specified position is vertically shifted by a half pixel:

$$G(x, y)=(R0(x,y)+R2(x,y))/2+D(x,y)$$

In the case where the specified position is both horizontally and vertically shifted by a half pixel:

$$G(x, y)=(R0(x,y)+R1(x,y)+R2(x,y)+R3(x,y))/4+D(x,y) \quad \text{[Equation 7]}$$

In another configuration of the present invention, processing is performed by using Equation 8 which is obtained by reducing Equation 7.

In the case where the specified position is horizontally shifted by a half pixel:

$$G(x, y)=(R0(x,y)/2+D(x,y))+R1(x,y)/2$$

In the case where the specified position is vertically shifted by a half pixel:

$$G(x, y)=(R0(x,y)/2+D(x,y))+R2(x,y)/2$$

In the case where the specified position is both horizontally and vertically shifted by a half pixel:

$$G(x, y)=[\{(R0(x,y)/4+D(x,y))+R1(x,y)/4\}+R2(x,y)/4]+R3(x,y)/4 \quad \text{[Equation 8]}$$

In the case where the specified position is either horizontally or vertically shifted by a half pixel, a processing procedure similar to that of the bidirectional motion compensation is performed, as can be understood from the comparison with Equation 3.

The image memory stores the reference image and the differential image for motion compensation. The image data in a differential image block within the differential image is sequentially specified by the pixel position specifying means to be read out by the image memory access means, and is input to the pixel calculation means. The input pixel data is represented by D (x, y). The pixel data R0 (x,y) shifted by a half pixel from the specified position is sequentially specified by the pixel position specifying means to be read out by the image memory access means, and is input to the pixel calculation means. The pixel calculation means calculates R0 (x, y)/2+D (x, y). The result of this calculation is sequentially written to the pixel position specified by the pixel position specifying means in the generated image block within the image memory via the image memory access means. When the processing procedure in one generated image block is completed, the currently generated image block is regarded as a differential image block.

The pixel data in this differential image block is sequentially specified by the pixel position specifying means, and is read by the image memory access means to be input to the pixel calculation means. The input pixel data is represented by R0 (x,y)/2+D (x, y). Again from the reference image, the pixel data R1 (x, y) or R2 (x, y) is sequentially specified by the pixel position specifying means, and is read out by the image memory access means to be input to the pixel calculation means. The pixel calculation means calculates: {R0 (x,y)/2+D (x,y)}+R1 (x,y)/2 or {R0 (x,y)/2+D (x,y)}+R2 (x,y)/2. The result of this calculation is sequentially written to the pixel position specified by the pixel position specifying means in the generated image block within the image memory via the image memory access means. In the manner as described above, the pixel data G (x, y) can be obtained.

In the case where the specified position is both vertically and horizontally shifted by a half pixel, the following procedure is performed.

The image memory stores the reference image and the differential image for motion compensation. The pixel data D (x, y) within the differential image block of the differential image is sequentially read out, and is input to the pixel calculation means. From the reference image block, the pixel data R0 (x, y) within the reference image block, which is shifted by a half pixel from the specified position, is input to the pixel calculation means. The pixel calculation means calculates R0 (x, y)/4+D (x, y). The result of this calculation is written to the generated image block in the image memory. When processing in one generated image block is completed, the currently generated image block is regarded as a differential image block.

Then, the pixel data R0(x,y)/4+D(x, y) in the differential image block is sequentially read out so as to be input to the pixel calculation means. From the reference image, the pixel data R1(x, y) is sequentially read out, and is input to the pixel calculation means. The pixel calculation means calculates (R0 (x, y)/4+D(x, y))+R1 (x, y)/4. The result of this calculation is written to the generated image block in the image memory. The currently obtained image block is regarded as a differential image block. The pixel data (R0 (x, y)/4+D (x, y))+R1 (x, y)/4 is sequentially read out, and is input to the pixel calculation means. From the reference image, the pixel data R2(x,y) is sequentially read out, and is input to the pixel calculation means. The pixel calculation means calculates {(R0 (x, y)/4+D (x, y))+R1 (x, y)/4}+R2 (x, y)/4. The result of this calculation is written to the generated image block in the image memory. Furthermore, the currently obtained image block is regarded as a differential image block. The pixel data {(R0 (x, y)/4+D (x, y))+R1 (x, y)/4}+R2 (x, y)/4 within the differential image block is sequentially read, and is input to the pixel calculation means. From the reference image, the pixel data of R3 (x, y) is sequentially read out, and is input to the pixel calculation means. The calculation means calculates [{(R0 (x, y)/4+D (x, y))+R1 (x, y)/4}+R2 (x, y)/4]+R3 (x, y)/4. The result of this calculation is written to the generated image block in the image memory. In this manner, the pixel data G (x, y) of the generated image block can be obtained.

In order to perform the bidirectional motion compensation with half pixel precision, it is necessary to obtain the average of the half-pixel precision forward motion compensation and the half-pixel precision backward motion compensation by the aforementioned method.

Although many situations can be expected in consideration of the different specified positions of the past image block and the future image block, a processing procedure similar to the unidirectional motion compensation is basically sufficient to obtain the result as described above. The pixel data of the image block, which is shifted by a half pixel from the specified pixel position of the reference image block, is multiplied by a multiplication coefficient in accordance with a ratio of the interpolation calculation. Then, the result of the multiplication is added to the differential image data. The result of the calculation is written as a generated image block. Then, the generated image block is regarded as a new differential image block. Another reference image block is added to the new differential image block, which is then written to the generated image block. This procedure is repeated.

Hereinafter, the texture mapping procedure of the basic image generating apparatus according to the present invention will be described.

The image memory stores a texture image. Based on coordinates of a vertex of a polygon which is subjected to texture mapping, a reference pixel position within the texture image and a plotted pixel position in a generated polygon within a generated image are obtained by the pixel position specifying means. The pixel data at the selected pixel position is read out based on the reference pixel position in the texture image via the image memory access means, and is supplied to the pixel calculation means. The pixel calculation means outputs the input pixel data as the result of a calculation without any change. The result of the calculation is written to the plotted pixel position in the generated polygon, which is specified by the pixel position specifying means, via the image memory access means. By performing this processing procedure for all of the pixels in the generated polygon, the texture mapping processing procedure is executed.

Furthermore, the pixel data in the generated polygon read out from the image memory is input to the pixel calculation means. Then, by performing a pixel calculation between the pixel data in a generated polygon and the texture pixel data read out from the texture image, it is possible to execute a texture mapping processing procedure of a semi-transparent texture image and an anti-aliasing processing procedure of a polygon edge in the texture mapping processing procedure.

Next, a texture mapping processing procedure of a semi-transparent texture image will be described in detail.

It is assumed that a semi-transparency of the texture image is $\alpha$, a value of the pixel data which is previously written to the plot pixel position of a generated polygon is A, and a value of the pixel data of the texture image which is to be subjected to mapping is B. A pixel position of the pixel data A which is previously written to the plotted image pixel position is specified by the pixel position specifying means. Then, the pixel data A is read out via the image memory access means. Then, the pixel data A is input to the pixel calculation means. A pixel position of the pixel data B of the texture image is specified by the pixel position specifying means. Then, the pixel data B is read out via the image memory access means. The pixel data B is input to the pixel calculation means. The pixel calculation means calculates: $\alpha \times A + (1-\alpha) \times B$. The pixel data obtained from the result of this calculation is written to the plotted image pixel position in a generated polygon, which is specified by the pixel position specifying means, via the image memory access means. In this way, the texture mapping of the semi-transparent texture image can be performed.

In order to perform anti-aliasing of the polygon edge, it is sufficient to perform a process similar to that of a semi-transparent texture image, however, only for the pixels constituting the polygon edge. By the above processing procedure, the mapping procedure of the semi-transparent texture and the anti-aliasing procedure of the polygon edge can be performed.

Next, simultaneous implementation of the motion compensation processing procedure and the texture mapping processing procedure, that is, texture mapping of a compressed image will be described.

A compressed image, which is to be subjected to motion compensation, is a set of a plurality of block images each being a unit for purposes of processing by a motion compensation processing procedure. These blocks are indicated by the reference numerals B0 to B99. A polygon which is subjected to texture mapping is defined for each block image serving as a unit of the motion compensation. These polygons are indicated with the reference numerals P0 to P99. It is assumed that an image obtained by texture mapping the image consisting of 100 block images B0 to B99 to 100 polygons P0 to P99 is to be generated.

First, in accordance with the motion compensation processing procedure described above, the motion compensation is performed for the image block B0. Next, by using the expanded image block as a texture image, this block image is texture-mapped to the polygon P0 in accordance with the aforementioned texture mapping processing procedure. In this manner, the motion compensation and texture mapping are performed for each block. By performing the motion compensation and texture mapping for all of the blocks (B0 to B99), it is possible to simultaneously perform an expansion processing procedure based on a reference image consisting of a plurality of image blocks and a differential image and a texture mapping processing procedure using the image obtained by expansion as a texture image in a single image generating apparatus.

Furthermore, by specifying the pixel position as described below in the pixel position specifying means, it is possible to simultaneously perform the motion compensation and the texture mapping of the block images. Specifically, the pixel position in the reference image block is specified as a first pixel position, the pixel position in the generated polygon is specified as a second pixel position, and the pixel position in the differential image block is specified as a third pixel position.

The pixel data is read out from the first pixel position in the reference image block. Then, the pixel data in the reference image block, which corresponds to the reference pixel data, is read out from the third pixel position in the differential image block. These pixel data are calculated by the pixel calculation means. The resultant pixel data is written to the pixel position in the generated polygon, which is specified by the second pixel position. By performing the processing procedure in this manner, it is possible to plot an image deformed into a generated polygon while performing the expansion processing procedure by motion compensation based on both the differential image block compressed by motion prediction and the reference image.

As described above, the image generating apparatus of the present invention enables texture mapping and compressed moving picture expansion by motion compensation. Moreover, the image generating apparatus can simultaneously perform these processing procedure.

Furthermore, the image data of the differential image block in the case of motion compensation or the texture image data in the case of texture mapping can be stored in the block image memory.

By separating the memory storing the generated image and the reference image from the block image memory, it is possible to avoid the collision between access to the pixel data in the reference image block and access to the pixel data in the differential image block or between access to the pixel data in the texture image and access to the pixel data in the generated polygon. A differential image block is generally small, i.e., about 8×8 pixels to 16×16 pixels in size. Thus, a memory having such a small size can be contained in an LSI included in the image generating apparatus. Therefore, it is possible to reduce the circuit size and to increase the processing speed (that is, access speed of the block image memory).

Furthermore, the image generating apparatus may have such a configuration that the image block of the generated image is transferred to the block image memory. As a result, the bidirectional motion compensation and the half-pixel precision motion compensation of the aforementioned basic image generating apparatus will be performed according to the following procedure.

The processing procedure of the bidirectional motion compensation is performed in accordance with Equation 3 described above. More specifically, the bidirectional motion compensation is realized by adding half of the pixel data of the past image block to the differential image block and then adding half of the pixel data of the future image block to the result of the previous addition. Hereinafter, the bidirectional motion compensation processing procedure will be described in further in detail.

First, the forward motion compensation processing procedure is performed. The block image memory stores a differential image block. The pixel data D (x, y) specified as a third pixel position signal is sequentially read out from the block image memory via a second image memory access section. On the other hand, the pixel data P (x, y) of the past image block, which is specified as a first pixel position signal, is sequentially read out from the past image block via a first image memory access section. These pixel data are input to the pixel calculation means. As a result, P(x, y)/2+D(x, y) is obtained. The pixel position specifying means specifies the pixel position in the generated image block based on a second pixel position signal. The pixel data obtained by the pixel calculation means is written to the specified pixel position in the generated image block via the first image memory access section. This process is sequentially performed for the pixel data of all of the image blocks.

Next, the image transfer means sequentially specifies the pixel position in the generated image block which is obtained by the forward motion compensation as described above as a fourth pixel position signal. Then, the pixel data is read out via the first image memory access section. On the other hand, the image transfer means sequentially specifies the pixel position in the block image memory as a fifth pixel position signal. Then, the pixel data read out from the generated image block is written to the block image memory via the second image memory access section. In this way the block image resulting from the forward motion compensation is transferred to the block image memory.

Next, the backward motion compensation is performed. The pixel data P(x, y)/2+D(x, y) specified as a third pixel position signal is sequentially read out via the second image memory access section. On the other hand, the pixel data F(x, y) of the future image block specified as the first pixel position signal is sequentially read out via the first image memory access section. These pixel data are input to the pixel calculation means which calculates {P(x, y)/2+D (x,y) }+F (x, y)/2. The pixel position in the generated image block of the generated image is specified by the pixel position specifying means as the second pixel position signal. The obtained pixel data is written to the block image memory via the first image memory access section. This processing procedure is sequentially performed for the pixel data of all of the pixel blocks.

In the aforementioned manner, the calculation expressed by Equation 3 is performed. By performing the aforementioned processing procedure for all of the pixel blocks constituting the generated image, the bidirectional motion compensation processing procedure is executed.

Hereinafter, the motion compensation with half-pixel precision will be described.

First, a differential image block is stored in the block image memory. The pixel data specified as the third pixel position signal is sequentially read out via the second image memory access section. On the other hand, the pixel data specified as the first pixel position signal is sequentially read from the reference image block via the first image memory access section. These pixel data are input to the pixel calculation means which performs the calculation. The pixel position within the generated image block is specified by the pixel position specifying means as the second pixel position signal. The pixel data obtained by the pixel calculation means is written to the specified pixel position in the generated image block via the first image memory access section. This process is sequentially performed for the pixel data for all of the image blocks, thereby completing the block motion compensation processing procedure.

Next, the image transfer means sequentially specifies the pixel position in the generated image block obtained by the unidirectional motion compensation processing procedure as the fourth pixel position signal. The pixel data is read out via the first image memory access section. On the other hand, the image transfer means sequentially specifies the pixel position in the block image memory as a fifth pixel position signal. The pixel data read out from the generated image block is written to the block image memory via the second image memory access section. The block image thus obtained by the unidirectional motion compensation processing procedure is transferred to the block image memory.

By repeating the block motion compensation and the transfer of the image block to the block image memory the number of times required for half-pixel precision motion compensation processing procedure, the half-pixel precision motion compensation can be achieved.

With the configuration as described above, a single image generating apparatus can perform the texture mapping and the moving picture expansion by using unidirectional/bidirectional motion compensation.

With another configuration, the pixel data output from the pixel calculation means can be written to the block image memory via the second image memory access section. Thus, the bidirectional motion compensation and the half-pixel precision motion compensation, which are described above regarding the image generating apparatus having a basic configuration, are performed as follows.

The bidirectional motion compensation processing procedure is performed in accordance with Equation 3 described above.

More specifically, the bidirectional motion compensation is realized by adding one half times the pixel data of the past image block to the motion compensation differential image block and then adding one half times the pixel data of the future block to the result of the previous addition.

First, the forward motion compensation is performed. The block image memory stores the differential image block. The pixel data D (x,y) specified as the third pixel position signal is sequentially read out via the second image memory access section. On the other hand, the pixel data P(x, y) of the past image block, which is specified as the first pixel position signal, is sequentially read out via the first image memory access section. These pixel data are input to the pixel calculation means which calculates P (x, y)/2+D (x, y). The pixel position in the block image memory is specified by the pixel position specifying means as the second pixel position signal. The pixel data obtained by the pixel calculation means is written to the specified pixel position in the block image memory via the second image memory access section. This processing procedure is sequentially performed for the pixel data of all of the image blocks.

Next, the backward motion compensation processing procedure is performed. The pixel data P(x, y)/2+D (x, y) specified as the third pixel position signal is sequentially read out via the second image memory access section. On the other hand, the pixel data F (x, y) of the future image block specified as the first pixel position signal is sequentially read out via the first image memory access section. These pixel data are input to the pixel calculation means which calculates {P(x, Y)/2+D(x, y)}+F(x, y)/2. The pixel position in the generated image block of the generated image is specified by the pixel position specifying means as the second pixel position signal. The obtained pixel data is written to the block image memory via the first image memory access section. This processing procedure is sequentially performed for the pixel data of the entire pixel block.

In the aforementioned manner, the calculation expressed by Equation 3 is performed. By performing the aforementioned processing procedure for all of the image blocks constituting the generated image, the bidirectional motion compensation is conducted.

Furthermore, half-pixel precision motion compensation can be performed by the following processing procedure. Specifically, the calculation is performed in the pixel calculation means by using the pixel data of the differential image block and the pixel data of the reference image block stored in the block image memory. The result of this calculation is written to the block image memory again. Only the block motion compensation processing procedure, which is the last processing procedure of a plurality of repeated processing procedures in the half-pixel precision motion compensation processing procedure, is written to the generated image via the first image memory access means.

By the processing procedure as described above, the transfer of the image block data, which is necessary for the aforementioned processing procedure, can be omitted. Thus, the number of times the memory is accessed can be remarkably reduced.

In the block motion compensation, the image data in the block image memory is referred to once for each pixel. The result of the calculation is written to the referred pixel position. Therefore, the image data, which is subjected to the calculation, does not produce any problem for the processing procedure even when the result of the calculation is overwritten.

In this way, it is possible to realize both the texture mapping and the moving picture expansion utilizing the half-pixel precision unidirectional/bidirectional motion compensation in a single image generating apparatus. Furthermore, in comparison with the case described above, the number of times the block image memory is accessed can be reduced. As a result, processing procedure can be performed at a higher speed.

As described above, the motion picture expansion processing procedure by the motion compensation and by the texture mapping can be realized in a single image generating apparatus. As a result, it is possible to simplify the configuration of the image generating apparatus, to reduce the circuit size and the amount of memory required for processing procedure, and to omit the motion picture data transfer between the memories so as to reduce the amount of data transfer.

In the moving picture expansion mapping device using the aforementioned image generating apparatus, the texture mapping using the moving picture expansion and the expanded moving picture as a texture image is performed for a digital moving picture which is compression coded in the moving picture compression method as is represented by MPEG, using the motion prediction of the image block, orthogonal transform by DCT, and variable-length coding by Huffman coding. The processing procedure will be described below in detail.

A compressed moving picture contains both compressed reference image data, which is obtained by orthogonally transforming and variable-length coding the reference image, and compressed differential image data, which is obtained by orthogonally transforming and variable-length coding the image block obtained from a difference between the image block constituting the reference image and the compressed reference image data.

In the moving picture expansion mapping device according to the present invention, the compressed reference image data is variable-length inverse coded and is then orthogonally transformed to obtain an expanded reference image. If texture mapping is required to be performed at this time, the texture mapping is executed by using the obtained expanded reference image as a texture image. Next, the compressed differential image data is subjected to a variable-length inverse coding and is then orthogonally transformed to obtain the differential image. Furthermore, the motion compensation processing procedure is performed by the image generating apparatus according to the present invention to obtain an expanded image (generated image). If required, the texture mapping is performed by using the generated image as a texture image. Alternatively, as described above regarding the operation of the aforementioned image generating apparatus, the motion compensation and the texture mapping are simultaneously performed for the differential image.

In this manner, the moving picture expansion mapping device according to the present invention can simultaneously decompress the compressed moving picture and perform the texture mapping using the expanded moving picture as a texture image. Therefore, the moving picture expansion and the texture mapping can be realized in an apparatus having smaller size than that of a conventional apparatus.

In a multimedia apparatus using the aforementioned moving picture expansion mapping, the expansion of a moving picture and the texture mapping are performed as follows.

A CPU controls the moving picture expansion mapping apparatus and each of the other systems or executes an application program, in accordance with the program stored in a main memory. The moving picture expansion mapping apparatus generates an image on a frame memory based on an instruction and data from CPU, thereby displaying the image.

In this system, the processing procedure for texture mapping the compressed moving picture to a three-dimensional polygon so as to display the image will be described. A storage of a multimedia apparatus stores the compressed moving picture data or data of a three-dimensional polygon shape.

The CPU reads out the compressed moving picture data and the polygon shape data from the storage to the main memory. The CPU transforms a three-dimensional polygon shape into a two-dimensional polygon shape on the screen. Next, the CPU passes the compressed moving picture data to the moving picture expansion mapping device and directs an image block determination processing procedure. The image generating apparatus within the moving picture expansion mapping device determines a generated image region and a reference image within a frame memory. Next, the CPU directs the expansion processing procedure. The moving picture expansion mapping device performs the variable-length inverse coding and the orthogonal transform for the received compressed moving picture data. Furthermore, the image generating apparatus in the moving picture expansion mapping device performs the motion compensation so as to generate an expanded image in the generated image region within the frame memory. Next, the CPU directs the motion picture expansion mapping device to perform the image block determination. By using the generated image data as a texture image, another generated polygon is determined. Then the CPU supplies the two-dimensional polygon shape and directs the texture mapping. The texture mapping is performed in the image generating apparatus based on the determined texture image and the generated polygon, so that a polygon image obtained by texture mapping the moving picture data is generated. It is possible to supply even a plurality of polygon shapes to one expanded image data so as to map the data into a complicated shape.

In the above description, after the expansion process is performed for the image to obtain the expanded image, the texture mapping processing procedure is executed. Alternatively, the moving picture expansion and the texture mapping can be alternately performed for each image block. Furthermore, it is possible to simultaneously perform the motion compensation and the texture mapping in the motion expansion processing procedure.

Since it is possible to configure and operate a multimedia apparatus in the aforementioned manner, the expanded image data is not required to be transmitted through a system bus. Thus, the load on the data transmission in a system bus is remarkably lightened. Moreover, since the moving picture expansion and the texture mapping are performed by using the same frame memory, the amount of memory in the system can be reduced.

As described above, according to the present invention, an image generating apparatus capable of performing the expansion processing procedure of a digital moving picture compressed by using inter-frame motion prediction and the texture mapping to a polygon in CG creation, in particular, an image generating apparatus capable of simultaneously performing the aforementioned two processing procedure, a moving picture expansion mapping device, and a multimedia apparatus can be realized. As a result, it is possible to simplify the configurations of the device and the apparatus, to reduce the circuit area, to reduce the amount of memory required for processing procedure, and to omit the moving picture data transmission between the memories so as to reduce the amount of data transmission.

Hereinafter, an image generating apparatus, a moving picture expansion mapping device and a multimedia apparatus according to the present invention will be described with reference to the drawings.

With the present invention, it is possible to decompress the moving picture data compressed based on the motion prediction and to generate an image using the expanded moving picture data as a texture image by texture mapping.

Figure 21:
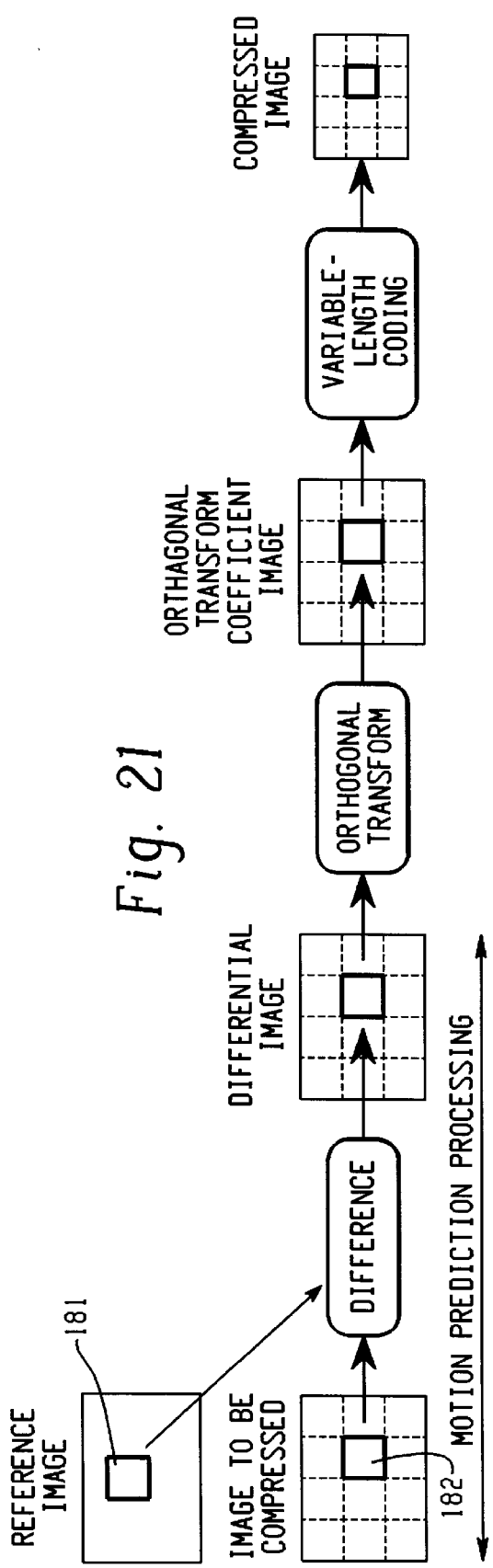
FIG. 21 is a diagram for illustrating a procedure of an image compression processing procedure using a motion compensation procedure.

Motion compensation is a method for obtaining a block in a past image or a future image, which is the most similar to a certain block image within the image, and then obtaining a difference between the block image and the most similar block to reduce the amount of data. As shown in FIG. 21, in a compression coding method of moving pictures such as MPEG, a difference between an image block 182 having fixed size (for example, 16×16 pixels) and a similar image block 181 in a reference image so as to perform the motion prediction. Then, the orthogonal transform (e.g., DCT) and the variable-length coding (e.g., Huffman coding) are performed so as to code the moving picture.

Figure 22:
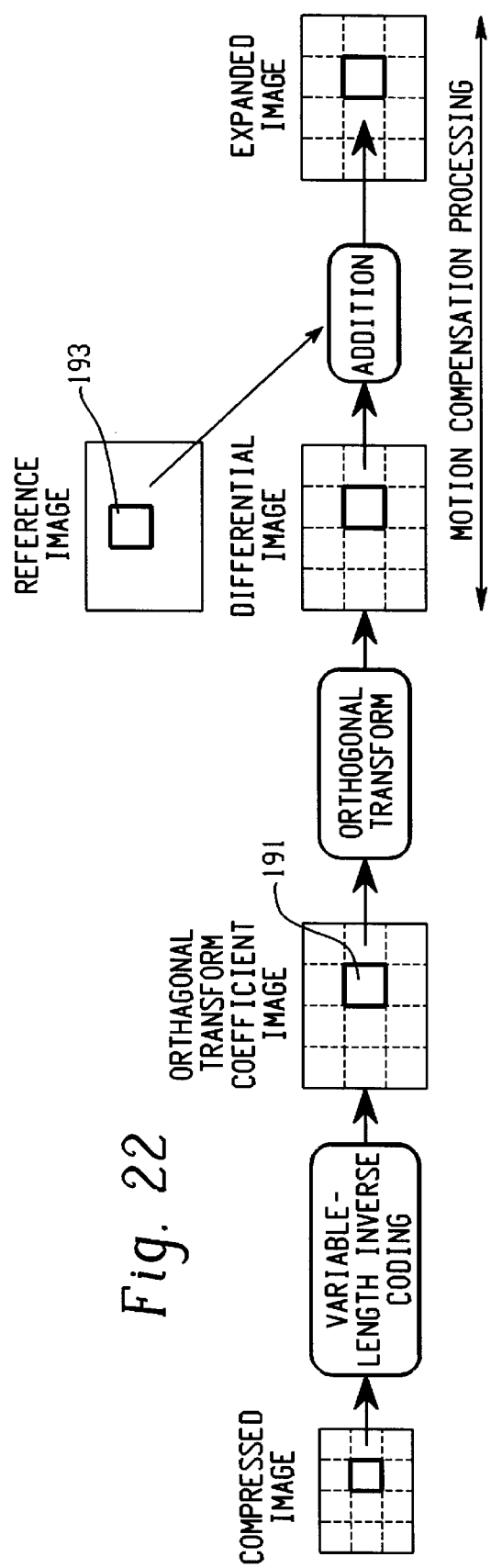
FIG. 22 is a diagram for illustrating a procedure of expansion processing procedure of a moving picture which is compression coded by motion prediction.

The thus coded moving picture is expanded in the following manner. As shown in FIG. 22, the compressed moving picture data is transformed into an orthogonal transform coefficient image 191 by variable-length inverse coding, which is in turn transformed into a differential image 192 by orthogonal transform. The differential image 192 is divided into a plurality of image blocks. Motion compensation is performed for each block. More specifically, an image block 193 serving as a reference for the motion prediction is picked up from the reference image. Then, the image data and the differential image data are calculated so as to obtain an image resulting from the motion compensation. The motion prediction for compression coding uses a different reference image, depending on the type of motion prediction. The reference image is: a past image (in the case of forward motion prediction); a future image (in the case of backward motion prediction); both a past image and a future image (in the case of bidirectional motion prediction); and not used (in the case where the motion prediction is not performed). The most suitable prediction method is selected for each block of motion prediction. It is necessary to change the type of motion compensation for each image block in the motion compensation processing procedure so as to correspond to the selected prediction method.

Figure 23:
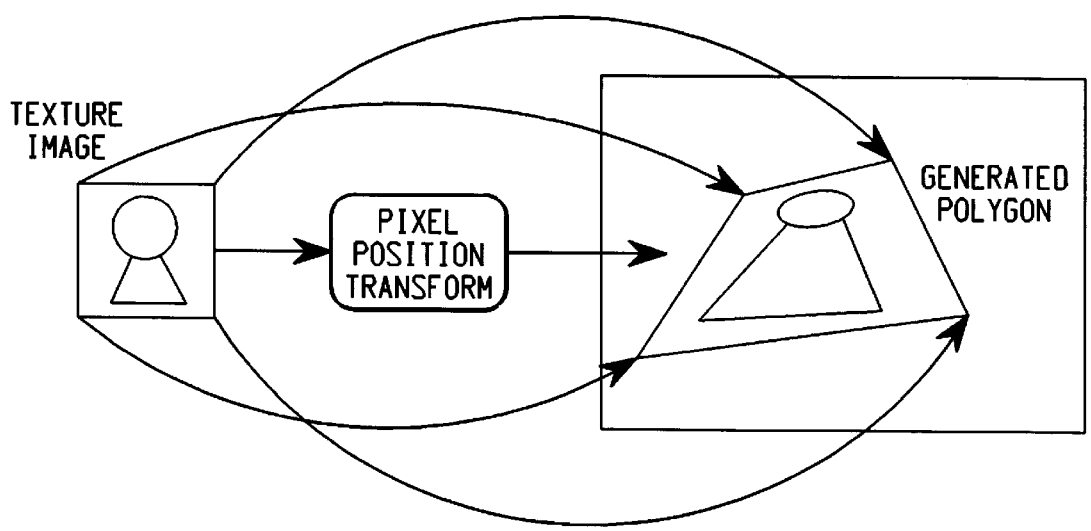
FIG. 23 illustrates a texture mapping processing procedure.
Figure 24:
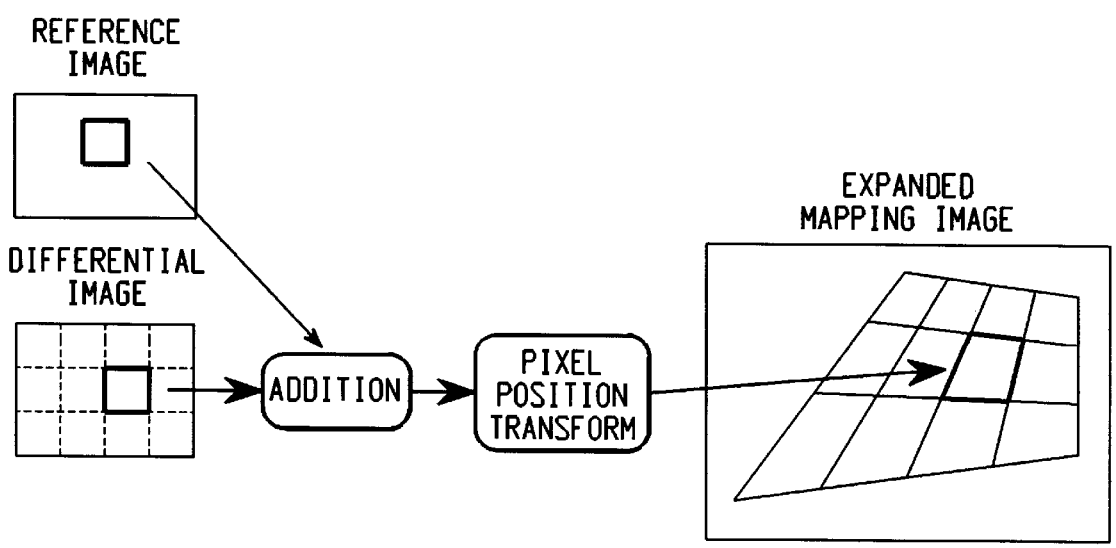
FIG. 24 illustrates the concept of simultaneous implementation of a motion compensation processing procedure and a texture mapping processing procedure.

The image generating apparatus according to the present invention can perform the motion compensation shown in FIG. 22, the transform of the image by the texture mapping as shown in FIG. 23, and the simultaneous implementation of the motion compensation and the texture mapping as shown in FIG. 24.

Figure 25A:
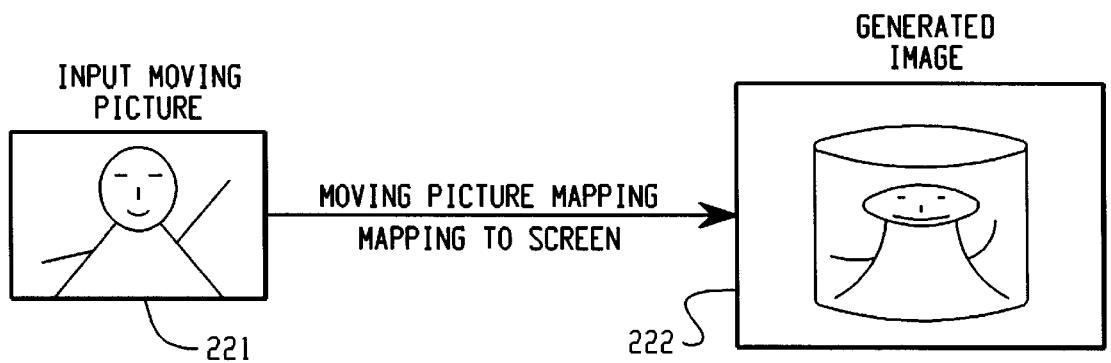
FIG. 25A and FIG. 25B illustrate the application of texture mapping using moving picture data as a texture image.
Figure 25B:
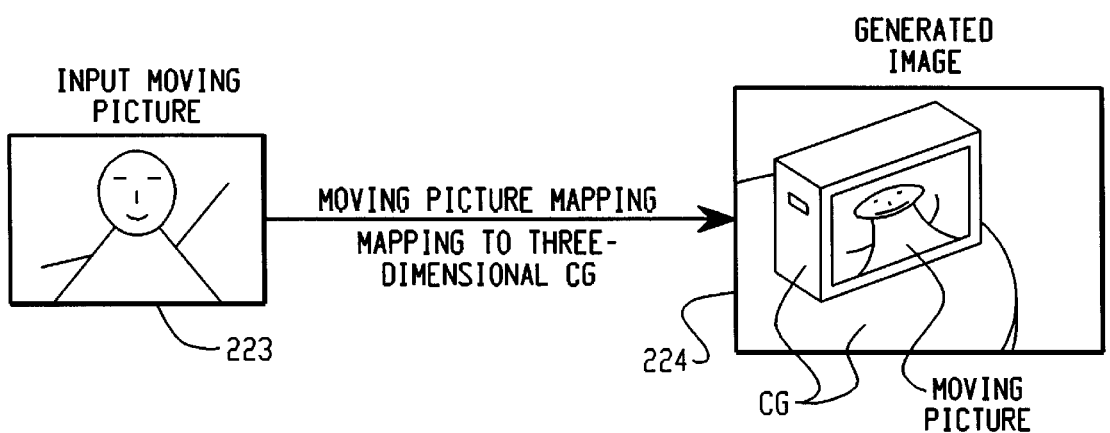

The texture mapping of a moving picture can be utilized, for example, in the case where three-dimensional effect is added to the moving picture in video edit and in a multimedia apparatus (see FIG. 25A), and in the case where a motion picture is mapped to the image generated by three-dimensional CG so as to have perspective (see FIG. 25B). By utilizing the present invention, the texture mapping for the compressed moving picture data can be effectively processed.

Hereinafter, the system configuration, the configuration and operation of the image generating apparatus, the operation of the moving picture expansion mapping device utilizing the image generating apparatus, and the operation of a multimedia apparatus will be described with reference to a multimedia apparatus using the image generating apparatus according to the present invention.

EXAMPLE 1

FIG. 1 is a block diagram showing the configuration of a multimedia apparatus of Example 1 according to the present invention.

A multimedia apparatus 100 of Example 1 is configured as follows. A CPU 101 controls the entire system including a moving picture expansion mapping device 108, an image generating apparatus 104, and a disk device 103. A main memory 102 stores a program for image generating apparatus control executed in the CPU 101, a program containing the information for the operation of each section of the system, the data of the image read from the disk device 103, and the data utilized in a program. The disk device 103 stores compressed image data, texture image data, a plotting program and the like. The moving picture expansion mapping device 108 includes: a variable-length inverse coding section 105; an orthogonal transform section 106; the image generating apparatus 104; and a local bus 107. The variable-length inverse coding section 105 performs variable-length inverse coding for the compressed moving picture data written by the CPU 101 so as to output the orthogonal transform coefficient image data. The orthogonal transform section 106 receives the orthogonal transform coefficient image data, and performs the orthogonal transform for the orthogonal transform coefficient image data so as to output the differential image data. The local bus 107 connects the variable-length inverse coding section 105, the orthogonal transform section 106 and the image generating apparatus 104 with a frame memory 109. The frame memory 109 stores a reference image, a differential image and a generated image. A DA converter 110 performs DA conversion so as to read out the image generated by the image generating apparatus 104 from the frame memory 109 and to display the image on a display device 111. The display device 111 displays the image output from the DA converter 110. A system bus 112 connects the CPU 101, the main memory 102, the disk device 103 and the moving picture expansion mapping device 108 to each other so as to transmit and receive the data therethrough.

Next, the operation of the multimedia apparatus 100 will be described regarding the case where a compressed moving picture is expanded, texture mapping is performed, and texture mapping is performed by using the compressed moving picture as texture data.

In this case, the disk device 103 stores the moving picture data compressed by MPEG. The moving picture expansion is performed while reading out the compressed moving picture, thereby displaying data as a moving picture. The operation procedure is stored in the main memory 102 as a program.

A compressed moving picture data train by MPEG includes an I picture, a P picture and a B picture. The I picture is obtained by inter-frame coding of one image without motion prediction. The P picture is obtained by performing the motion prediction using a past image as a reference image and then performing the compression coding. The B picture is obtained by performing the bidirectional motion prediction from a past image and a future image and then performing the compression coding. It is assumed that a moving picture consists of images 1 to 4. Image 1 is compressed as an I picture, image 4 is compressed as a P picture which is subjected to the forward motion prediction using the image 1 as a reference image. Images 2 and 3 are compressed as B pictures each being subjected to the bidirectional motion prediction using images 1 and 4 as reference images.

First, the CPU 101 reads out the compressed data of image 1 from the disk device 103. Since the read out data is an I picture, it is not necessary to perform the motion compensation for this data. The compressed image is divided into a plurality of image blocks (hereinafter, referred to as compressed image blocks). Each block is transferred to the moving picture expansion mapping device 108. Since the compressed image block is Huffman coded, the compressed image block is inversely transformed in the variable-length inverse coding section 105. The result is output to the orthogonal transform section 106. The orthogonal transform section 106 performs an inverse DCT transform, and writes the result to a generated image in the frame memory 109. By similarly processing procedure all of the compressed image blocks, the expanded image 1 is generated in the frame memory 109.

Next, the image 1 generated in the frame memory 109 is used as a reference image. The CPU 101 reads out the compressed image data of image 4 from the disk device 103. Since the image data is a P picture, forward motion compensation is required to be performed for this data. The compressed image is divided into a plurality of compressed image blocks. Each image block is transferred to the moving picture expansion mapping device 108. Since the compressed image block is Huffman coded, the compressed image block is inversely transformed in the variable-length inverse coding section 105. The result is output to the orthogonal transform section 106. The orthogonal transform section 106 performs an inverse DCT transform, and writes the result to a differential image in the frame memory 109. The image generating apparatus 104 performs the forward motion compensation based on the reference image block in the reference image in the frame memory 109 (image 1) and the differential image block in the differential image in the frame memory 109 so as to generate image 4 in the frame memory 109.

At this point in time, the DA converter 110 reads out the image 1 in the frame memory 109 so as to display the image 1 on the display device 111.

Next, images 1 and 4, which are previously generated, are used as reference images. The CPU 101 reads out the compressed image data of the image 2 from the disk device 103. Since the image data is a B picture, it is necessary to perform the bidirectional motion compensation. The compressed image is divided into a plurality of the compressed image blocks. Each block is transferred to the motion picture expansion mapping device 108. Since the compressed image block is Huffman coded, the compressed image block is inversely transformed in the variable-length inverse coding section 105 so as to be output to the orthogonal transform section 106. The orthogonal transform section 106 performs an inverse DCT transform, and writes the result of the transform into a differential image of the frame memory 109. The image generating apparatus 104 performs the bidirectional motion compensation based on a reference image block in the future image (image 4) and a differential image block in the differential image so as to generate image 2.

At this point in time, image 2 in the frame memory 109 is read out by the DA converter 110 to be displayed on the display device 111.

Next, the CPU 101 reads out the compressed image data of image 3 from the disk device 103. Since the image data is a B picture, it is necessary to perform the bidirectional motion compensation for this data. The compressed image is divided into a plurality of compressed image blocks. Each block is transferred to the moving picture expansion mapping device 108. Since the compressed image block is Huffman coded, the compressed image block is inversely transformed in the variable-length inverse coding section 105 so as to be output to the orthogonal transform section 106. The orthogonal transform section 106 performs an inverse DCT transform, and writes the result to a differential image in the frame memory 109. The image generating apparatus 104 performs the bidirectional motion compensation based on the reference image block in the past image (image 1), the reference image block in the future image (image 4) and the differential image block in the differential image so as to generate image 3.

At this point in time, image 3 in the frame memory 109 is read out by the DA converter 110 so as to be displayed on the display device 111. When the display of image 3 is completed, image 4, which is previously generated, is read out by the DA converter 110 so as to be displayed on the display device 111.

Figure 26:
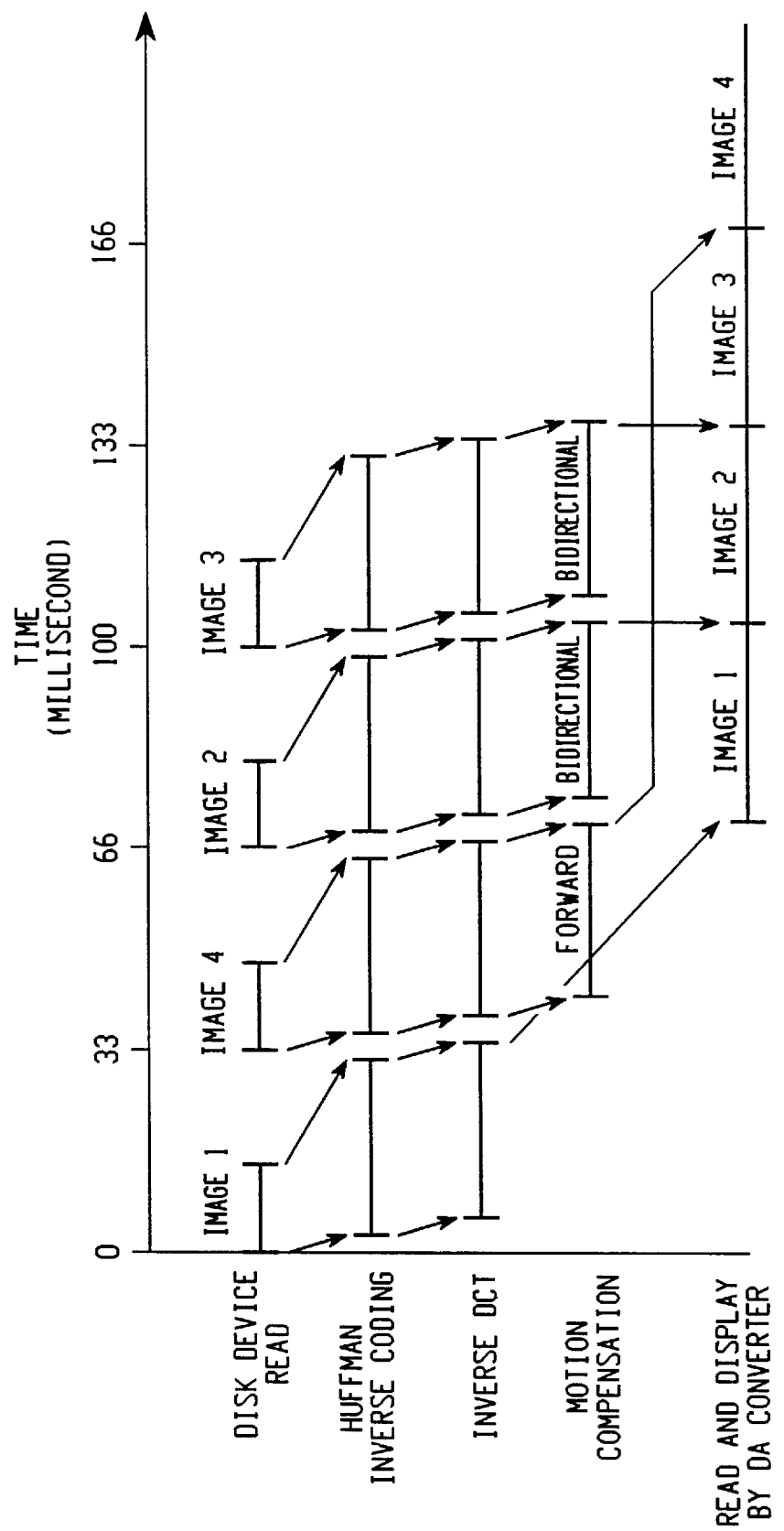
FIG. 26 shows timing of the operation of a multimedia apparatus of Example 2 according to the present invention.
Figure 27:
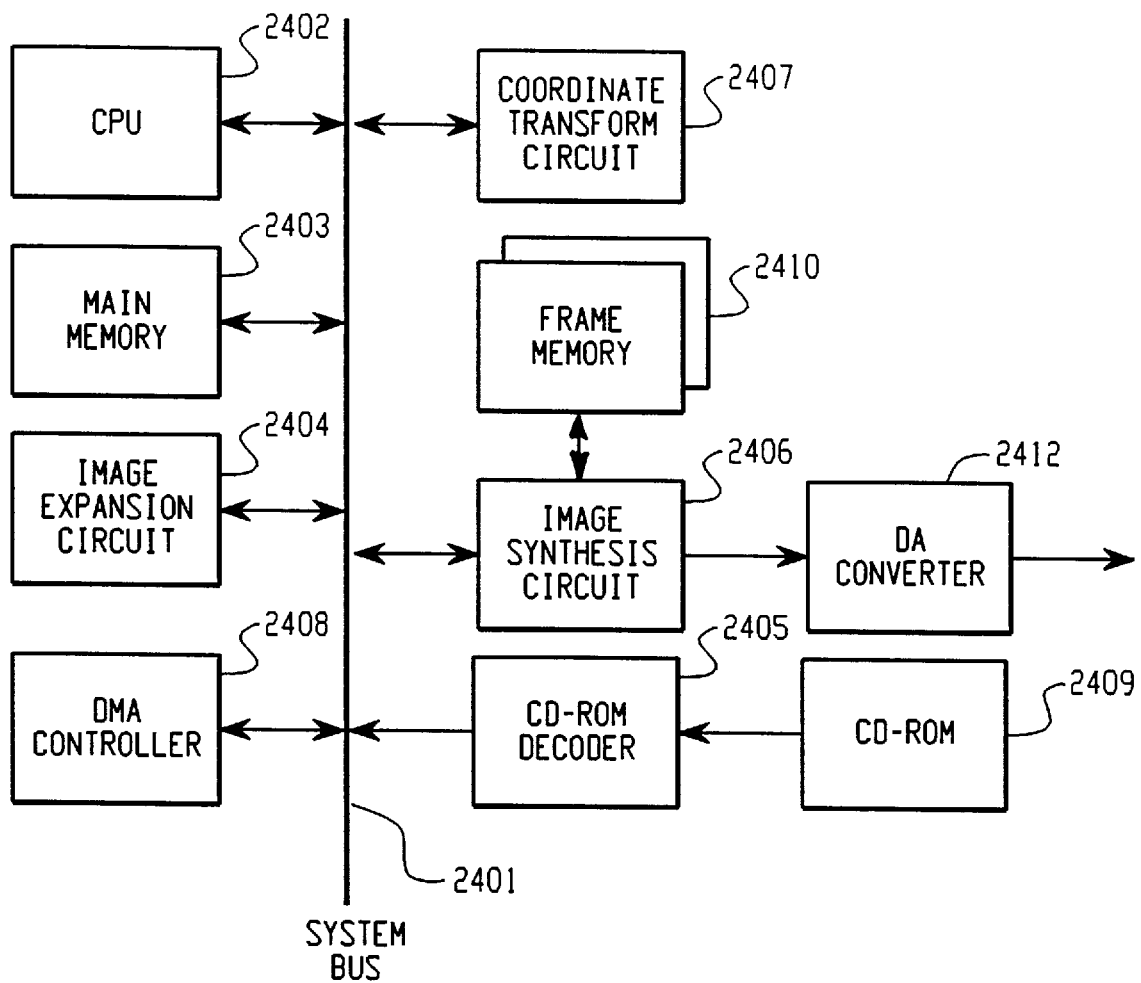
FIG. 27 is a diagram showing the configuration of an image generating system in a conventional example.

As described above, with the multimedia apparatus 100, it is possible to decompress the image data which is compression coded by MPEG while displaying another image. This procedure is shown in a timing chart of FIG. 26.

In the above description, only one kind of motion prediction is used for one image. According to MPEG, however, the image blocks constituting a P picture may include an image block which is compressed without motion prediction, or the image blocks constituting a B picture may include an image block compressed with the forward motion prediction or without motion prediction. In Example 1, even such an image can be expanded by the aforementioned processing procedure while changing the type of motion compensation for each image block.

Next, a method for reading out a texture image stored in the disk device 103 and texture mapping the image to a polygon so as to display a generated image will be described. This operation procedure is stored in a main memory as a program.

First, the CPU 101 reads out a texture image from the disk device 103, and writes the texture image to the frame memory 109 via the moving picture expansion mapping device 108. The CPU 101 specifies the position of a polygon (vertex coordinates) in the image generated in the frame memory 109 to the image generating apparatus 104, and specifies the position of a texture image in the frame memory to the image generating apparatus 104 so as to direct the texture mapping. The image generating apparatus 104 plots the generated polygon in the generated image based on the texture image in the frame memory 109. When the texture mapping is completed for all of the polygons in the generated image, the generated image is read out from the frame memory 109 by the DA converter 110 so as to be displayed on the display device 111. In order to generate a next image, after the CPU 101 writes the newly required texture data to the frame memory 109, the CPU 101 specifies the polygon position to the image generating apparatus 104 so as to perform the texture mapping.

Next, a method for displaying a moving picture mapped to a polygon will be described. In this case, the moving picture data compressed by MPEG is stored in the disk device 103. The moving picture expansion processing procedure is performed while reading out the compressed moving picture data. At the same time, the texture mapping is performed. This operation procedure is stored in the main memory 102 as a program. A moving picture consists of images 1 and 2. It is assumed that image 1 is compressed as an I picture and that image 2 is compressed as a P picture for which the forward motion prediction is performed using image 1 as a reference image. Although image 1 serves as a reference image for motion compensation of image 2, image 2 does not serve as a reference image for another motion compensation.

First, the CPU 101 reads out the compressed data of image 1 from the disk device 103. Since the data is an I picture, it is not necessary to perform motion compensation. The compressed image is divided into a plurality of compressed image blocks. Each image block is transferred to the moving picture expansion mapping device 108. Since the compressed image block is Huffman coded, the variable-length inverse coding section 105 inversely transforms the compressed image block, and outputs the result of the transform to the orthogonal transform section 106. The orthogonal transform section 106 performs an inverse DCT transform, and writes the result of the transform to the texture image in the frame memory 109. The CPU 101 specifies the image block which is expanded as described above as a texture image to the image generating apparatus 104, and specifies the position of a generated polygon, thereby performing the texture mapping. By similarly processing procedure all of the compressed image blocks, a generated image, which is obtained by texture mapping the expanded image 1 to a polygon, is obtained in the frame memory 109.

At this time, image 1 in the frame memory 109 is read out by the DA converter 110 so as to be displayed on the display device 111.

Next, the CPU 101 reads out the compressed data of image 2 from the disk device 103. Since this data is a P picture, it is necessary to perform the forward motion compensation using image 1 as a reference image. The compressed image is divided into a plurality of compressed image blocks. Each image block is transferred to the moving picture expansion mapping device 108. Since the compressed image block is Huffman coded, the variable-length inverse coding section 105 inversely transforms the compressed image block and outputs the result to the orthogonal transform section 106. The orthogonal transform section 106 performs an inverse DCT transform, and writes the result of the transform to a differential image block of the differential image within the frame memory 109. Then, the CPU 101 specifies this differential image block as a differential image block. Then, the CPU 101 specifies a reference image block in the reference image (image 1) written to the frame memory 109 and the position of a generated polygon in the generate image so as to direct the image generating apparatus 104 to simultaneously implement the moving picture expansion and the texture mapping. The image generating apparatus 104 texture maps the pixel data which is subjected to motion compensation to the generated polygon while performing the forward motion compensation based on the differential image and the reference image. By similarly processing procedure all of the compressed image blocks, an image generated by texture mapping the expanded image 2 to a polygon is obtained in the frame memory 109. The resultant image is an image deformed by texture mapping. However, since image 2 does not serve as a reference image for motion compensation of a next image, this does not cause any problem.

At this point in time, image 2 in the frame memory 109 is read out by the DA converter 110 to be displayed on the display device 111.

As described above, in the multimedia apparatus shown in FIG. 1, the expansion of the compressed moving picture by MPEG or the like, texture mapping alone and texture mapping using a compressed moving picture as texture data can be realized.

Figure 2:
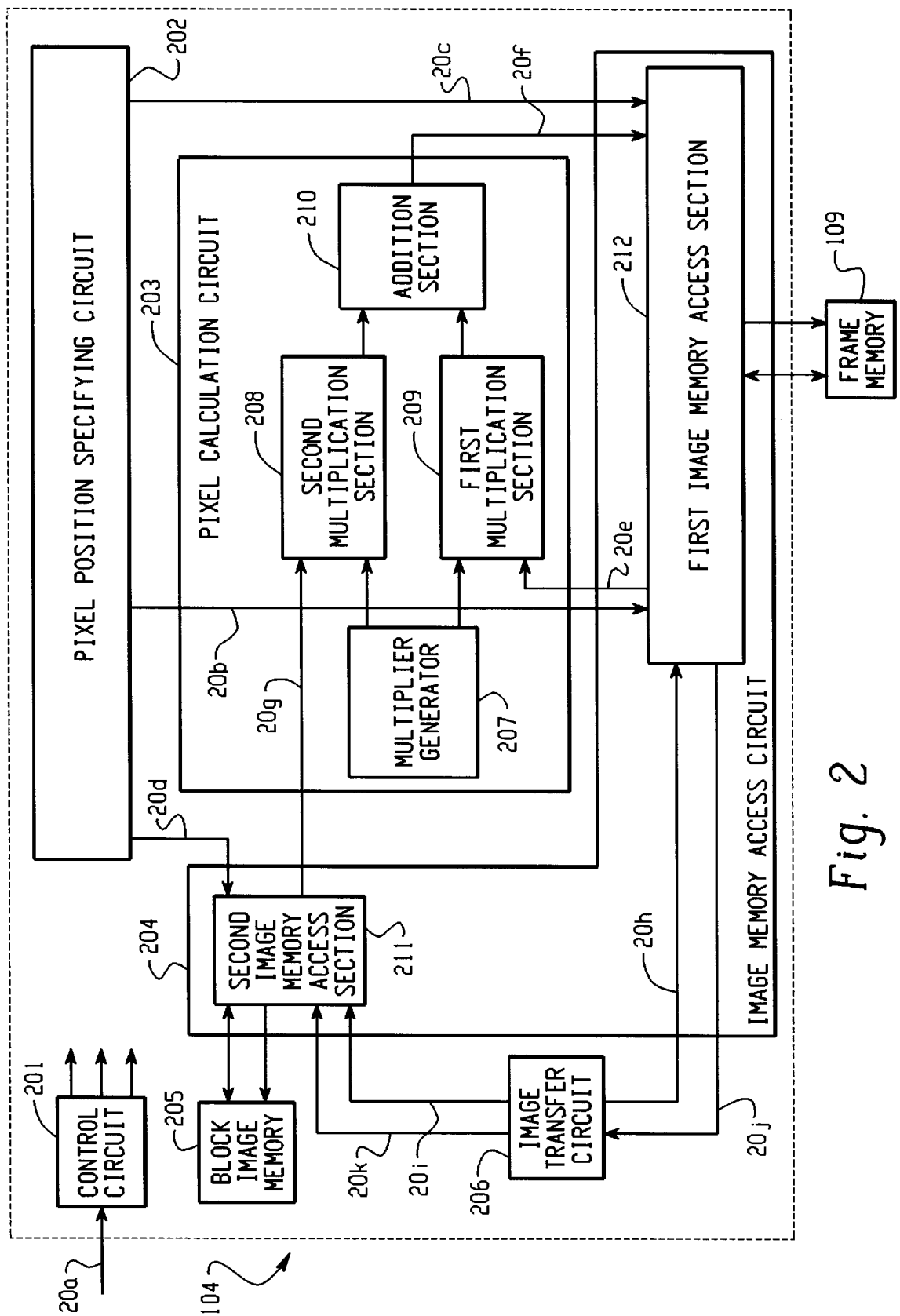
FIG. 2 is a diagram showing the configuration of an image generating apparatus of Example 1.
Figure 3A:
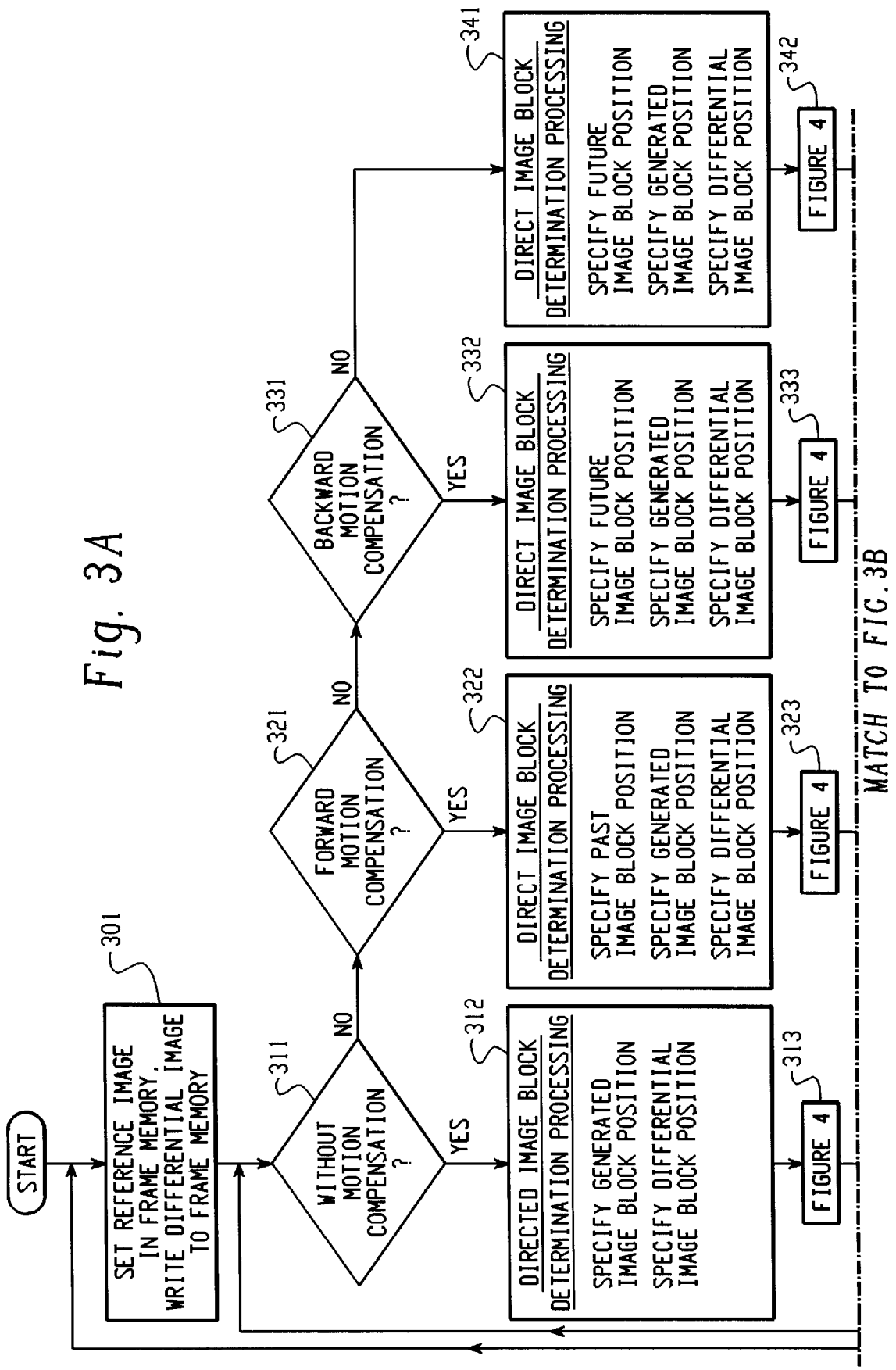
FIGS. 3A and 3B are a flow chart for controlling the operation of an image generating apparatus by a CPU when performing a motion compensation processing procedure of Example 1.
Figure 3B:
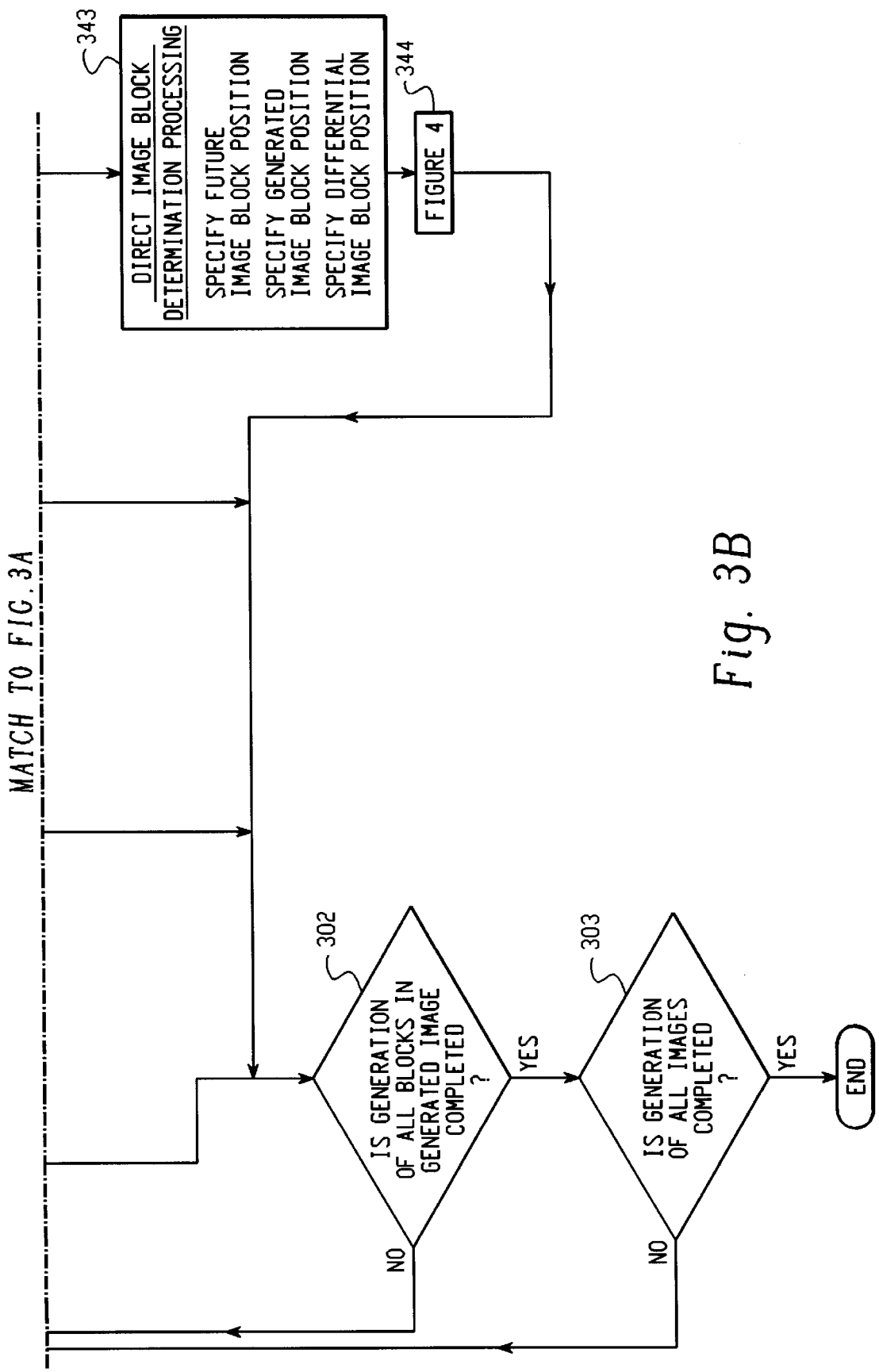

Hereinafter, the configuration and the operation of the aforementioned multimedia apparatus will be described in detail. The image generating apparatus 104 is configured as shown in FIG. 2.

A control circuit 201 interprets a command specified by a command input signal 20a so as to output a command signal for controlling the operation of a pixel position specifying circuit 202, an image transfer circuit 206 and a pixel calculation circuit 203. The pixel position specifying circuit 202 calculates the pixel position (first pixel position) in the reference image block or the generated polygon in accordance with the direction (command signal) of the control circuit 201, and outputs the first pixel position as a first pixel position signal 20b. The pixel position specifying circuit 202 calculates the pixel position (second pixel position) in the reference image block or the generated polygon, and outputs the second pixel position as a second pixel position signal 20c. The pixel position specifying circuit 202 calculates the pixel position (third pixel position) in the differential image block or the texture image, and outputs the third pixel position as a third pixel position signal 20d. An image memory access circuit 204 includes a first image memory access section 212 and a second image memory access section 211. The first image memory access section 212 receives the first pixel position signal 20b, and reads out the pixel data at the specified pixel position in the frame memory 109 to output the pixel data as a first pixel data signal 20e. The first image memory access section 212 receives the second pixel position signal 20c and writes the pixel data input as a second pixel data signal 20f to the specified pixel position in the frame memory 109. The first image memory access section 212 receives a fourth pixel position signal 20h, and reads out the pixel data at the specified pixel position in the frame memory 109 so as to output the pixel data as a fourth pixel data signal 20j. The second image memory access section 211 receives the third pixel position signal 20d, and reads out the specified pixel data in the block image memory 205 so as to output the pixel data as the third pixel data signal 20g. The second image memory access section 211 receives a fifth pixel position signal 20i and writes the pixel data input as a fifth pixel data signal 20k at the specified pixel position in the block image memory 205. The pixel calculation circuit 203 inputs the first pixel data signal 20e and the third pixel data signal 20g, and outputs the result of calculation of these data signals as a second pixel data signal 20f. In Example 1, the pixel calculation circuit 203 includes a multiplier generator 207, a first multiplication section 209, a second multiplication section 208, and an addition section 210. The multiplier generator 207 generates a first multiplier and a second multiplier in accordance with the direction of the control circuit 201, and outputs them to the first multiplication section 209 and the second multiplication section 208. The first multiplication section 209 multiplies the first multiplier specified by the multiplier generator 207 and the first pixel data together. The second multiplication section 208 multiplies the second multiplier specified by the multiplier generator 207 and the third pixel data together. The addition section 210 adds the result of the calculation in the first multiplication section 209 to the result of the calculation in the second multiplication section 208. If the control circuit 201 directs (outputs a command signal) motion compensation or simultaneous processing of motion compensation and texture mapping, the calculation is performed with data precision with code. In the case where the control circuit 201 directs texture mapping, the calculation is performed with data precision without code.

The image transfer circuit 206 generates a fourth pixel position and a fifth pixel position for transferring the image blocks in the frame memory 109 to the block image memory 205 in accordance with the direction from the control circuit 201. The pixel data specified by the fourth pixel position signal 20h is read out from the frame memory 109 via the image memory access circuit 204, and then is written to the pixel position in the block image memory 205 specified by the fifth pixel position signal 20i via the image memory access circuit 204.

The operation of the thus configured image generating apparatus 104 will be described below. The CPU 101 directs the operation of the image generating apparatus 104 with a command. The control circuit 201 interprets the command, and outputs a command signal for controlling each circuit of the image generating apparatus 104, thereby operating the image generating apparatus 104. The control procedure of the CPU 101 by issuing a command to the control circuit 201 and the operation procedure of each circuit in the image generating apparatus 104 to be controlled by the CPU 101 will be described.

Figure 5:
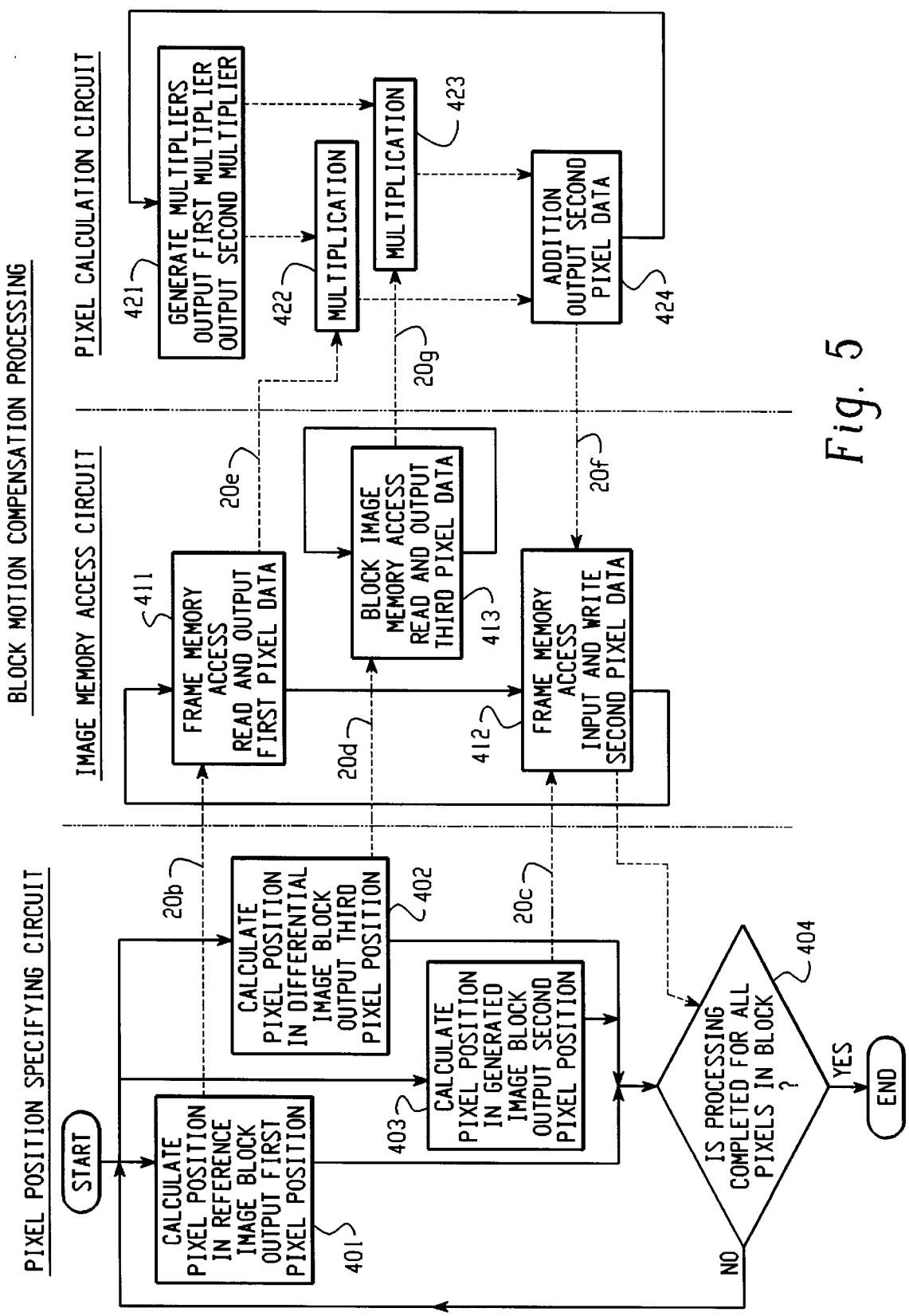
FIG. 5 is a flow chart of the operation of each circuit in the image generating apparatus when performing a motion compensation processing procedure of Example 1.
Figure 6:
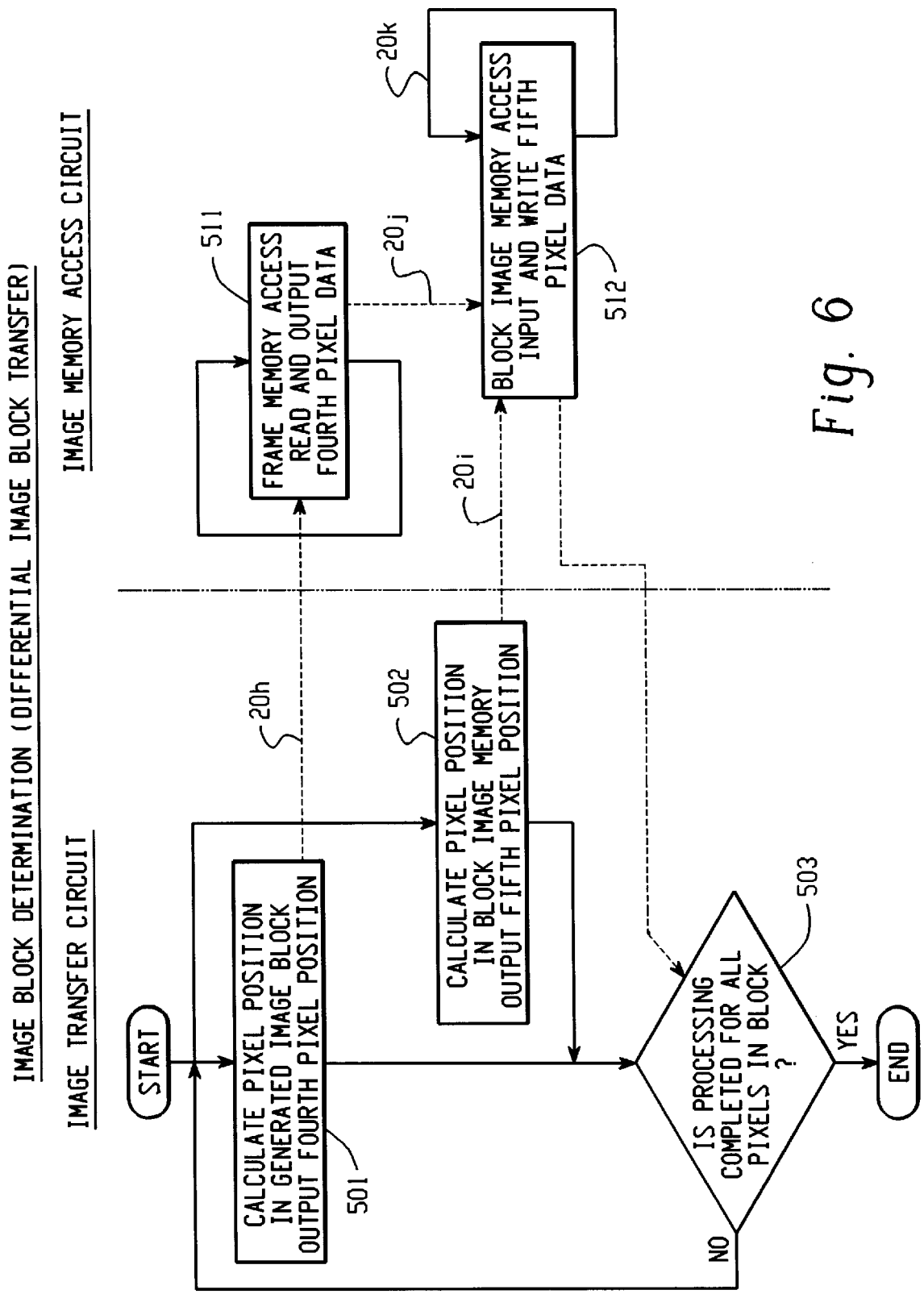
FIG. 6 is a flow chart of the operation of each circuit in the image generating apparatus when performing an image block determination processing procedure of Example 1.

First, the operation of motion compensation in the image generating apparatus 104 will be described. The procedure of the CPU 101 for controlling the image generating apparatus 104 is shown in FIGS. 3A–3B and 4A–4B, and the operation procedure of each circuit of the image generating apparatus 104 is shown in FIGS. 5 and 6. In FIGS. 5 and 6, an arrow in a broken line represents the flow of data/control signal, and an arrow in a solid line represents the flow of processing procedure.

First, the control procedure of the image generating apparatus 104 by the CPU 101 for motion compensation will be described with reference to FIGS. 3A–3B and 4A–4B.

At STEP 301, a reference image (past image or future image) serving as a reference of motion compensation is set in the frame memory 109, and a differential image is written to the frame memory 109. The reference image is read out from the disk device 103 and written to the frame memory 109 by the CPU 101. Alternatively, the reference image is an image which is previously generated in the image generating apparatus 104.

At STEP 311, whether motion compensation is performed or not is determined. If motion compensation is not performed, processing proceeds to STEP 312. If motion compensation is performed, processing proceeds to STEP 321.

At STEP 312, the image block determination processing procedure is directed to the image generating apparatus 104. By this operation, the position of the generated image block in the generated image and the position of the differential image block in the differential image are specified.

Figure 4A:
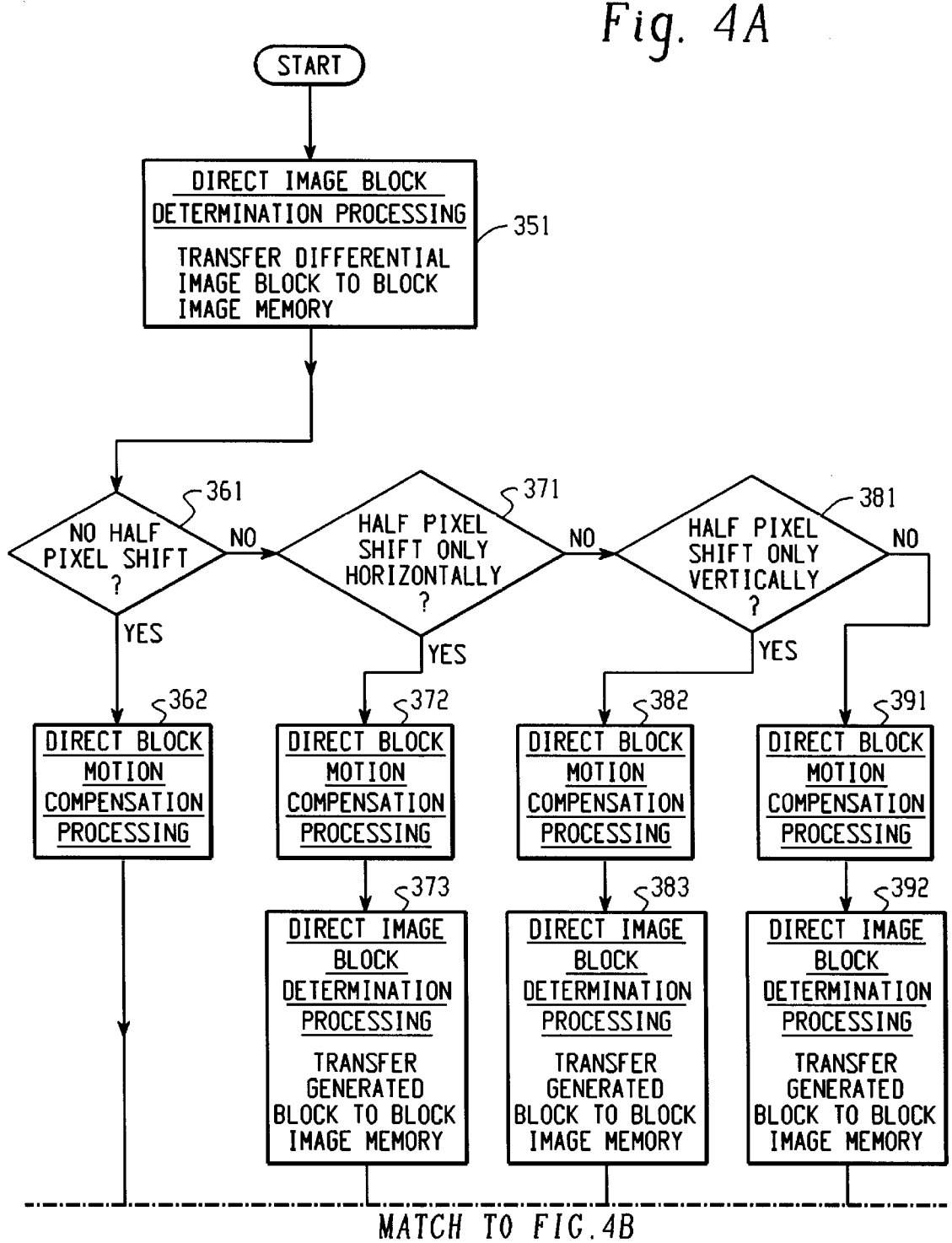
FIGS. 4A and 4B are part of a flow chart for controlling the operation of an image generating apparatus by a CPU when performing a motion compensation processing procedure of Example 1.
Figure 4B:
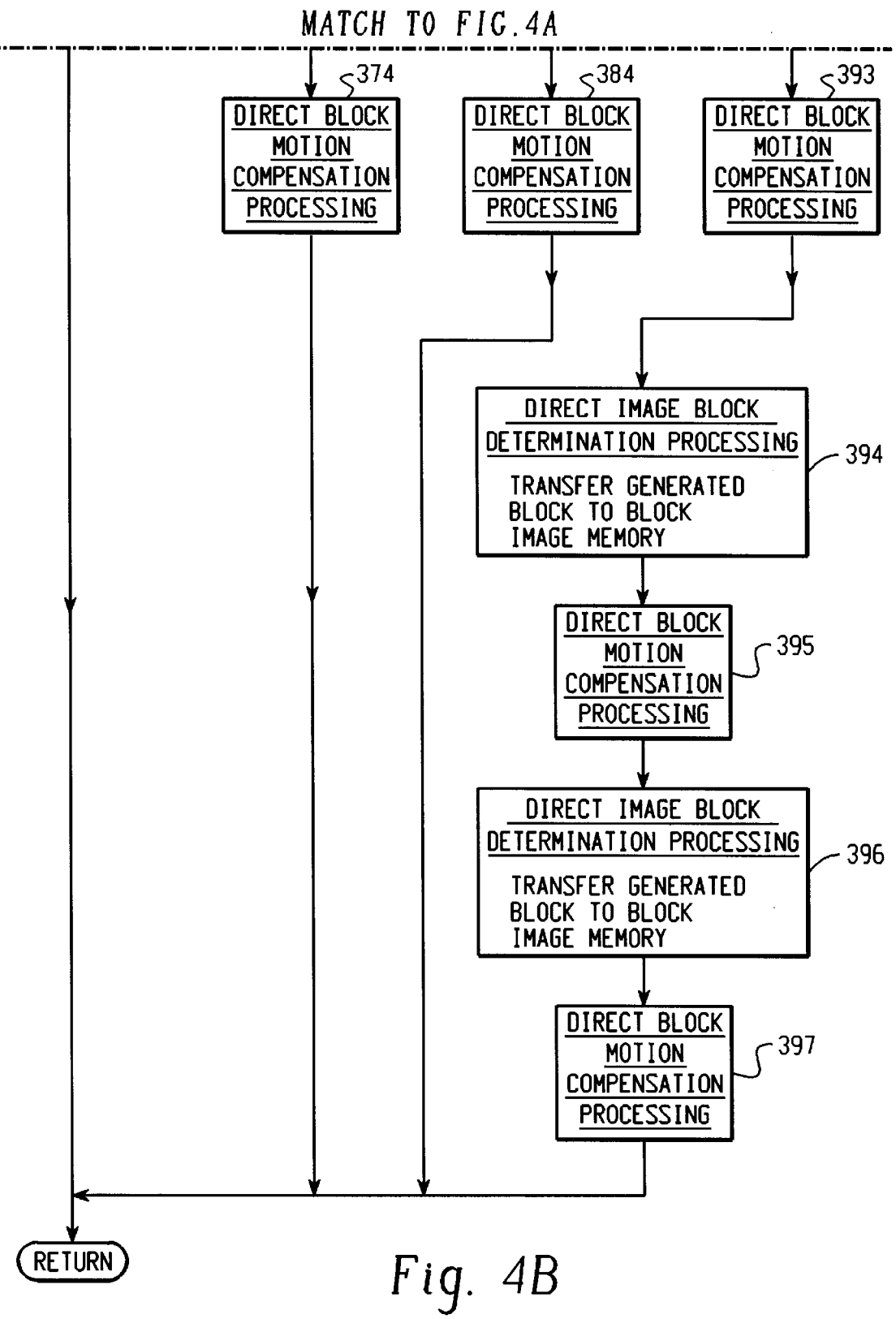

At STEP 313, motion compensation processing of the block is controlled in accordance with FIGS. 4A and 4B.

At STEP 321, whether the type of motion compensation is forward motion compensation or not is determined. If processing is forward motion compensation, processing proceeds to STEP 322. If not, processing proceeds to STEP 331.

At STEP 322, the image block determination processing procedure is directed to the image generating apparatus 104. By this operation, the position of the past image block in the past image, the position of the image block to be generated in the generated image, and the position of the differential image block in the differential image are specified.

At STEP 323, motion compensation processing procedure of the block is controlled in accordance with FIGS. 4A and 4B.

At STEP 331, whether the type of motion compensation is backward motion compensation or not is determined. If processing is backward motion compensation, processing proceeds to STEP 332. If not, processing proceeds to STEP 341.

At STEP 332, the image block determination processing procedure is directed to the image generating apparatus 104. By this operation, the position of a future image block in the future image, the position of an image block to be generated in the generated image, the position of a differential image block in the differential image are specified.

At STEP 333, motion compensation processing of the blocks is controlled in accordance with FIGS. 4A and 4B.

At STEP 341, the image block determination processing procedure is directed to the image generating apparatus 104. By this operation, the position of the past image block in the past image, the position of the image block to be generated in the generated image, and the position of the differential image block in the differential image are specified.

At STEP 342, motion compensation of blocks is controlled in accordance with FIGS. 4A and 4B.

At STEP 343, the image block determination processing procedure is directed to the image generating apparatus 104. By this operation, the position of the future image block in the future image, the position of the image block to be generated in the generated image, and the position of the differential image block in the differential image are specified.

At STEP 344, motion compensation of blocks is controlled in accordance with FIGS. 4A and 4B.

At STEP 302, it is determined whether or not motion compensation is completed for all of the image blocks in the generated image. If motion compensation is completed, processing procedure proceeds to STEP 303. If not, processing proceeds to STEP 311 where processing of a next image block is started.

At STEP 303, it is determined whether or not motion compensation is completed for all of the images. If not, processing proceeds to STEP 301 where the processing procedure of a next image is started.

Next, the procedure of the CPU 101 for controlling the image generating apparatus 104 to perform motion compensation of image blocks will be described in detail with reference to FIGS. 4A and 4B.

At STEP 351, the CPU 101 directs the image generating apparatus 104 to perform the image block determination processing procedure. By this operation, a reference image block, which is subjected to the processing procedure next, is transferred from the differential image in the frame memory to the block image memory.

At STEP 361, it is determined whether or not half-pixel precision motion compensation is performed. If half-pixel precision motion compensation is not performed, processing procedure proceeds to STEP 362. If half-pixel precision motion compensation is performed, processing procedure proceeds to STEP 371.

At STEP 362, the CPU 101 directs the image generating apparatus 104 to perform the block motion compensation. By this operation, the position of the reference image block in the reference image is specified to the image generating apparatus 104.

At STEP 371, it is determined whether or not the position of the reference image block is only horizontally specified with half-pixel precision. If the pixel position is specified only horizontally, processing procedure proceeds to STEP 372. If not, processing procedure proceeds to STEP 381.

At STEP 372, the CPU 101 directs the image generating apparatus 104 to perform the block motion compensation processing procedure. By this operation, the position of the reference image block in the reference image is specified to the image generating apparatus 104. The position of the reference image block is shifted to the left by a half pixel from the position of the reference image block specified for motion compensation.

At STEP 373, the CPU 101 directs the image generating apparatus 104 to perform the image block determination processing procedure. By this operation, the generated image block is transferred to the block image memory 205 so as to be used as a differential image block for next motion compensation.

At STEP 374, the CPU 101 directs the image generating apparatus 104 to perform the block motion compensation processing procedure. By this operation, the position of the reference image block in the reference image is specified to the image generating apparatus 104. The position of the reference image block is shifted to the right by a half pixel from the position of the reference image block, which is specified with half pixel precision for motion compensation.

At STEP 381, it is determined whether or not the position of the reference image block is only vertically specified with half-pixel precision. If the position is specified only vertically, processing procedure proceeds to STEP 382. If not, processing proceeds to STEP 391.

At STEP 382, the CPU 101 directs the image generating apparatus 104 to perform the block motion compensation processing procedure. By this operation, the position of the reference image block in the reference image is indicated to the image generating apparatus 104. The position of the reference image block is shifted upward by a half pixel from the position of the reference image block specified for motion compensation.

At STEP 383, the CPU 101 directs the image generating apparatus 104 to perform the image block determination processing procedure. By this operation, the generated image block is transferred to the block image memory 205 so as to be used as a differential image block for the next motion compensation processing procedure.

At STEP 384, the CPU 101 directs the image generating apparatus 104 to perform the block image motion compensation processing procedure. By this operation, the position of the reference image block in the reference image is indicated to the image generating apparatus 104. The position of the reference image block is shifted downward by a half pixel from the position of the reference image block specified with half-pixel precision for motion compensation.

At STEP 391, the CPU 101 directs the image generating apparatus 104 to perform the block image motion compensation processing procedure. By this operation, the position of the reference image block in the reference image is indicated to the image generating apparatus 104. The position of the reference image block is shifted to the left and upward by a half pixel each from the position of the reference image block specified with half pixel precision for motion compensation.

At STEP 392, the CPU 101 directs the image generating apparatus 104 to perform the image block determination processing procedure. By this operation, the generated image block is transferred to the block image memory 205 so as to be used as a differential image block for the next motion compensation processing procedure.

At STEP 393, the CPU 101 directs the image generating apparatus 104 to perform the block motion compensation processing procedure. By this operation, the position of the reference image block in the reference image is indicated to the image generating apparatus 104. The position of the reference image block is shifted to the right and upward by a half pixel each from the position of the reference image block specified for motion compensation.

At STEP 394, the CPU 101 directs the image generating apparatus 104 to perform the image block determination processing procedure. By this operation, the generated image block is transferred to the block image memory 205 so as to be used as a differential image block for the next motion compensation processing procedure.

At STEP 395, the CPU 101 directs the image generating apparatus 104 to perform the block motion compensation processing procedure. By this operation, the position of the reference image block in the reference image is specified to the image generating apparatus 104. The position of the reference image block is shifted to the left and downward by a half pixel each from the position of the reference image block specified for motion compensation.

At STEP 396, the CPU 101 directs the image generating apparatus 104 to perform the image block determination processing procedure. By this operation, the generated image block is transferred to the block image memory 205 so as to be used as a differential image block for the next motion compensation processing procedure.

At STEP 397, the CPU 101 directs the image generating apparatus 104 to perform the block image compensation processing procedure. By this operation, the position of the reference image block in the reference image is indicated to the image generating apparatus 104. The position of the reference image block is shifted to the right and downward by a half pixel each from the position of the reference image block specified for motion compensation.

The operation procedure of the image generating apparatus 104 which is controlled by the CPU 101 as described above to perform the motion compensation processing procedure will be described with reference to FIGS. 5 and 6. Herein, the operation procedure is described for each direction of operation by the CPU 101.

The operation procedure in the case where the CPU 101 directs the image generating apparatus 104 to perform the block motion compensation processing procedure is shown in FIG. 5. In this process, the direction by the CPU 101 is analyzed by the control circuit 201 of the image generating apparatus 104. Then, a command signal for controlling the operation of the pixel position specifying circuit 202 and the multiplier generator 207 of the pixel calculation circuit 203 is output.

The pixel position specifying circuit 202 operates in the following procedure.

At STEP 401, the pixel position (first pixel position) in the reference image block is obtained. The obtained pixel position is output to the image memory access circuit 204 as the first pixel position signal 20b.

Simultaneously, at STEP 402, the pixel position (third pixel position) in the reference image block is obtained. The obtained pixel position is output to the image memory access circuit 204 as the third pixel position signal 20d.

Simultaneously, at STEP 403, the pixel position (second pixel position) in the generated image block is obtained. The obtained pixel position is output to the image memory access circuit 204 as the second pixel position signal 20c.

At STEP 404, it is determined whether or not the process is completed for all of the pixels in the generated image block after the second image data is written to the second pixel position output at STEP 403. If not, processing procedure proceeds to STEP 401, STEP 402 and STEP 403.

When the pixel position specifying circuit 202 specifies the pixels, either the generated image block, the differential image block or the reference image block is normally selected. Then, the pixel on a horizontal line, that is, a scan line including the block are sequentially specified. When processing for one horizontal line is completed, the pixels on a next horizontal line are successively specified. The completion of processing procedure for the pixels of all of the horizontal lines means that processing procedure for all of the pixels in the image block is completed.

The image memory access circuit 204 operates in the following procedure.

At STEP 411, the first pixel position signal 20b is input so as to read out the image data at the specified pixel position in the frame memory 109. Then, the image data is output as the first image data signal 20e.

At STEP 412, the second pixel position signal 20c and the second pixel data signal 20f are input, thereby writing the pixel data to the specified pixel position in the frame memory 109.

At STEP 413, the third pixel position signal 20d is input to read out the image data at the specified pixel position in the block image memory 205. Then, the image data is output as the third image data signal 20g.

The pixel calculation circuit 203 operates in the following procedure.

At STEP 421, the multiplier generator 207 outputs the first multiplier and the second multiplier as shown in Table 1 in accordance with the type of motion compensation processing procedure directed by the CPU 101 via the control circuit 201.

TABLE 1

| | without motion compensation | | unidirectional motion compensation | | bidirectional motion compensation | |
|---|---|---|---|---|---|---|
| | first multiplier | second multiplier | first multiplier | second multiplier | first multiplier | second multiplier |
| without half-pixel shift | 0.0 | 1.0 | 1.0 | 1.0 | 0.5 | 1.0 |
| horizontal or vertical half-pixel shift | 0.0 | 1.0 | 0.5 | 1.0 | 0.25 | 1.0 |
| horizontal and vertical half-pixel shift | 0.0 | 1.0 | 0.25 | 1.0 | 0.125 | 1.0 |

At STEP 422, the image data input as the first image data signal 20e is multiplied by the first multiplier in the first multiplication section 209.

At STEP 423, the image data input as the third image data signal 20g is multiplied by the second multiplier in the second multiplication section 208.

At STEP 424, the result of the first multiplication section 209 and the result of the second multiplication section 208 are added in the addition section 210. The result of this addition is output as the second image data signal 20f.

In the case where the CPU 101 directs the image generating apparatus 104 to perform the image block determination processing procedure, the direction of the CPU 101 is analyzed by the control circuit 201 of the image generating apparatus 104. As a result, a command signal for controlling the operation of the pixel position specifying circuit 202 and the pixel transfer circuit 206 is output.

In the pixel position specifying circuit, the position of the differential image block, the reference image block, the generated image block, or the position of the texture image or the generated polygon are determined, which are required to be generated for the next motion compensation of the texture mapping processing procedure described below. The pixel position specifying circuit generates the pixel position in accordance with the determined image block when block motion compensation or texture mapping is performed.

In the image transfer circuit, the operation shown in FIG. 6 is performed so as to transfer the image block from the frame memory to the block image memory.

At STEP 501, the pixel position (fourth pixel position) in the generated image block is obtained. The pixel position is output to the image memory access circuit 204 as the fourth pixel position signal 20h.

At STEP 502, the pixel position (fifth pixel position) in the block image memory is obtained. The pixel position is output to the image memory access circuit 204 as the fifth pixel position signal 20i.

At STEP 503, after the fifth image data is written to the fifth pixel position output at STEP 502, it is determined whether or not processing for all of the pixels in the generated image block is completed. If not, processing proceeds to STEP 501 and STEP 502.

At STEP 511, the fourth pixel position signal 20h is input to read out the image data at the specified pixel position in the frame memory 109. The image data is output as a fourth image data signal 20j. The fourth image data signal 20j is input as the fifth image data signal 20k via the image transfer circuit.

At STEP 512, the fifth pixel position signal 20i and the fifth pixel data signal 20k are input, thereby writing the image data to the desired pixel position in the block image memory 205.

By the above procedure, the image generating apparatus 104 of Example 1 realizes the motion compensation processing procedure.

In accordance with the operation procedure for the aforementioned motion compensation processing procedure, the operation of the multimedia apparatus 100 for forward motion compensation processing procedure will be specifically described with reference to FIG. 7. For simplification, it is assumed that the size of an image is 8×8 pixels, and the size of an image block for motion compensation is 4×4 pixels.

Figure 7:
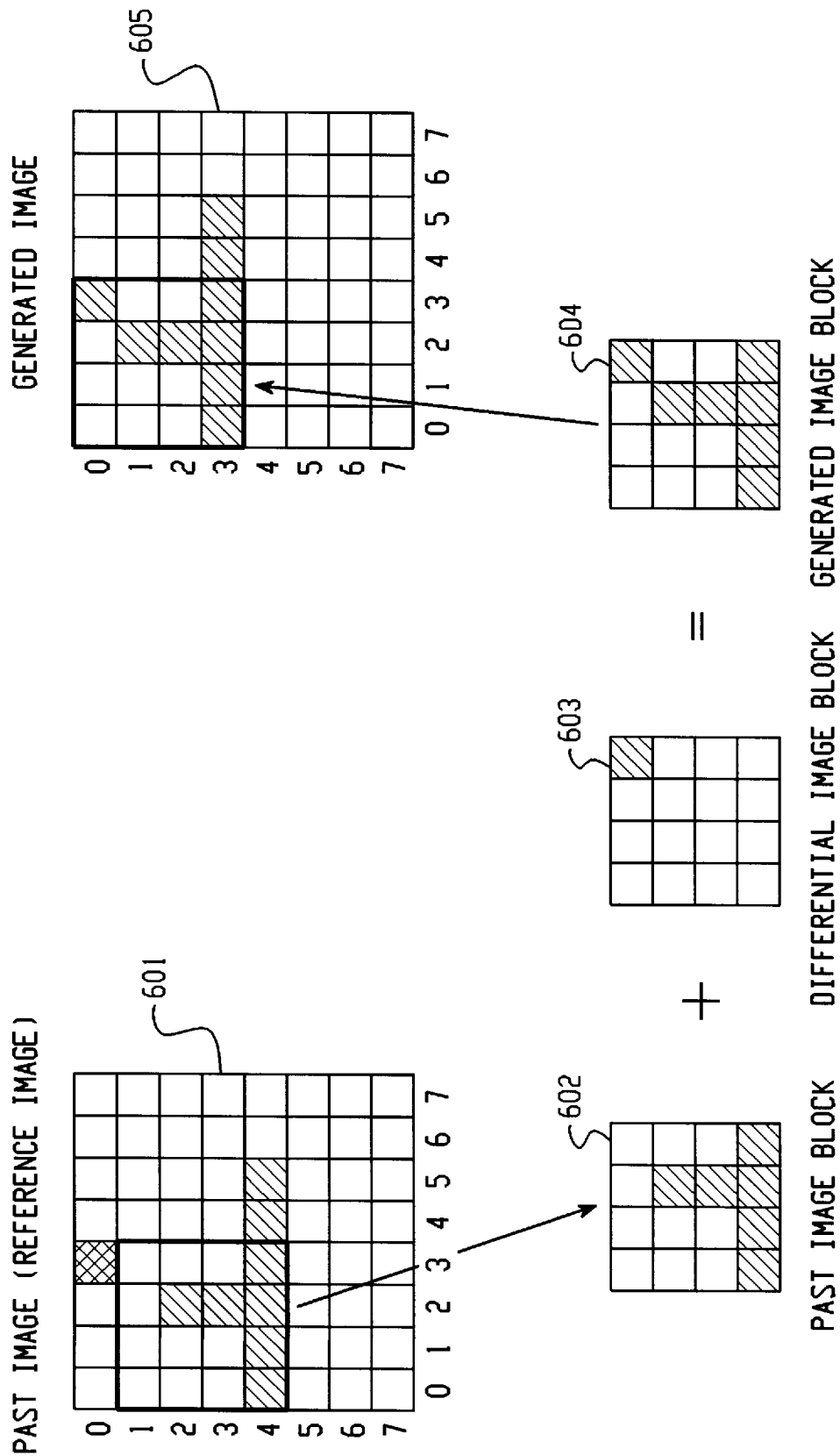
FIG. 7 illustrates a forward motion compensation processing procedure in the present invention.

In FIG. 7, a past image 601 serves as a reference image for forward motion compensation. A past image block 602 is included in the past image 601, and serves as a reference of motion compensation. A differential image block 603 generates an image block having the size of 4×4 pixels, which is located on the upper left in the generated image, by motion compensation. The generated image block 604 is obtained by forward motion compensation processing procedure. A generated image 605 is an image to be generated by the expansion processing procedure.

In the following description, a pixel position number in the past image 601 and the generated image 605 represents the position of a pixel or an image block. For example, the pixel block in the past image having the size of 4 by 4 pixels, which is enclosed by a thick line in FIG. 7, is represented as image block (0,1)-(3,4). Moreover, a pixel in the block is represented by coordinates in the block. For example, a pixel located at the upper left corner of the past image block (0,1)-(3,4) is represented as pixel (0,0).

Hereinafter, the operation of the multimedia apparatus 100 and the image generating apparatus 104 will be described in detail.

The past image 601 is stored in the frame memory 109. A storage area, which is to store the generated image 605, is preserved in the frame memory 109. The CPU 101 writes a differential image to the frame memory 109 (STEP 301).

Since the forward motion compensation processing procedure is performed, processing proceeds to STEP 322 (STEP 311 to STEP 321).

The CPU 101 directs the image generating apparatus 104 to perform the image block determination processing procedure. An image block (0,1)-(3,4) in the past image 601 is specified as a past image block 602, and an image block (0,0)-(3,3) in the generated image 605 is specified as a generated image block 604 so as to specify the position of the differential image block 603 in the frame memory 109 (STEP 322).

The processing procedure shown in FIG. 4 is performed for the specified image blocks.

At STEP 351, the CPU 101 directs the block image memory to transfer the differential image block 603 to the block image memory as the image block determination processing procedure. In response to this direction, the control circuit 201 controls the image transfer circuit 206 so as to transfer the differential image block 603 in the frame memory 109 to the block image memory 205 (FIG. 6).

Since the specified position of the past image block 602 (0,1)-(3,4) in the past image 601 is not shifted by a half pixel from the position where the pixel is present, half-pixel precision motion compensation is not performed (STEP 361).

The CPU 101 directs the image generating apparatus 104 to perform the motion compensation processing procedure. In response to this direction, the image generating apparatus 104 performs the processing procedure as shown in FIG. 5.

The pixel position specifying circuit 202 calculates the pixel position (first pixel position) (0,0) in the past image block 602, and outputs this pixel position as the first pixel position signal 20b. On the other hand, the pixel position specifying circuit 202 calculates the pixel position (third pixel position) (0,0) in the differential image block 603, and outputs this pixel position as the third pixel position signal 20d. The pixel position specifying circuit 202 calculates the pixel position (second pixel position) (0,0) in the generated image block 604, and outputs this pixel position as the second pixel position signal 20c (STEP 401, STEP 402, STEP 403).

The first image memory access section 212 in the image memory access circuit 204 receives the first pixel position signal 20b so as to read out the pixel data of the pixel position (0,0) from the past image block 602 in the frame memory 109, and outputs the pixel data as the first pixel data signal 20e (STEP 411). The second image memory access section 211 receives the third pixel position signal 20d so as to read out the pixel data of the pixel position (0,0) from the differential image block 603 in the block image memory 205, and outputs the pixel data as the third pixel data signal 20g (STEP 413).

The multiplier generator 207 in the pixel calculation circuit 203 generates 1.0 as the first multiplier and 1.0 as the second multiplier in accordance with Table 1 (STEP 421). The first multiplication section 209 multiplies the pixel data input by the first pixel data signal 20e by the first multiplier, and outputs the result of the multiplication to the addition section 210 (STEP 422). The second multiplication section 208 multiplies the pixel data input by the third pixel data signal 20g by the second multiplier, and outputs the result of the multiplication to the addition section 210 (STEP 423).

The addition section 210 adds the result of the multiplication in the first multiplication section 209 to the result of the multiplication in the second multiplication section 208, and outputs the result of the addition as the second pixel data signal 20f (STEP 424).

Next, the first image memory access section 212 receives the second pixel position signal 20c and the second pixel data signal 20f, and writes the pixel data to the pixel position (0,0) in the generated image block 604 (STEP 412).

Until all of the pixels in the generated image block 604 are generated, the processing procedure shown in FIG. 5 is repeated for each pixel in the generated image block 604 (STEP 404).

By performing the processing procedure in this manner, the generated image block 604 is generated from the past image block 602 and the motion compensation differential image 603.

The operation of backward motion compensation processing procedure differs from the aforementioned forward motion compensation only in that a future image is used as a reference image instead of the past image.

Next, the operation of the multimedia apparatus 100 and the image generating apparatus 104 for bidirectional motion compensation processing procedure will be described in detail with reference to FIG. 8.

Figure 8:
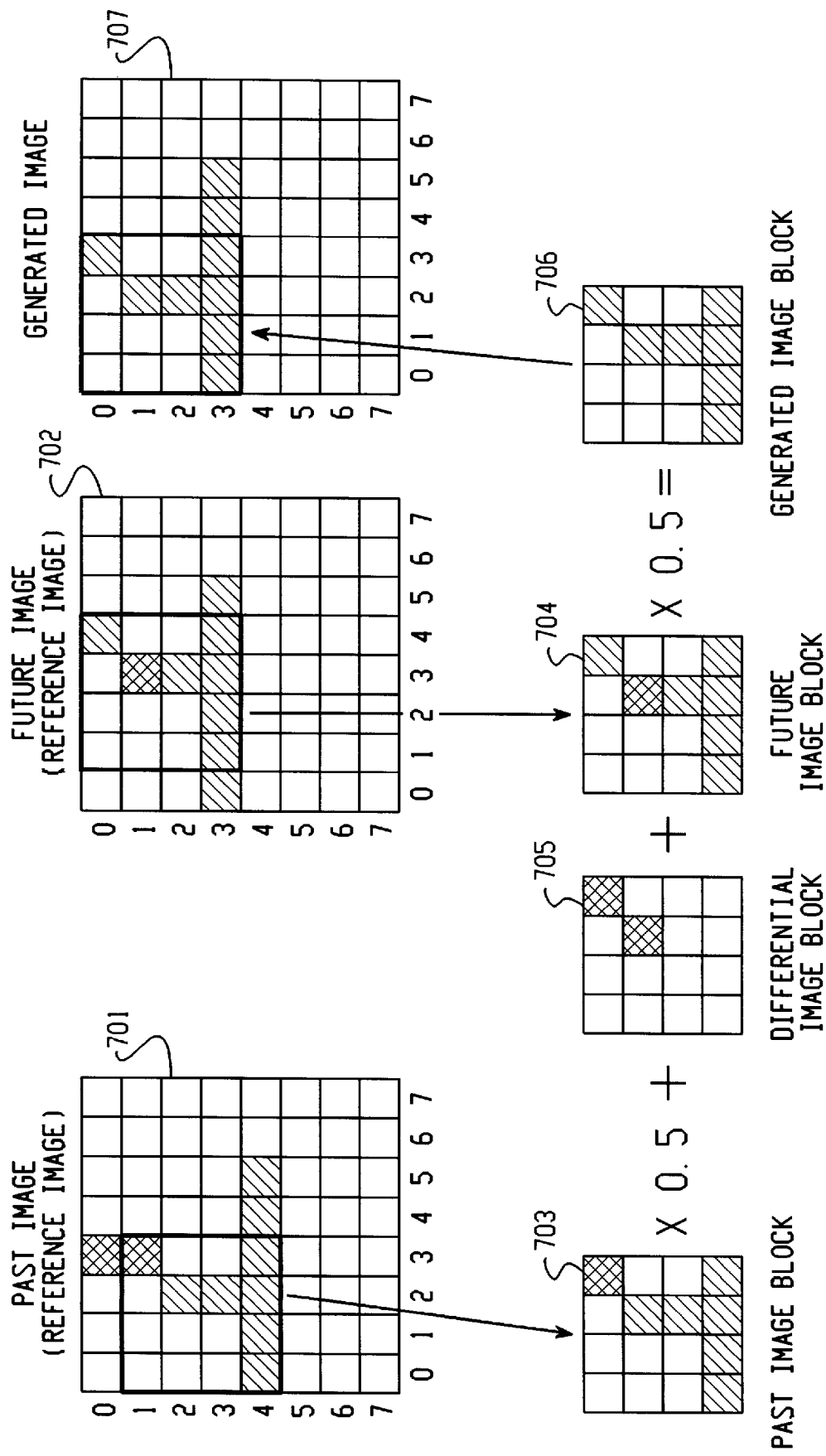
FIG. 8 illustrates a bidirectional motion compensation processing procedure in the present invention.

In FIG. 8, a past image 701 serves as a reference image for forward motion compensation. A future image 702 serves as a reference image for backward motion compensation. A past image block 703 is selected as a reference of motion compensation in the past image. A future image block 704 serves as a reference of motion compensation in the future image. A differential image block 705 is used for generating a generated image block having the size of 4×4 pixel on the upper left in the generated image by motion compensation. A generated image block 706 is obtained by the bidirectional motion compensation processing procedure. A generated image 707 is an image to be generated.

In the case where the bidirectional motion compensation processing procedure is performed, the CPU 101 performs the same operations as those of the aforementioned forward motion compensation processing procedure at STEP 322 and STEP 323, and directs the image generating apparatus 104 to perform the operation (STEP 341 to STEP 342). In response to this direction, the image generating apparatus 104 operates in the same processing procedure as that of the aforementioned forward motion compensation processing procedure. However, as shown in Table 1, the first multiplier and the second multiplier generated in the multiplier generator 207 are "0.5" and "1.0", respectively. As a result of forward motion compensation processing procedure, the sum of the generated image block, half of the pixel data of the past image block 703, and the pixel data of the differential image block 705 is obtained.

Thereafter, the CPU 101 controls the operation similar to that performed at STEP 332 and STEP 333 of the backward motion compensation processing procedure, and directs the image generating apparatus 104 to perform the operation (STEP 343 to STEP 344).

In response to this direction, the image generating apparatus 104 operates in the same processing procedure as that of the backward motion compensation processing procedure. First, the image block generated by the forward motion compensation processing procedure is transferred to the block image memory as a differential image block (FIG. 6). Next, the motion compensation processing procedure is performed in accordance with the procedure shown in FIG. 5. However, as shown in Table 1, the first multiplier and the second multiplier generated in the multiplier generator 207 are "0.5" and "1.0", respectively. As a result of the backward motion compensation processing procedure, the generated image block 706 is obtained.

Figure 9:
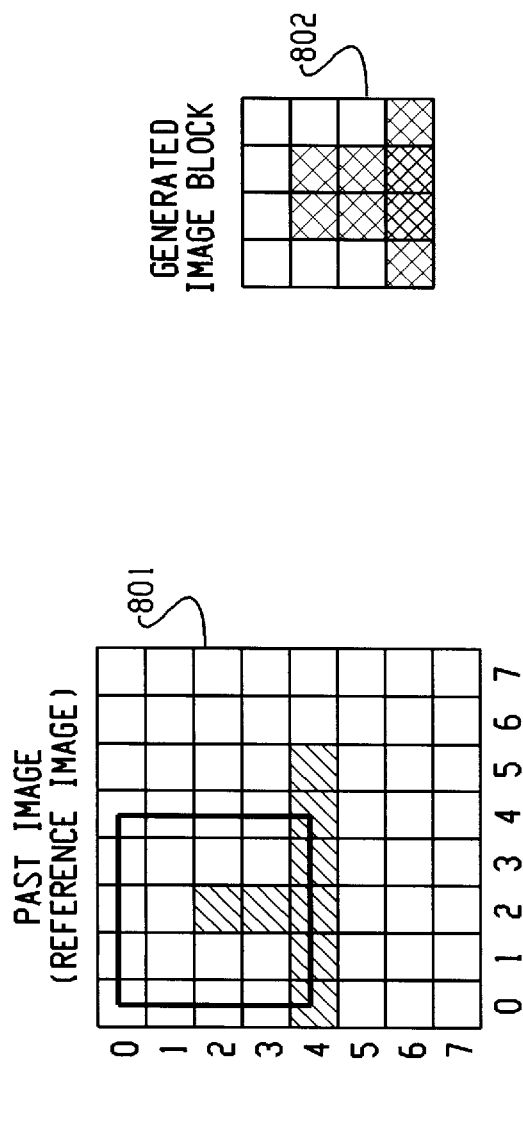
FIG. 9 is illustrates a half-pixel precision motion compensation processing procedure in the present invention.

Next, half-pixel precision motion compensation processing procedure will be described with reference to FIG. 9.

The forward motion compensation and the bidirectional motion compensation are operated in the same operation procedure as that described above. In the case where the specified position of the reference image block in the reference image is shifted by a half pixel from the position where the pixel is present, however, interpolation should be performed to obtain a reference image block among a plurality of image blocks. This processing procedure is shown in FIGS. 4A–4B. Herein, the case where the position is specified with half-pixel precision both vertically and horizontally will be described.

The image serving as a reference for motion compensation is a reference image 801. In the case where an image block to be generated at this point in time is a generated image block 802, the position of the reference image block is specified to a rectangular region (0.5, 0.5)-(3.5, 3.5) enclosed with a solid line within the reference image 801 in order that the data of the motion compensation differential image block approaches 0 as close as possible. However, since the specified position of the reference image block is shifted by a half pixel from the position where the pixel is present, the reference image block cannot be read out from the reference image 801. Therefore, image blocks which are shifted by a half pixel from the specified position of the reference image block, that is, the image block 803 (0,0)-(3,3), the image block 804 (1,0)-(4,3), the image block 805 (0,1)-(3,4) and the image block 806 (1,1)-(4,4) are selected. A reference image block is obtained by interpolating these four image blocks. When the thus obtained reference image block and motion compensation differential image block are subjected to forward motion compensation processing procedure or bidirectional motion compensation processing procedure as described above, half-pixel precision motion compensation processing is realized.

In Example 1, the interpolation of the four image blocks 803, 804, 805 and 806 and the motion compensation processing procedure are simultaneously performed in the following procedure.

In accordance with the aforementioned procedure (FIGS. 4A–4B), in the vertical and horizontal half-pixel precision motion compensation processing procedure, the processing procedure proceeds to STEP 391. The processing procedure after STEP 391 will be described in detail.

At STEP 391, the CPU 101 directs the image generating apparatus 104 to perform the motion compensation processing procedure for the reference image block 803. The pixel calculation circuit 203 of the image generating apparatus 104 generates "0.25" as the first multiplier (in the case of bidirectional motion compensation, "0.125"). The pixel data in the reference image 803 is multiplied by the first multiplier. The pixel data of the differential image block is added to the result of the multiplication, which is in turn written to the generated image block.

At STEP 392, the generated image block is transferred to the block image memory 205 as a differential image block by the procedure shown in FIG. 6.

At STEP 393, the CPU 101 directs the image generating apparatus 104 to perform motion compensation for the reference image block 804. The pixel calculation circuit 203 of the image generating apparatus 104 generates "0.25" as the first multiplier (in the case of bidirectional motion compensation "0.125"). The pixel data in the reference image 804 is multiplied by the first multiplier. Then, the pixel data of the differential image block is added to the result of the multiplication, which is in turn written to the generated image block.

At STEP 394, the generated image block is transferred to the block image memory 205 as a differential image block by the procedure shown in FIG. 6.

At STEP 395, the CPU 101 directs the image generating apparatus 104 to perform the motion compensation processing procedure for the reference image block 805. The pixel calculation circuit 203 of the image generating apparatus 104 generates "0.25" as the first multiplier (in the case of bidirectional motion compensation, "0.125"). The pixel data in the reference image 804 is multiplied by the first multiplier. The pixel data of the differential image block is added to the result of the multiplication, which is in turn written to the generated image block.

At STEP 396, the generated image block is transferred to the block image memory 205 as a differential image block by the procedure shown in FIG. 6.

At STEP 397, the CPU 101 directs the image generating apparatus 104 to perform motion compensation for the reference image block 806. The pixel calculation circuit 203 of the image generating apparatus 104 generates "0.25" as the first multiplier (in the case of bidirectional motion compensation, "0.125"). The pixel data in the reference image 806 is multiplied by the first multiplier. The pixel data of the differential image block is added to the result of the multiplication, which is in turn written to the generated image block 802.

Half-pixel precision motion compensation only in a vertical or horizontal direction can be realized by processing similar to that described above, as shown in FIGS. 4A–4B.

In this manner, in Example 1, it is possible to simultaneously perform the interpolation for obtaining a reference image block and motion compensation. Therefore, half-pixel precision motion compensation processing procedure can be realized.

Figure 10:
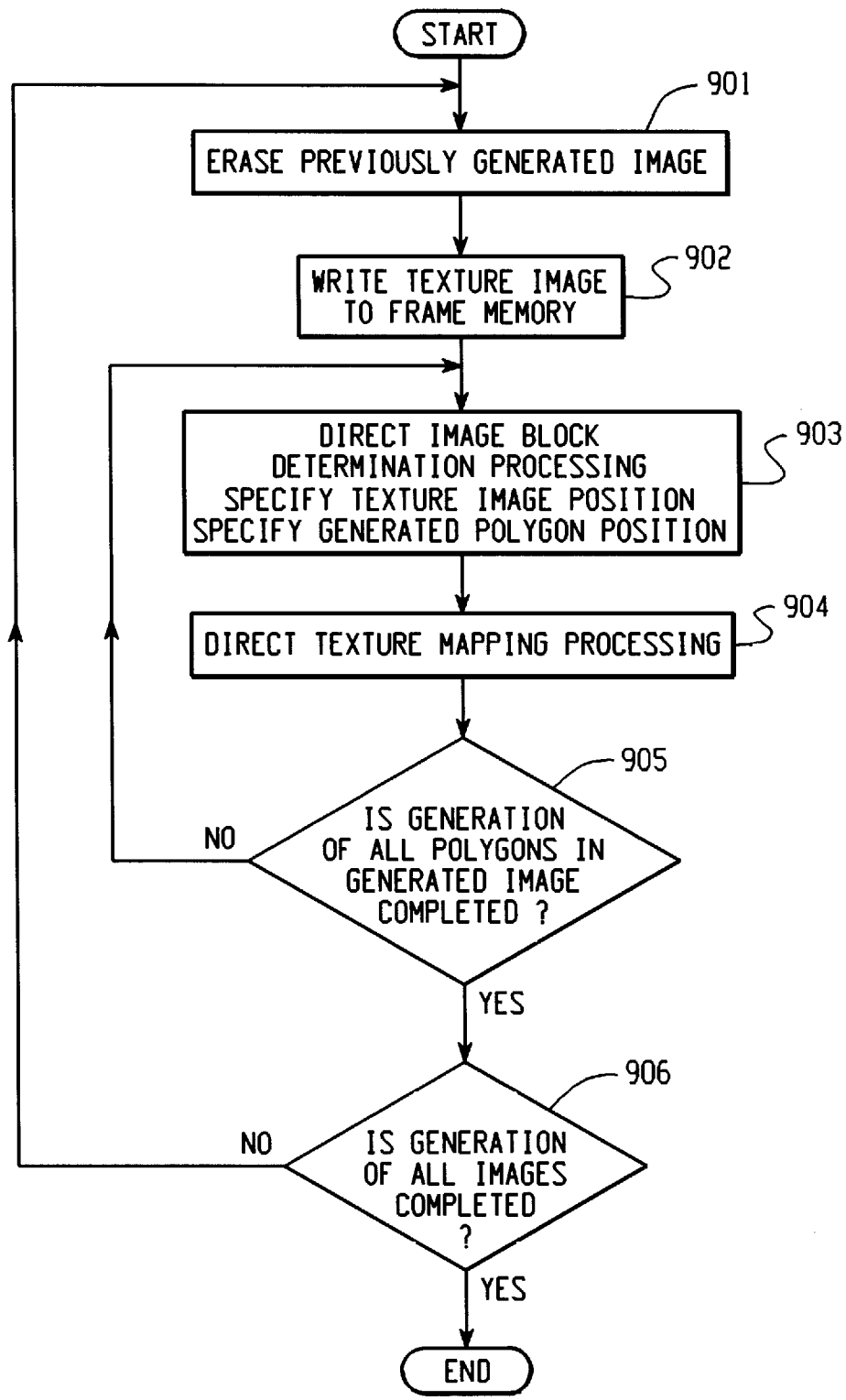
FIG. 10 is a flow chart for controlling the operation of an image generating apparatus by a CPU when performing a texture mapping processing procedure in the present invention.
Figure 11:
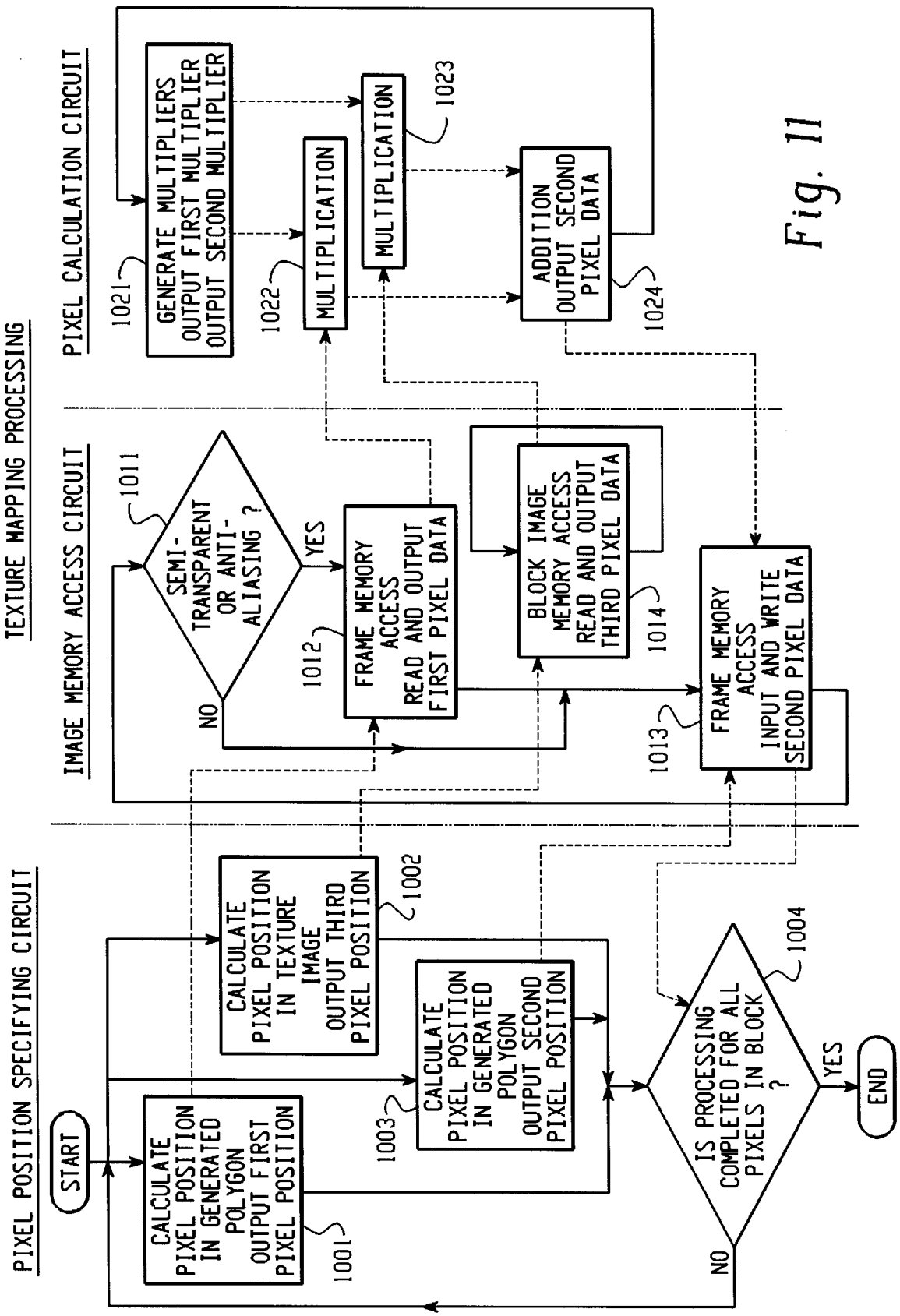
FIG. 11 is a flow chart of each circuit in the image generating apparatus when performing a texture mapping processing procedure in the present invention.

Next, the operation of the image generating apparatus 104 for texture mapping will be described. The procedure for controlling the image generating apparatus 104 by the CPU 101 is shown in FIG. 10, and the operation procedure of each circuit of the image generating apparatus 104 will be shown in FIG. 11. In FIG. 11, an arrow in a broken line represents the flow of data/control signal, while an arrow in a solid line represents the flow of processing procedure.

First, the procedure for controlling the image generating apparatus 104 by the CPU 101 when performing the texture mapping is described with reference to FIG. 10.

At STEP 901, the image in the frame memory 109, which is generated in the previous processing procedure, is erased.

At STEP 902, a texture image is written to the frame memory 109.

At STEP 903, the CPU 101 directs the image generating apparatus 104 to perform the image block determination processing procedure. By this direction, the position of a polygon to be generated (the positions of vertices) and the position of the texture image to be mapped to the generated polygon are specified. Furthermore, the CPU 101 directs the image generating apparatus 104 to transfer the specified texture image to the block image memory 205.

At STEP 904, the CPU 101 directs the image generating apparatus 104 to perform the texture mapping processing procedure.

At STEP 905, it is determined whether or not texture mapping is completed for all of the polygons in the generated image. If processing procedure is completed, processing proceeds to STEP 906. If not, processing proceeds to STEP 903 where a next image block is subjected to the image block determination processing procedure.

At STEP 906, it is determined whether or not texture mapping is completed for all of the images. If not, processing proceeds to STEP 901 where processing for a next image is started.

The operation procedure of the image generating apparatus 104 which is controlled as described above by the CPU 101 so as to perform texture mapping will be described with reference to FIGS. 11 and 6. The operation procedure will be described for each type of direction of operation issued by the CPU 101.

The operation procedure in the case where the CPU 101 directs the image generating apparatus 104 to perform texture mapping is shown in FIG. 11. In this processing procedure, the direction issued by the CPU 101 is analyzed by the control circuit 201 of the image generating apparatus 104. As a result, a command signal for controlling the operation of the pixel position specifying circuit 202 and the multiplier generator 207 of the pixel calculation circuit 203 is output.

The pixel position specifying circuit 202 operates according to the following procedure.

At STEP 1001, the pixel position in a generated polygon (first pixel position) is obtained. The thus obtained pixel position is output to the image memory access circuit 204 as the first pixel position signal 20b.

Simultaneously, at STEP 1002, the pixel position (third pixel position) of a texture to be mapped to the first pixel position is obtained. The pixel position is output to the image memory access circuit 204 as the third pixel position signal 20d.

Simultaneously, at STEP 1003, the same pixel position (second pixel position) as that of the first pixel position is output to the image memory access circuit 204 as the second pixel position signal 20c.

At STEP 1004, it is determined whether or not processing is completed for all of the pixels in the generated image block after the second image data is written to the second pixel position output at STEP 1003. If not, processing proceeds to STEP 1001, STEP 1002 and STEP 1003.

When the pixel position specifying circuit 202 specifies the pixels, either the generated polygon or the texture image block is selected. Then, the pixel on a horizontal line, that is, a scan line including the selected block are sequentially specified. When processing procedure for one horizontal line is completed, the pixels on a next horizontal line are sequentially specified. The completion of processing for the pixels of all of the horizontal lines means that processing for all of the pixels in the image block is completed.

The image memory access circuit 204 is operated according to the following procedure.

At STEP 1011, it is determined whether or not a semi-transparent texture image is to be subjected to texture mapping or the pixel is to be subjected to anti-aliasing. If semi-transparent texture mapping or anti-aliasing is performed, processing proceeds to STEP 1012. If not, processing proceeds to STEP 1013.

At STEP 1012, the first pixel position signal 20b is input to read out the image data at the specified pixel position in the frame memory 109. The image data is output as the first image data signal 20e.

At STEP 1013, the second pixel position signal 20c and the second image data signal 20f are input to write the image data to the specified pixel position in the frame memory 109.

At STEP 1014, the third pixel position signal 20d is input to read out the image data at the specified pixel position in the block image memory 205. The obtained pixel data is output as the third image data signal 20g.

The pixel calculation circuit 203 operates according to the following procedure.

At STEP 1021, a semi-transparency α (in the case where the image is opaque, 1; and in the case where the image is transparent, 0) in the texture mapping procedure directed by the CPU 101 via the control circuit 201 and a semi-transparent coefficient β for anti-aliasing of edge (in the case where the pixel being processed does not constitute an edge of a polygon, β=1) are calculated. Then, αβ is output to the second multiplication section as the second multiplier, while (1−αβ) is output to the first multiplication section as the first multiplier.

At STEP 1022, the image data input as the first image data signal 20e is multiplied by the first multiplier in the first multiplication section 209.

At STEP 1023, the image data input as the third image data signal 20g is multiplied by the second multiplier in the second multiplication section 208.

At STEP 1024, the addition section 210 adds the result obtained in the first multiplication section 209 and the result obtained in the second multiplication section 208, and outputs the result of the addition as the second image data signal 20f.

In the case where the CPU 101 directs the image generating apparatus 104 to perform the image block determination processing procedure, processing is the same as that described for motion compensation. In the case where the texture image is indicated to be transferred in the image block determination processing procedure, the operation shown in FIG. 6 is performed to transfer the texture image from the frame memory to the block image memory.

At STEP 501, the pixel position (fourth pixel position) in the texture image is obtained. The obtained pixel position is output to the image memory access circuit 204 as the fourth pixel position signal 20h.

At STEP 502, the pixel position (fifth pixel position) in the block image memory is obtained. The pixel position is output to the image memory access circuit 204 as the fifth pixel position signal 20i.

At STEP 503, whether or not processing procedure is completed for all of the pixels in the generated image block after the fifth image data is written to the fifth pixel position output at STEP 502 is obtained. If not, processing procedure proceeds to STEP 501 and STEP 502.

At STEP 511, the fourth pixel position signal 20h is input to read out the image data at the specified pixel position in the frame memory 109. The image data is output as the fourth image data signal 20j. The fourth image data signal 20j is output as a fifth data signal 20k via the image transfer circuit.

At STEP 512, the fifth pixel position signal 20i and the fifth image data signal 20k are input, so that the image data is written to the specified pixel position in the block image memory 205.

By the aforementioned procedure, the image generating apparatus of Example 1 realizes the texture mapping processing procedure.

Figure 12:
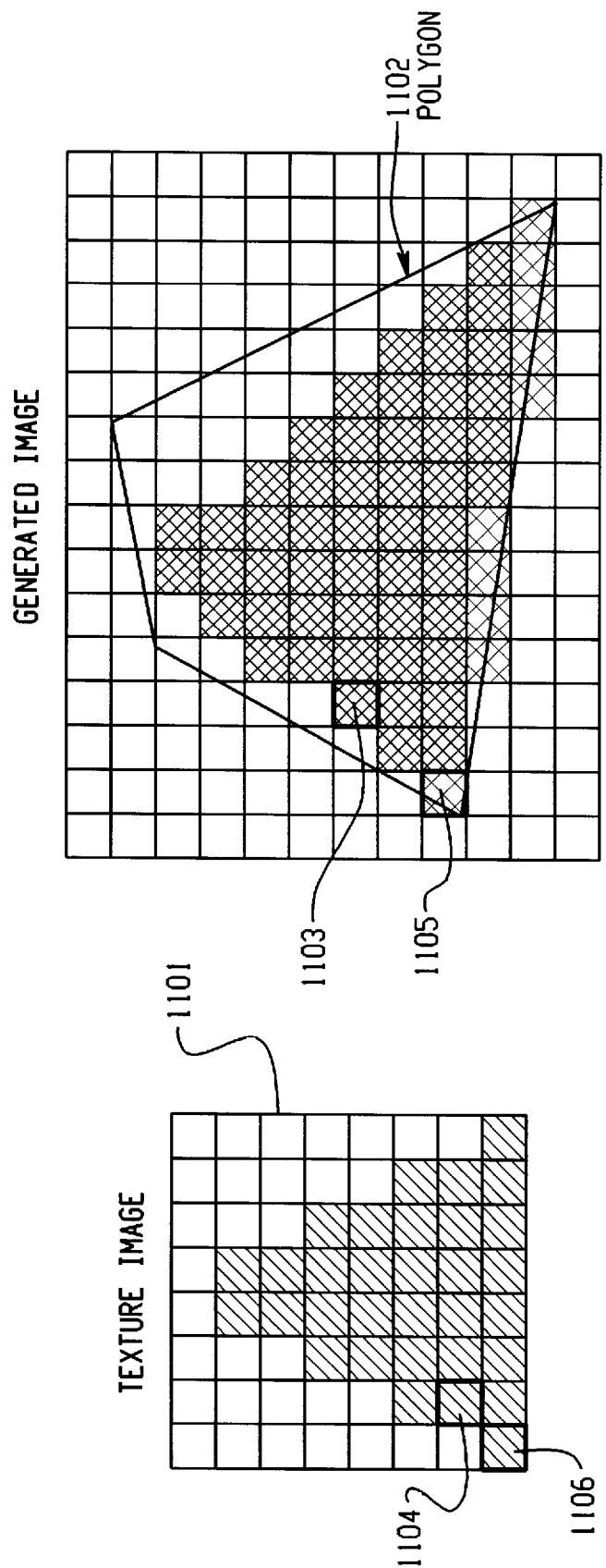
FIG. 12 illustrates a texture mapping processing procedure according to the present invention.
Figure 13A:
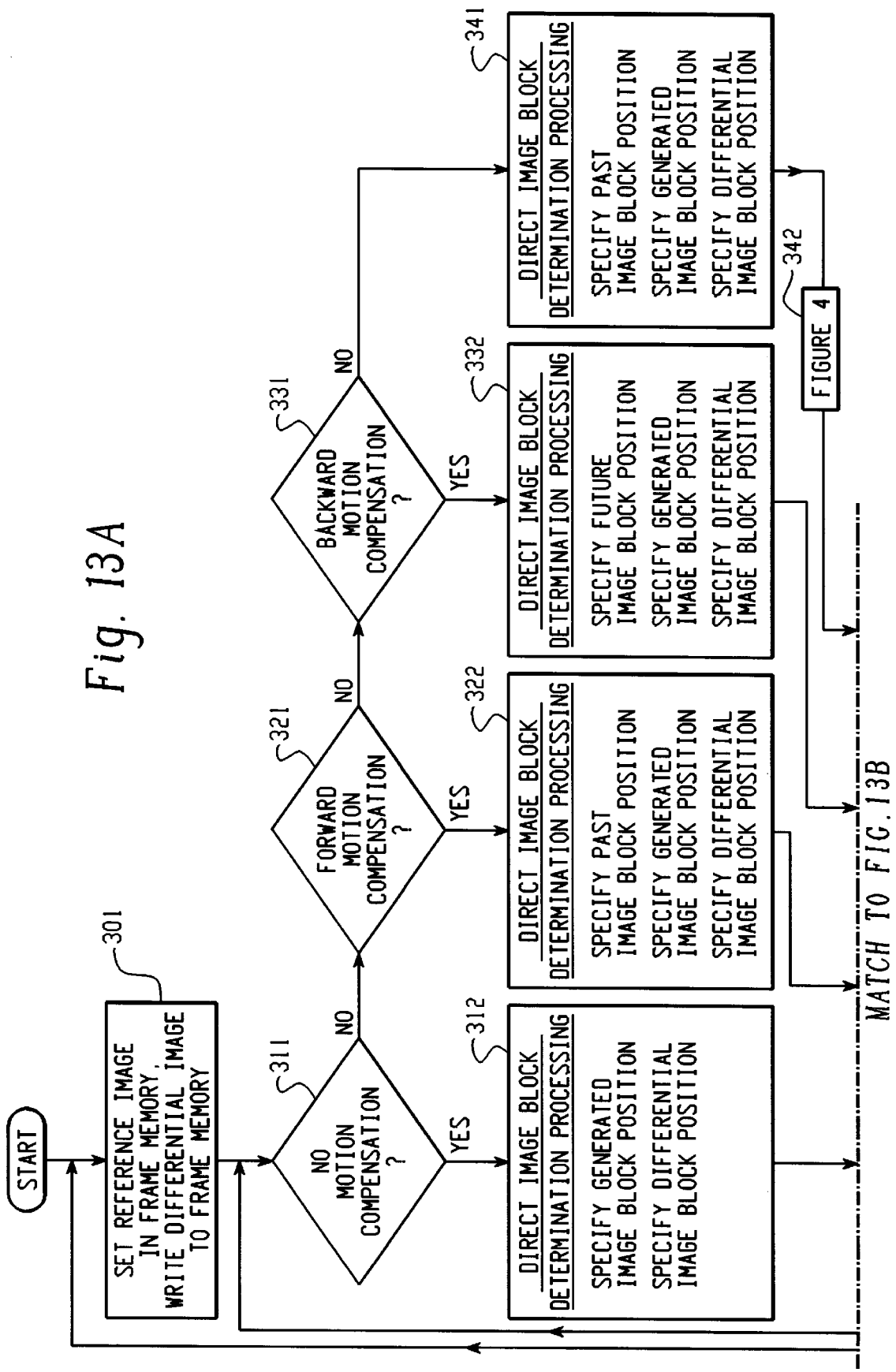
FIGS. 13A and 13B are a flow chart of the operation of an image generating apparatus by a CPU when simultaneously performing a motion compensation processing procedure and a texture mapping processing procedure in Example 1 of the present invention.
Figure 13B:
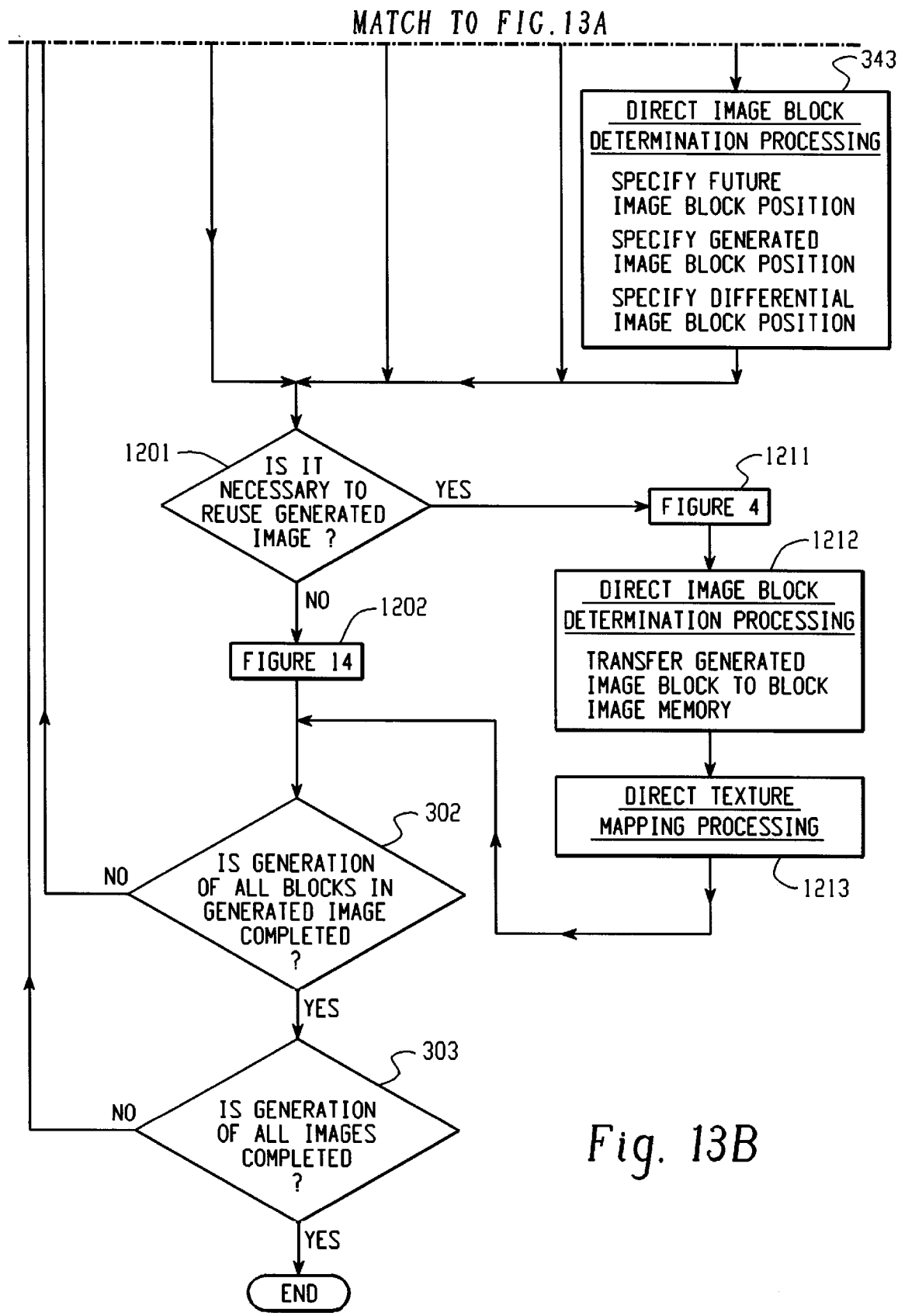

In accordance with the aforementioned operation procedure of texture mapping, the operation of the image generating apparatus 104 for texture mapping will be specifically described with reference to FIG. 12 in association with FIGS. 10 and 11. In FIG. 12, an image 1101 is a texture image. The texture image 1101 is mapped to a polygon 1102. A pixel 1103 is one of the pixels constituting the polygon 1102. A pixel 1105 is a pixel constituting an edge of the polygon 1102. A pixel 1106 is a pixel of the texture image corresponding to the pixel 1105 of the polygon 1102.

The operation of the image generating apparatus 104 for texture mapping is as follows.

The texture image 1101 is stored in the frame memory 109 (STEP 902).

The CPU 101 directs the image generating apparatus 104 to perform the image block determination processing procedure. The coordinates of vertices of the polygon and the semi-transparency of the texture (in this case, it is assumed that a semi-transparency of the entire texture is 0.6) are set to the pixel position specifying circuit 202 and the multiplier generator 207 of the pixel calculation circuit 203 via the control circuit 201. Then, the CPU 101 directs the image transfer circuit 206 to transfer the texture image (STEP 903).

The image transfer circuit 206 sequentially outputs the pixel position of the texture image in the frame memory 109 as the fourth pixel position to the first image memory access section 212 of the image memory access circuit 204 (STEP 501). The first image memory access section 212 reads out the texture image data from the frame memory 109, and outputs it as the fourth pixel data (STEP 511). The fourth pixel data is input to the image transfer circuit, which is in turn output as the fifth pixel data. Simultaneously, the stored pixel position of the texture image in the block image memory is sequentially output as the fifth pixel position (STEP 502). The fifth pixel position and the fifth pixel data are input to the image memory access section of the image memory access circuit. The fifth image data is written to the fifth pixel position in the block image memory (STEP 512). The operation is repeated for all of the pixels in the texture image (STEP 503), thereby transferring the texture image to the block image memory.

Next, the CPU 101 directs the image generating apparatus 104 to perform the texture mapping processing procedure. In response to this direction, the image generating apparatus 104 performs texture mapping in accordance with the procedure shown in FIG. 11.

The pixel position specifying circuit 202 sequentially calculates the pixel position (first pixel position) in the generated polygon 1102. The pixel position is output as the first pixel position signal 20b. It is assumed that the pixel 1103 is to be generated. The pixel position of the pixel 1103 is output as a first pixel position. On the other hand, the pixel position (third pixel position) of the pixel 1104 in the texture image 1101, which is mapped to the pixel 1103, is calculated. The pixel position is output as the third pixel position signal 20d. The same pixel position as that of the first pixel position is output as the second pixel position signal 20c (STEP 1001, STEP 1002 and STEP 1003).

In order to perform the semi-transparent texture mapping, the first image memory access section 212 in the image memory access circuit 204 receives the first pixel position signal 20b so as to read out the pixel data from the generated polygon 1102 in the frame memory 109. The first image memory access section 212 outputs the pixel data as the first pixel data signal 20e. This pixel data serves as background pixel data (STEP 1012). The second image memory access section 211 receives the third pixel position signal 20d so as to read out the pixel data from the texture image 1101 in the block image memory 205. The second image memory access section 211 outputs the pixel data as the third pixel data signal 20g (STEP 1014).

The multiplier generator 207 in the pixel calculation circuit 203 generates 0.4 as the first multiplier and 0.6 as the second multiplier based on the semi-transparency of 0.6 (STEP 1021). The first multiplication section 209 multiplies the pixel data input by the first pixel data signal 20e by the first multiplier, and outputs the result of the multiplication to the addition section 210 (STEP 1022). The second multiplication section 208 multiplies the pixel data input by the third pixel data signal 20g and the second multiplier together, and outputs the result of the multiplication to the addition section 210 (STEP 1023). The addition section 210 adds the result of the first multiplication section 209 and the second multiplication section 208, and outputs the sum as the first pixel data signal 20f (STEP 1024). As a result, 0.6×(texture pixel data)+0.4×(background pixel data) is output as the second pixel data.

Next, the first image memory access section 212 receives the second pixel position signal 20c and the second pixel data signal 20f, and writes the pixel data to the pixel position of the pixel 1103 in the generated polygon 1102 (STEP 1013). In this manner, the pixel data 1104 of the texture image is texture mapped.

Next, the case where the pixel 1105 constituting the edge of the generated polygon 1102 is to be generated will be considered. It is assumed that 70% of the area of the pixel 1105 is located within the polygon 1102 and the remaining 30% of the area is located outside the polygon 1102. In this case, the multiplier generator 207 outputs (1−0.6×0.7)=0.58 as the first multiplier and 0.6×0.7=0.42 as the second multiplier. As a result of calculation in the pixel calculation circuit, 0.42×(texture pixel data)+0.58×(background pixel data) is output as the second pixel data signal. This pixel data is written to the pixel 1105 in the generated polygon 1102.

Until all of the pixels in the generated polygon 1102 are generated, the processing procedure shown in FIG. 11 is repeated for each pixel in the generated polygon 1102 (STEP 1004).

By performing the processing procedure in this manner, the texture image 1101 is texture mapped to the generated polygon 1102.

As described above, according to Example 1, the texture mapping of the semi-transparent texture image can be performed along with anti-aliasing of the polygon edge portion.

Next, the operation of the image generating apparatus 104 for simultaneously performing the motion compensation and the texture mapping will be described. FIGS. 13A–13B and 14A–14B show the procedure for controlling the image generating apparatus 104 by the CPU 101, and FIG. 15 shows the operation procedure of each circuit of the image generating apparatus 104. In FIG. 15, an arrow in a broken line represents the flow of data/control signal, and an arrow in a solid line represents the flow of processing procedure. In FIGS. 13A–13B, 14A–14B and 15, the same steps as those in the motion compensation described above (with reference to FIGS. 3A–3B, 4A–4B and 5) are denoted by the same reference numerals.

The procedure of the CPU 101 for controlling the image generating apparatus 104 when simultaneously performing motion compensation and texture mapping is described with reference to FIGS. 13A–13B and 14A–14B. The description of the same steps as those in the case where the motion compensation alone is performed is herein omitted for simplification.

When processing proceeds to STEP 1201, it is determined whether or not the image which is to be subjected to motion compensation, that is, the generated image, is used as a reference image in subsequent motion compensation of the image.

In the case where the image is used as a reference image, the procedure proceeds from STEP 1211 to STEP 1213. The motion compensation processing procedure (FIGS. 4A–4B) of the image block which is currently processed is completed (STEP 1211). After the generated image block is generated, the generated image block is transferred to the block image memory 205 so as to be used as a texture image (STEP 1212). Then, the image generating apparatus 104 is directed to implement the texture mapping processing procedure (STEP 1213). In the case where the generated image is required for subsequent motion compensation processing, texture mapping is performed after the generated image block is obtained. In the case where the image is compression coded by MPEG, the image obtained by expanding an I picture is used for motion compensation of a P picture and a B picture while the image obtained by expanding a P picture is used for motion compensation of another P picture and B picture in some cases. For such images, the aforementioned processing procedure is performed. The operation procedure of the image generating apparatus 104 corresponding to this processing procedure is the same as that shown in FIG. 5 (motion compensation processing procedure) and FIG. 11 (texture mapping processing procedure).

Figure 14A:
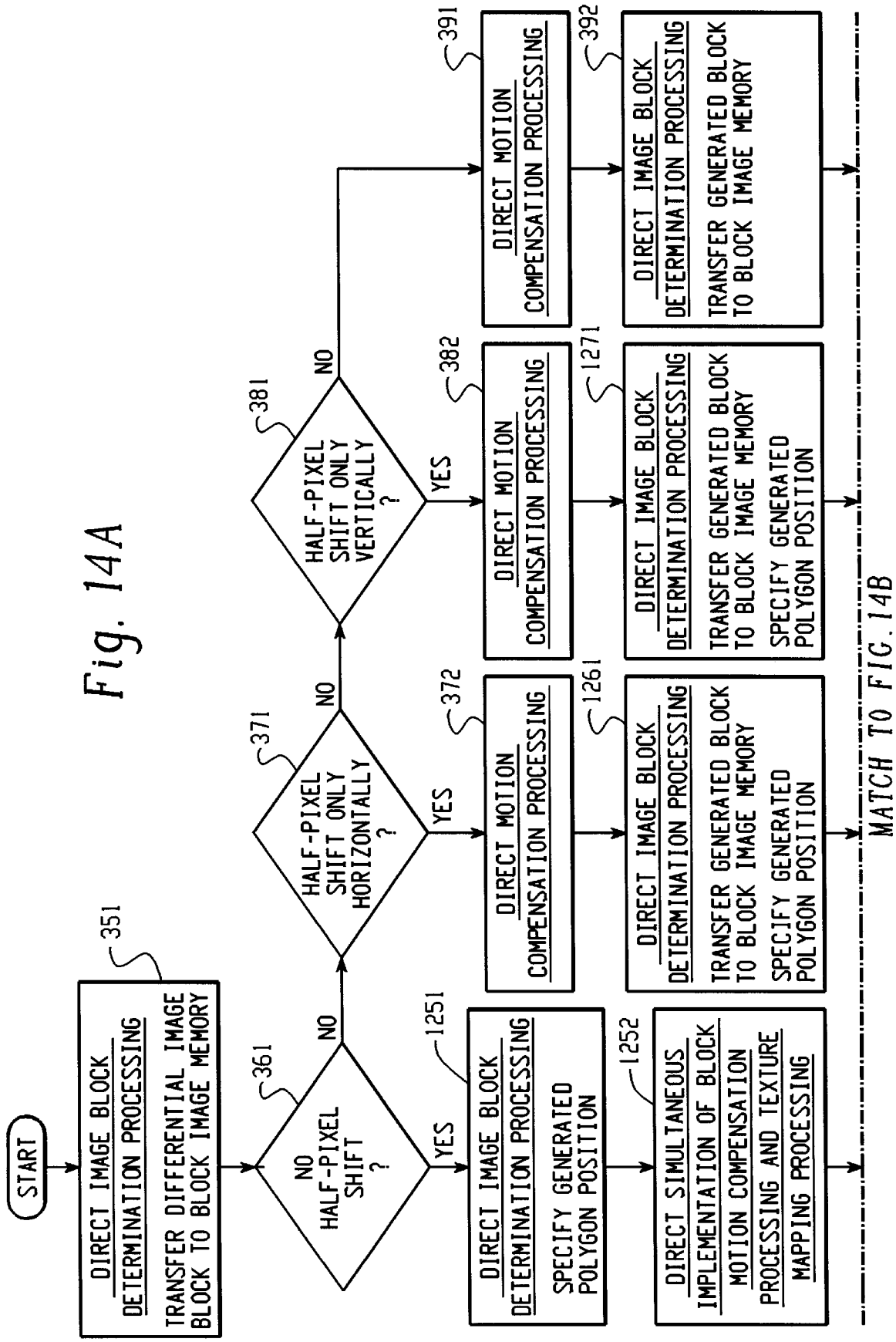
FIGS. 14A and 14B are part of a flow chart of the operation of an image generating apparatus by a CPU when simultaneously performing a motion compensation processing procedure and a texture mapping processing procedure in Example 1 of the present invention.
Figure 14B:
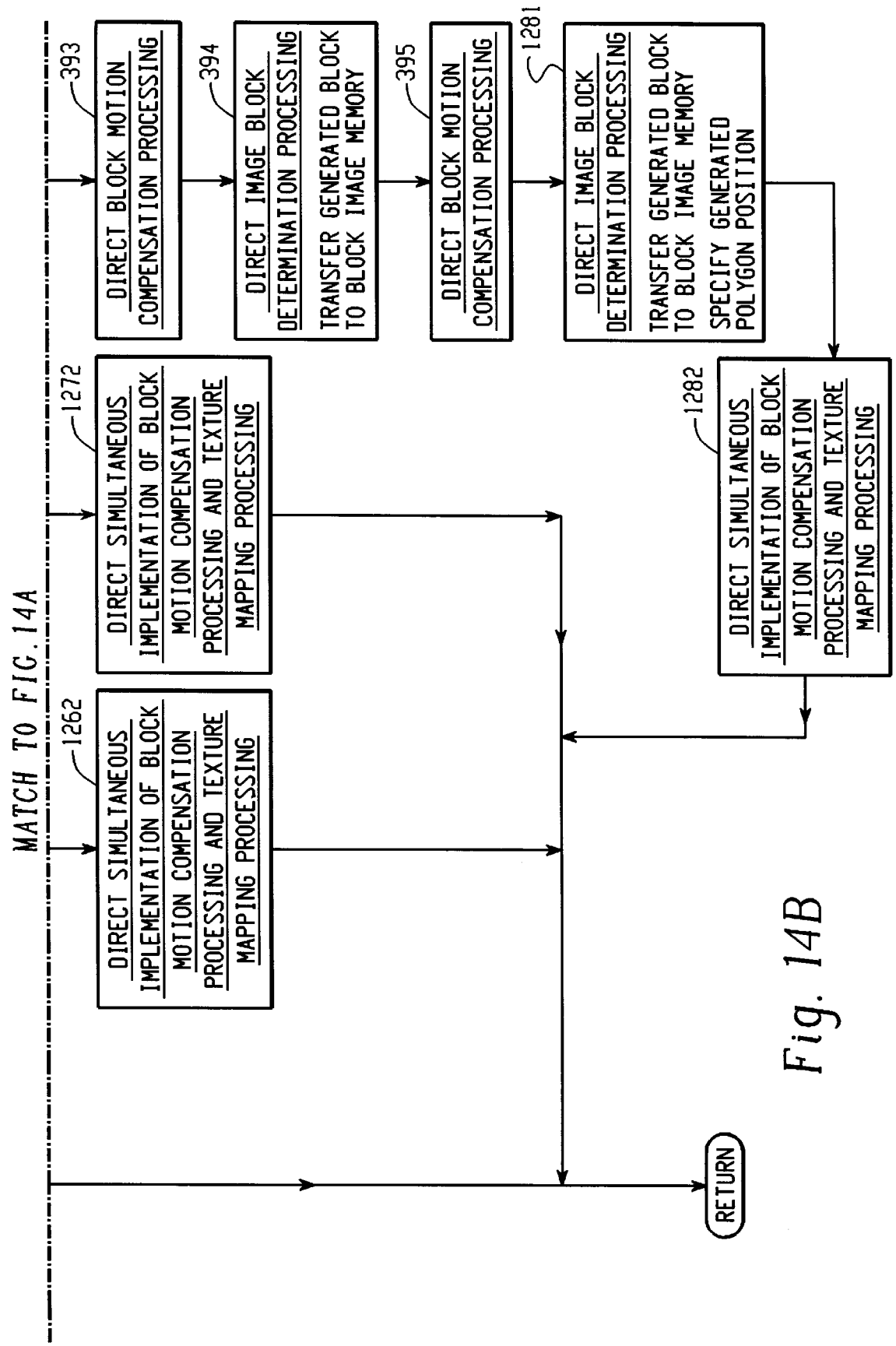
Figure 15:
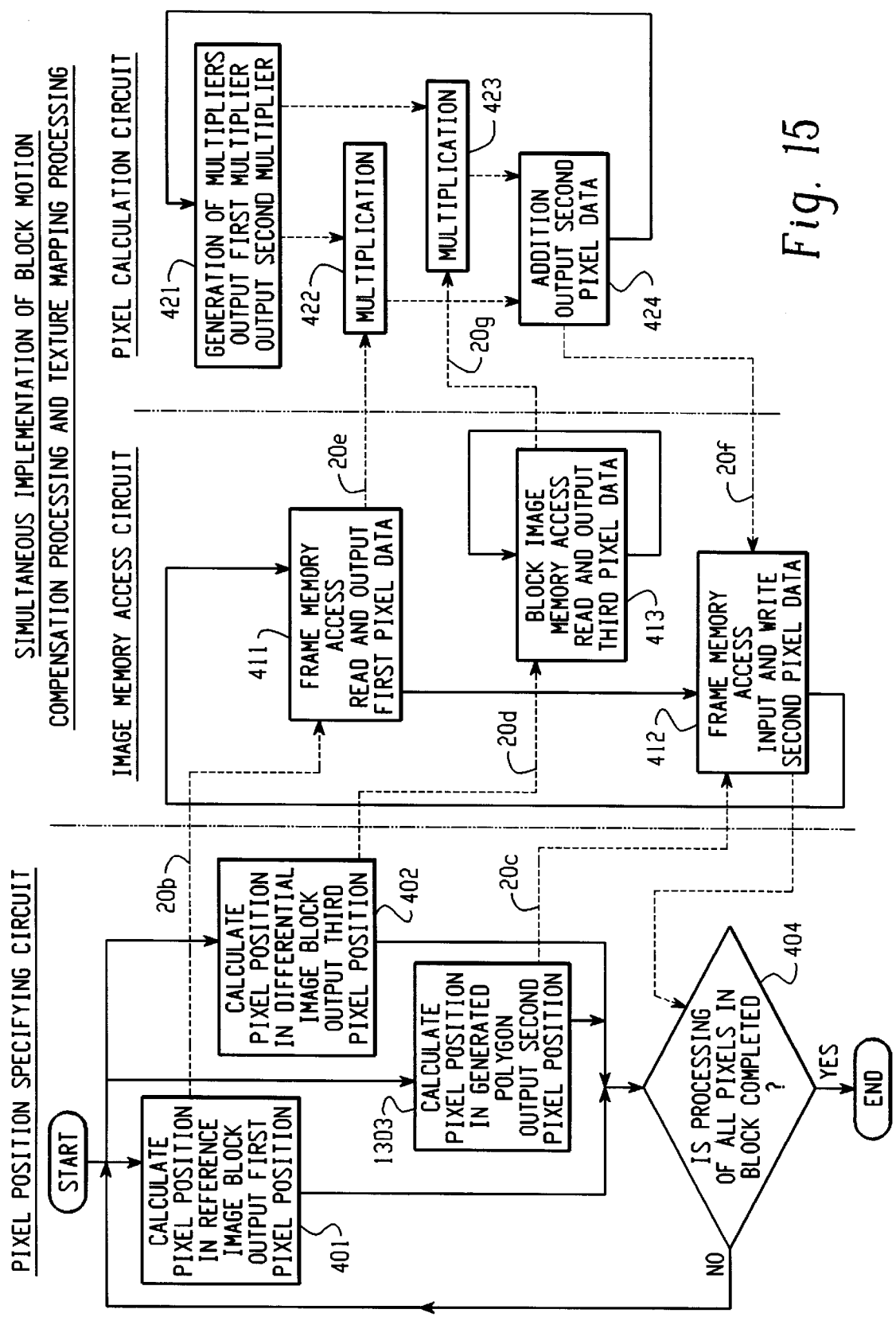
FIG. 15 is a flow chart of the operation of each circuit in an image generating apparatus when simultaneously performing a motion compensation processing procedure and a texture mapping processing procedure in Example 1.

On the other hand, in the case where the image obtained by motion compensation is not used for subsequent motion compensation, for example, in the case of a B picture obtained by MPEG, the motion compensation processing procedure and the texture mapping processing procedure are executed in the procedure performed at STEP 1202 (FIGS. 14A–14B). In FIGS. 14A–14B, the same steps as those in FIGS. 4A–4B are denoted by the same reference numerals, and the description thereof is herein omitted. In the case where a plurality of block motion compensation processing procedures are required to be performed in the processing procedure shown in FIGS. 14A–14B, the processing procedures except for the last motion compensation processing procedure are the same as those in FIGS. 4A and 4B. In FIGS. 14A and 14B, the texture mapping processing procedure is performed simultaneously with the last block motion compensation processing procedure. At STEP 1251, STEP 1261, STEP 1271 and STEP 1281, the CPU 101 directs the image block determination processing procedure. At these steps, the position of the generated polygon is specified. At STEP 1261, STEP 1271, and STEP 1281, the generated image block is transferred to the block image memory 205. Thereafter, the CPU 101 directs the simultaneous implementation of block motion compensation and texture mapping. The operation procedure of the image generating apparatus 104 in the case where the CPU 101 directs the image generating apparatus 104 to perform the image block determination processing procedure for transferring the generated image block to the block image memory 205 is as described above with reference to FIG. 6.

The operation procedure of the image generating apparatus 104 in the case where the CPU 101 directs the image generating apparatus 104 to simultaneously implement the block motion compensation processing procedure and the texture mapping processing procedure is described with reference to FIG. 15. In the operation procedure shown in FIG. 15, the same steps as those in FIG. 5 are denoted by the same reference numerals.

In this processing procedure, the direction of the CPU 101 is analyzed by the control circuit 201 of the image generating apparatus 104. As a result, a command signal for controlling the operation of the pixel position specifying circuit 202 and the multiplier generator 207 of the pixel calculation circuit 203 is output.

The pixel position specifying circuit 202 operates according to the following procedure as shown in FIG. 15.

At STEP 401, the pixel position (first pixel position) in the reference image block is obtained. Then, the pixel position is output to the image memory access circuit 204 as the first pixel position signal 20b.

Simultaneously, at STEP 402, the pixel position (third pixel position) in the differential image block is obtained. The pixel position is output to the image memory access circuit 204 as the third pixel position specifying signal 20d.

Simultaneously, at STEP 1301, the pixel position (second pixel position) in the generated polygon is obtained. The pixel position is output to the image memory access circuit 204 as the second pixel position signal 20c.

At STEP 404, after the second image data is written to the second pixel position output at STEP 1301, it is determined whether or not processing is completed for all of the pixels in the generated polygon. If not, processing proceeds to STEP 401, STEP 402 and STEP 1301.

The image memory access circuit 204 operates according to the following procedure.

At STEP 411, the first pixel position signal 20b is input so as to read out the image data at the specified pixel position in the frame memory 109. The image data is output as the first image data signal 20e.

At STEP 412, the second pixel position signal 20c and the second image data signal 20f are input so as to write the image data to the specified pixel position in the frame memory 109.

At STEP 413, the third pixel position signal 20d is input so as to read out the image data at the specified pixel position in the block image memory 205. The image data is output as the third image data signal 20g.

The pixel calculation circuit 203 operates according to the following procedure.

At STEP 421, the multiplier generator 207 outputs the first multiplier and the second multiplier as shown in Table 1 in accordance with the type of motion compensation processing procedure directed by the CPU 101 via the control circuit 201.

At STEP 422, the first multiplication section 209 multiplies the image data input as the first image data signal 20e by the first multiplier.

At STEP 423, the second multiplication section 208 multiplies the image data input as the third image data signal 20g by the second multiplier.

At STEP 424, the addition section 210 adds the result of the first multiplication section 209 and the result of the second multiplication section 208, and outputs the result of the addition as the second image data signal 20f.

By the above procedure, the image generating apparatus of Example 1 realizes the simultaneous implementation of the motion compensation processing procedure and the texture mapping processing procedure.

Figure 16:
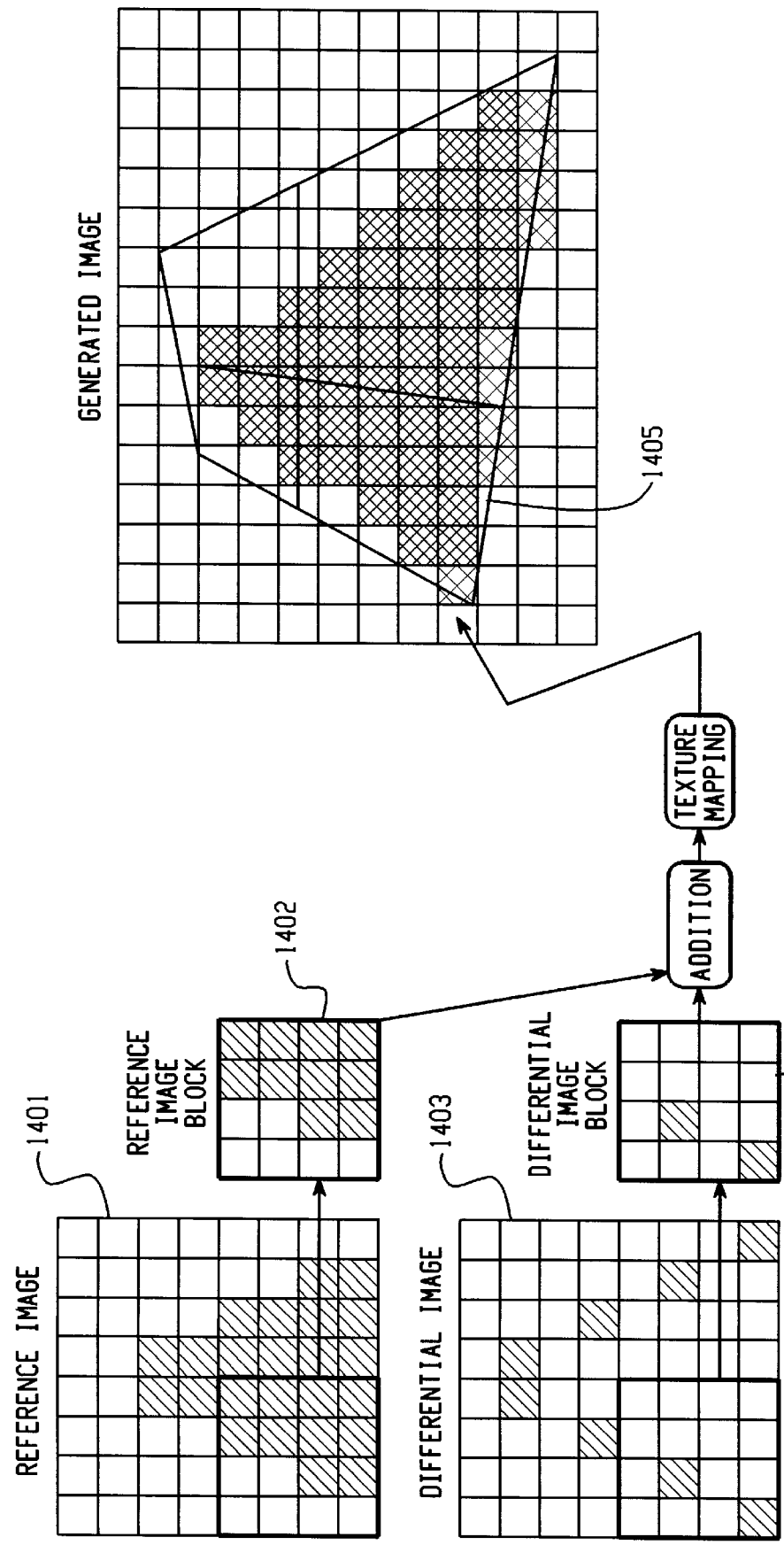
FIG. 16 is illustrates the simultaneous implementation of a motion compensation processing procedure and a texture mapping processing procedure according to the present invention.

Hereinafter, the simultaneous implementation of motion compensation and texture mapping (STEPs 1252, 1262, 1272 and 1282 in FIGS. 14A and 14B and FIG. 15) will be described with reference to FIG. 16.

The frame memory 109 stores a reference image 1401. An image block, which is to be subjected to motion compensation processing procedure, is set to the pixel position specifying circuit 202 as a reference image block 1402. On the other hand, a differential image block 1404 of a differential image 1403 in the frame memory 109 is set so as to transfer the image data of the image block to the block image memory 205 (STEP 1251, STEP 1261, STEP 1271, STEP 1281 in FIGS. 14A and 14B, and FIG. 6). The pixel position specifying circuit 202 outputs the second pixel position signal 20c indicating the pixel position in a generated polygon 1405, the first pixel position signal 20b indicating the pixel position in the reference image block 1402 to be mapped to the second pixel position, and the third pixel position signal 20d indicating the pixel position in the differential image block 1404. The pixel data at the first pixel position (first pixel data) is read out from the frame memory 109 via the first image memory access section 212 while the pixel data at the third pixel position (third pixel data) is read out from the block image memory 205 via the second image memory access section 211. The first pixel data and the third pixel data are respectively multiplied by multipliers shown in Table 1 in the pixel calculation circuit 203. Then, the results of the calculations are added. The result of the addition is output as the second pixel data. By this calculation, the pixel data resulting from the motion compensation is obtained as the second pixel data. The second pixel data is written to the pixel position in the frame memory 109, which is indicated by the second pixel position signal indicating the pixel position in the generated polygon 1405. The second pixel position indicates the pixel position in the generated polygon 1405 which is to be subjected to texture mapping. By writing the second pixel data to the specified pixel position, the texture mapping processing procedure is completed. As described above, it is possible to simultaneously perform the motion compensation processing procedure and the texture mapping processing procedure.

As described above, the image generating apparatus of Example 1 includes: the block image memory 205 for storing a texture image, a motion compensation differential image and the like; the image memory access circuit 204 for accessing the pixel data of the block image memory 205 or the pixel data of the frame memory 109 storing a reference image, a generated polygon and a generated image; the pixel calculation circuit 203 for calculating the third pixel data read out from the block image memory 205 and the first pixel data read out from the frame memory 109 between pixels; the pixel position specifying circuit 202 for generating and specifying the pixel position of the pixel data calculated and the pixel position, to which the pixel data obtained by the calculation is written, in accordance with the processing procedure such as motion compensation processing procedure, texture mapping, and simultaneous implementation of motion compensation and texture mapping; and the image transfer circuit 206 for transferring the image block in the frame memory 109 to the block image memory 205. By such a configuration, it is possible to realize the expansion of a moving picture compressed by using motion prediction such as forward motion compensation, bidirectional motion compensation and half-pixel precision motion compensation, the texture mapping including texture mapping of a semi-transparent texture image and anti-aliasing of a polygon edge, and the simultaneous implementation of motion compensation and texture mapping.

In Example 1, although an image block used for motion compensation has a size of 4×4 pixels for simplification of the description, the size of the image block is not limited to 4×4 pixels. The image block may have other size such as 16×16 pixels and 8×8 pixels. In addition, although an image has the size of 8×8 pixels in Example 1, the image may have any size. Furthermore, the processing procedure order of the image block described in the procedure of motion compensation is not limited to that described in Example 1, and may be changed appropriately. Moreover, the pixels have only one semi-transparency of a semi-transparent texture in the description of texture mapping in Example 1. However, each of the pixels forming a texture may have a respectively different semi-transparency.

EXAMPLE 2

The description of the same components and the same operation of a multimedia apparatus of Example 2 as those in Example 1 is omitted herein.

Figure 17:
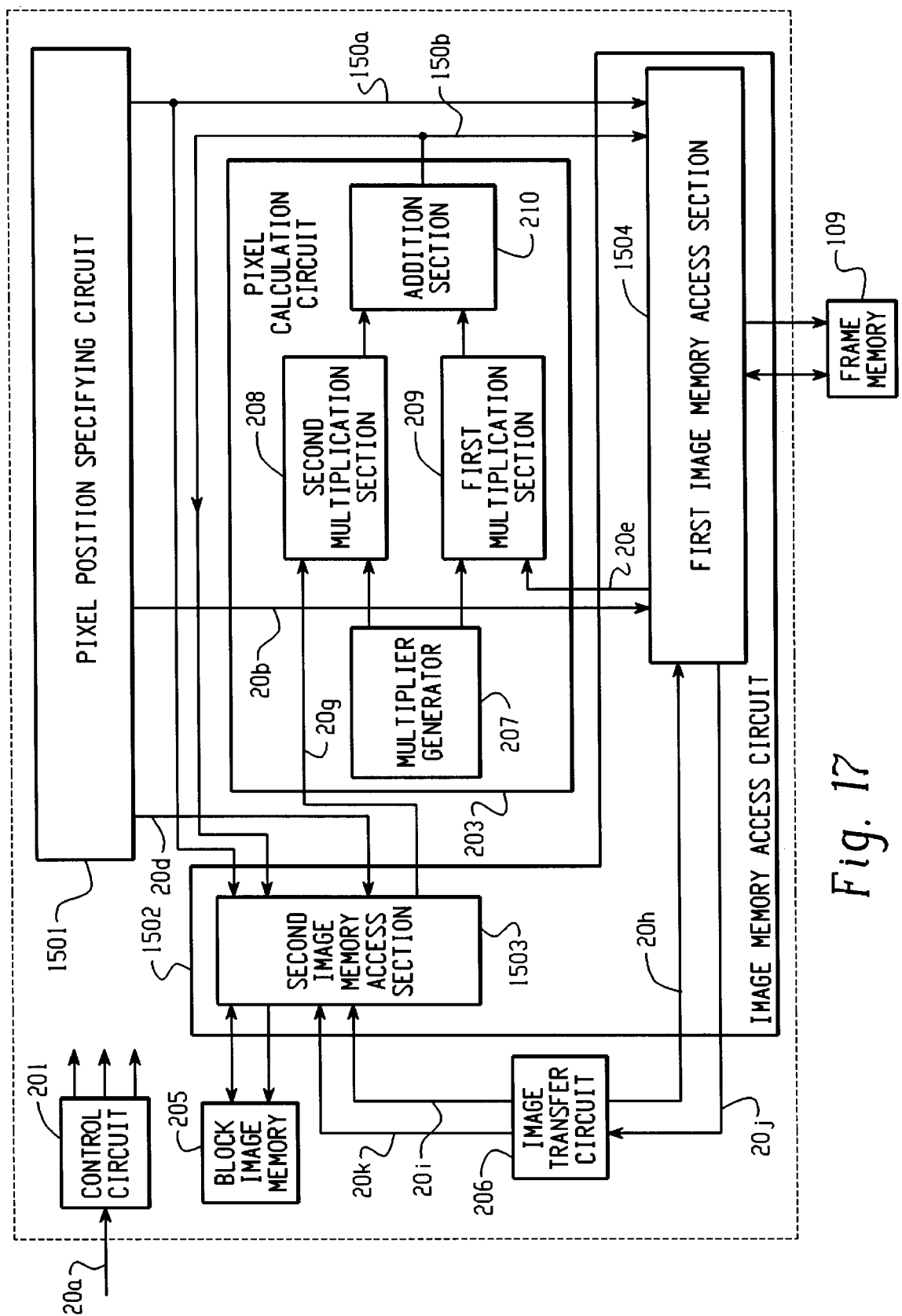
FIG. 17 is a diagram showing the configuration of an image generating apparatus of Example 2 according to the present invention.
Figure 18A:
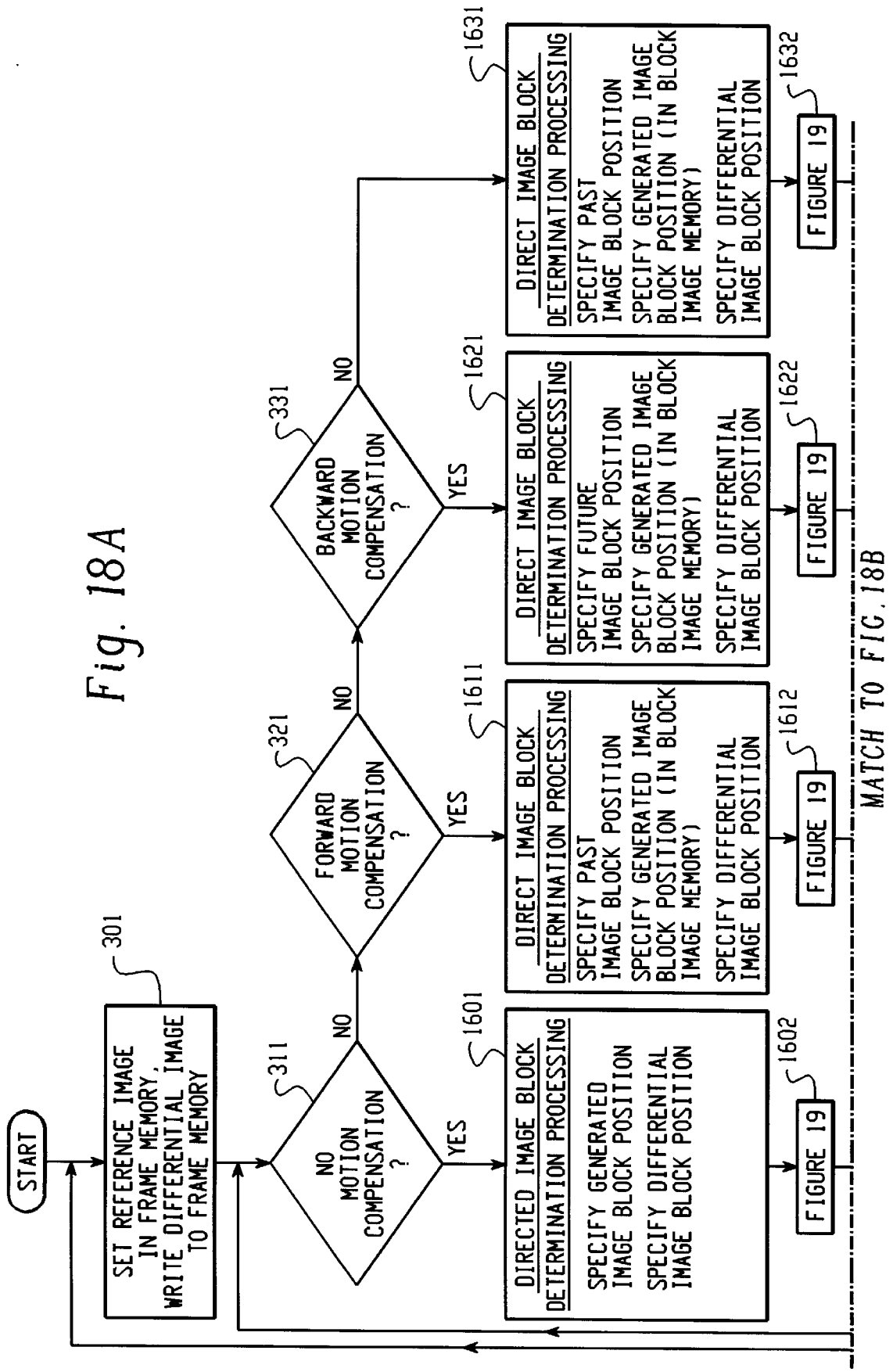
FIGS. 18A and 18B are a flow chart for controlling the operation of an image generating apparatus by a CPU when performing a motion compensation processing procedure in Example 2.
Figure 18B:
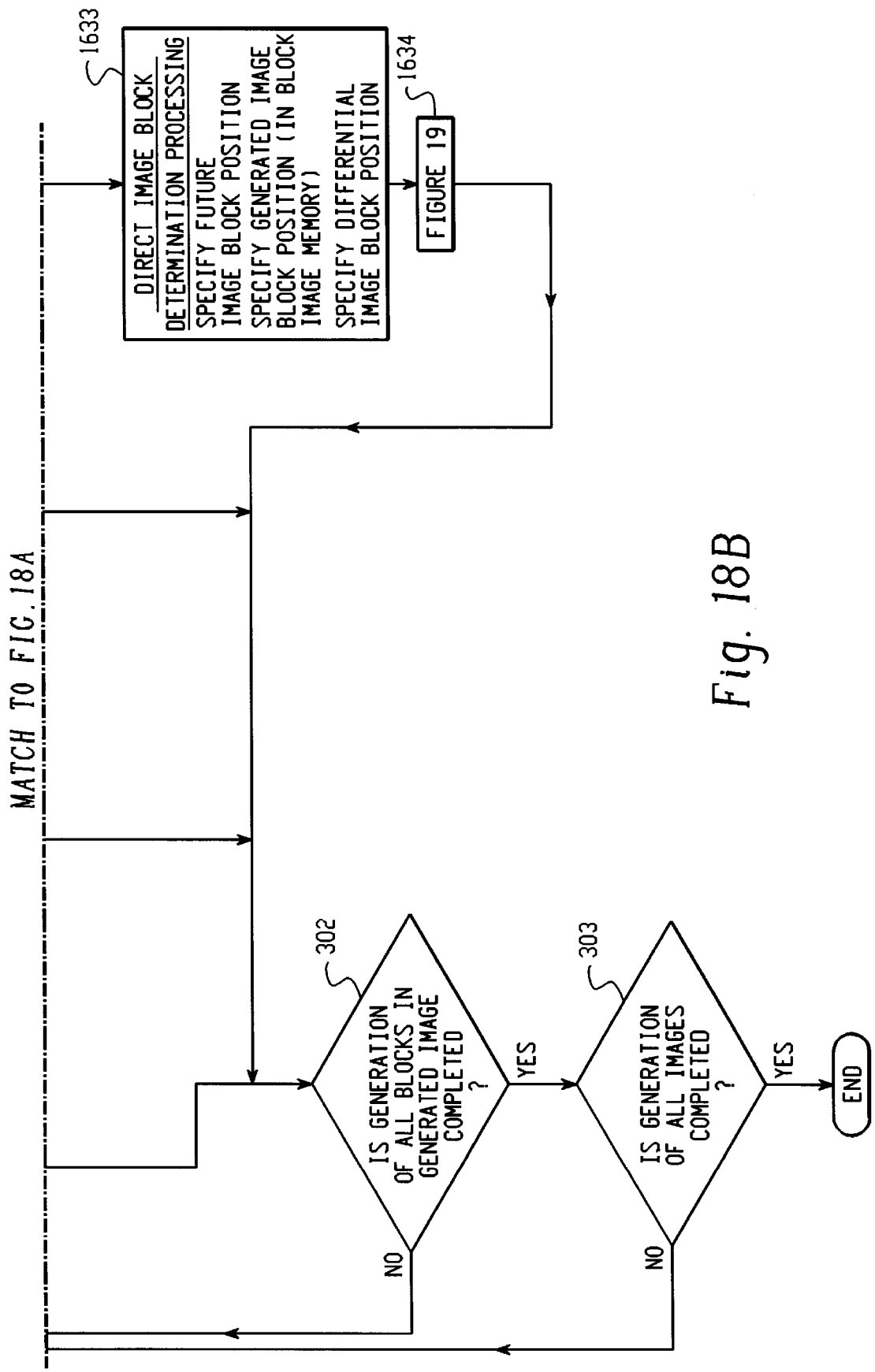

The configuration of the image generating apparatus 104 of Example 2 will be described with reference to FIG. 17. The same components as those of the image generating apparatus of Example 1 are denoted by the same reference numerals.

The control circuit 201 interprets a command specified by the command input signal 20a so as to output a command signal for controlling the operation of a pixel position specifying circuit 1501, the image transfer circuit 206 and the pixel calculation circuit 203. In accordance with the direction of the control circuit 201, the pixel position specifying circuit 1501 obtains the pixel position (first pixel position) in a reference image block or a generated polygon, and outputs this pixel position as the first pixel position signal 20b. The pixel position specifying circuit 1501 obtains the pixel position (second pixel position) in a generated image block or a generated polygon and outputs this pixel position as a second pixel position signal 150a, and obtains the pixel position (third pixel position) in a differential image block or a texture image and outputs this pixel position as the third pixel position signal 20d.

An image memory access circuit 1502 includes a first image memory access section 1504 and a second image memory access section 1503. The first image memory access section 1504 operates as follows. In response to the first pixel position signal 20b, the first image memory access section 1504 reads out the pixel data at the specified pixel position in the frame memory 109 and outputs it as the first pixel data signal 20e. In response to the second pixel position signal 150a, the first image memory access section 1504 writes the pixel data input as a second pixel data signal 150b to the specified pixel position in the frame memory 109 in the case where the second pixel position signal 150a indicates the pixel position in the frame memory 109. In response to the fourth pixel position signal 20h, the first image memory access section 1504 reads out the pixel data at the specified pixel position in the frame memory and outputs it as the fourth pixel data signal 20j. The second image memory access section 1503 operates as follows. In response to the third pixel position signal 20d, the second image memory access section 1503 reads out the pixel data at the specified pixel position in the block image memory 205, and outputs it as the third pixel data signal 20g. In response to the second pixel position signal 150a, the second image memory access section 1503 writes the pixel data input as the second pixel data signal 150b to the specified pixel position in the block image memory 205, in the case where the second pixel position signal 150a indicates the pixel position in the block image memory 205. In response to the fifth pixel position signal 20i, the second image memory access section 1503 writes the pixel data input as the fifth pixel data signal 20k to the specified pixel position in the block image memory 205.

The pixel calculation circuit 203 receives the first pixel data signal 20e and the third pixel data signal 20g to output the result of the data calculation as the second pixel data signal 150b. In Example 2, the pixel calculation circuit 203 includes the multiplier generator 207, the first multiplication section 209, the second multiplication section 208 and the addition section 210. The first multiplier generator 207 generates the first multiplier and the second multiplier, and outputs them to the multiplication sections in accordance with the direction (a command signal) of the control circuit 201. The first multiplication section 209 multiplies the first multiplier specified by the multiplier generator 207 and the first pixel data together. The second multiplication section 208 multiplies the second multiplier specified by the multiplier generator 207 and the third pixel data together. The addition section 210 adds the result of the calculation in the first multiplication section 209 and the result of the calculation in the second multiplication section 208.

In the case where the control circuit 201 directs (i.e., outputs a command signal) the motion compensation processing procedure or the simultaneous implementation of motion compensation and texture mapping, the pixel calculation circuit 203 performs a calculation with data precision with code. In the case where the control circuit 201 directs (i.e., outputs a command signal) texture mapping, the pixel calculation circuit 203 performs a calculation with data precision without code.

In accordance with the direction (command signal) of the control circuit 201, the image transfer circuit 206 generates the fourth pixel position and the fifth pixel position for transferring an image block in the frame memory 109 to the block image memory 205. The pixel data specified by the fourth pixel position signal 20h is read out from the frame memory 109 via the image memory access circuit 1502. The pixel data is written to the pixel position in the block image memory 205 specified by the fifth pixel position signal 20i via the image memory access circuit 1502.

The operation of the thus configured image generating apparatus 104 will be described below. The CPU 101 directs the operation of the image generating apparatus 104 with a command. The control circuit 201 interprets the command and, in response to this, outputs a command for controlling the respective circuits of the image generating apparatus 104, thereby operating the image generating apparatus 104. In the following description, the control procedure, in which the CPU 101 issues a command to the control circuit 201, and the operation procedure of each circuit in the image generating circuit 104 controlled by the control circuit 201 will be described.

First, the operation of the image generating apparatus 104 of Example 2 when performing the motion compensation processing procedure will be described. The procedure of controlling the image generating apparatus 104 by the CPU 101 is shown in FIGS. 18A–18B and 19A–19B, while the operation procedure of each circuit of the image generating apparatus 104 is shown in FIG. 20. In FIGS. 18A–18B, 19A–19B and 20, the same processing procedure steps as those in FIGS. 3A–3B, 4A–4B and 5 are denoted by the same reference numerals.

First, the controlling procedure of the image generating apparatus 104 by the CPU 101 when performing the motion compensation processing procedure will be described with reference to FIGS. 18A–18B and 19A–19B.

At STEP 301, a reference image (past image or future image) serving as a reference of motion compensation is set in the frame memory 109. Then, a differential image is written to the frame memory 109. The reference image may be either read out from the disk device 103 to be written to the frame memory 109 by the CPU 101 or be previously generated in the image generating apparatus 104.

At STEP 311, it is determined whether or not the motion compensation processing procedure is to be performed. If the motion compensation is not performed, processing proceeds to STEP 1601. If motion compensation is to be performed, processing proceeds to STEP 321.

At STEP 1601, the CPU 101 directs the image generating apparatus 104 to perform the image block determination processing procedure. By this direction, the position of a generated image block in the block image memory and the position of a differential image block in the differential image are specified.

Figure 19A:
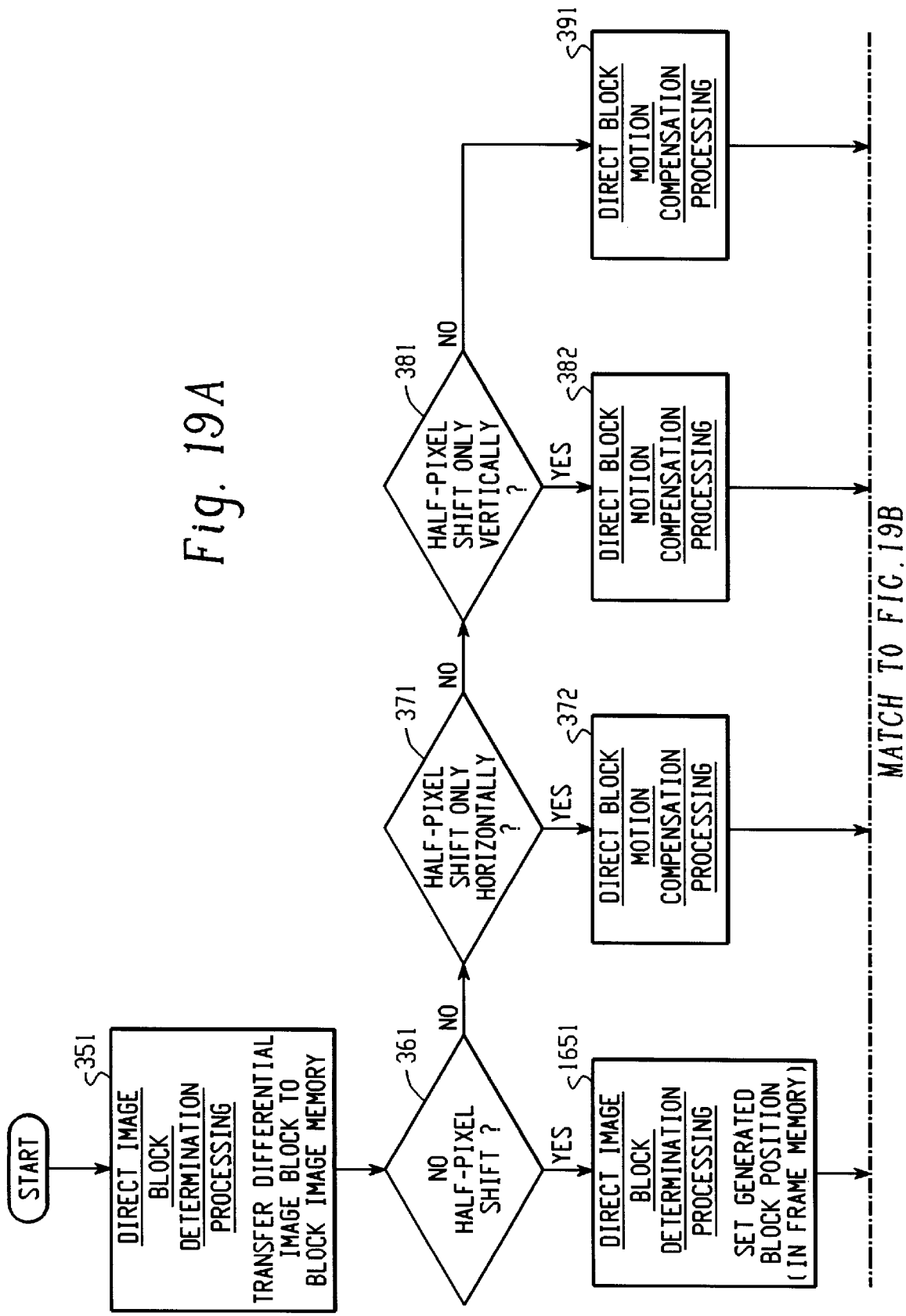
FIGS. 19A and 19B are part of a flow chart for controlling the operation of an image generating apparatus by a CPU when performing a motion compensation processing procedure in Example 2.
Figure 19B:
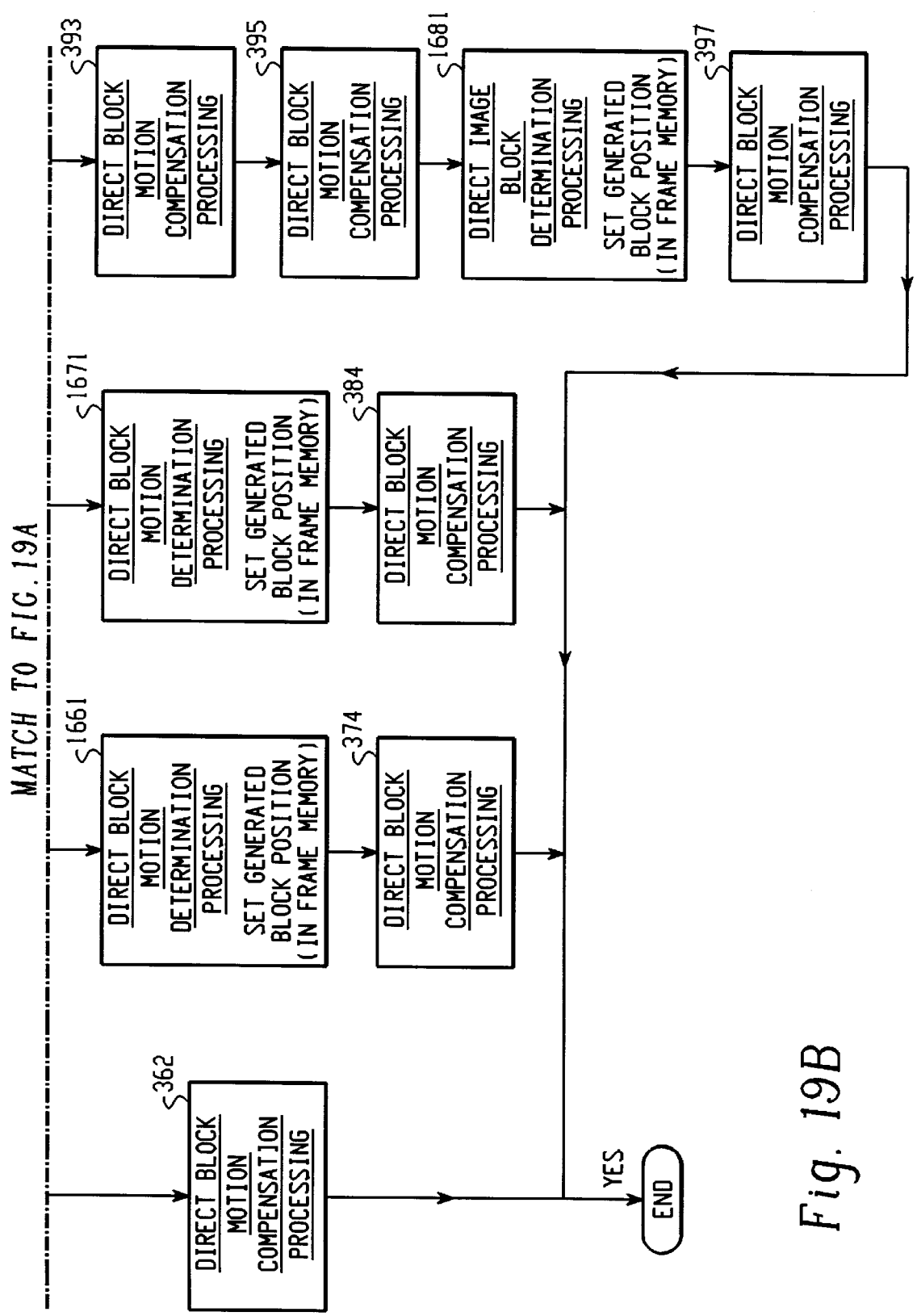
Figure 20:
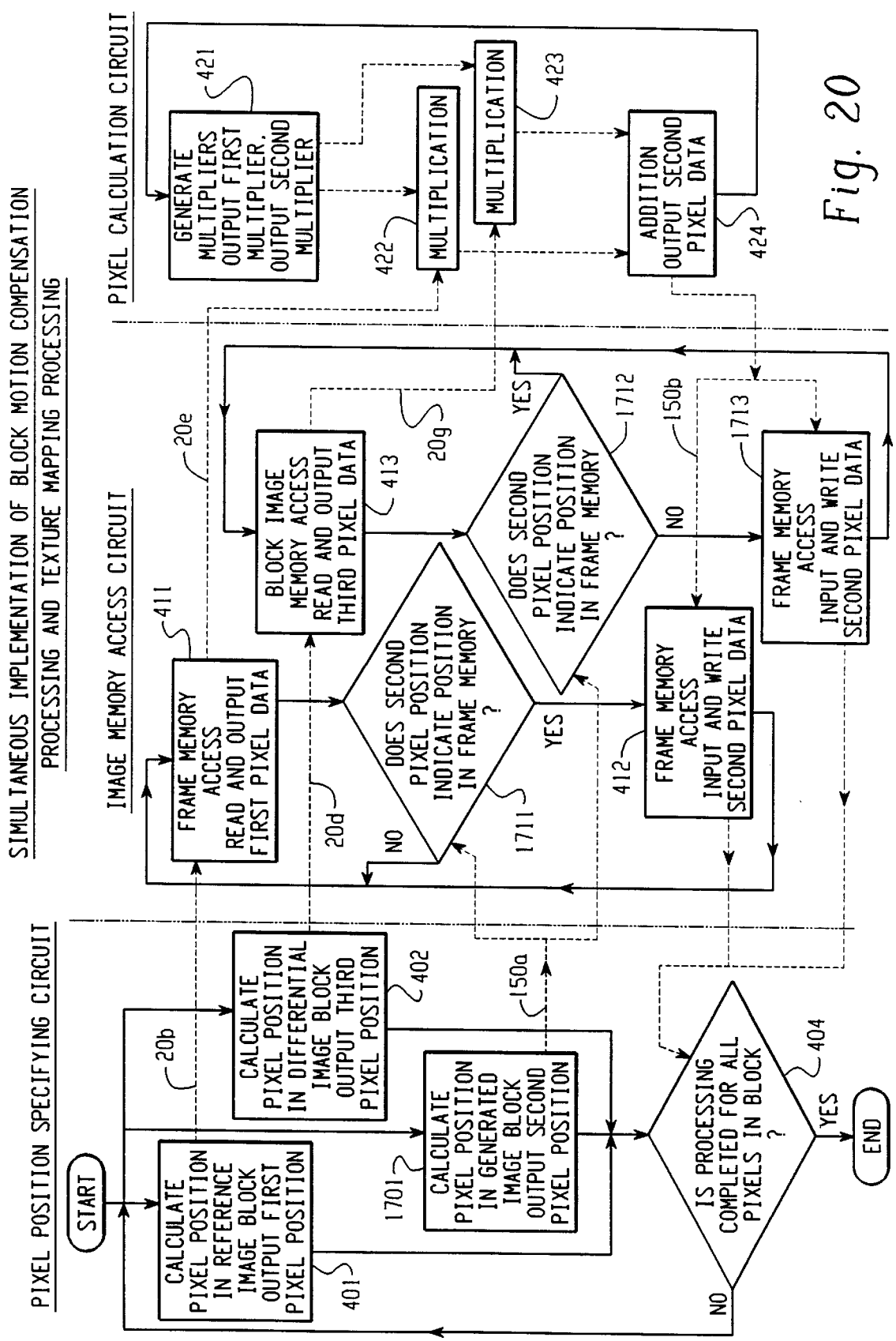
FIG. 20 is a flow chart of operation of each circuit in the image generating apparatus when performing a motion compensation processing procedure in Example 2.

At STEP 1602, the motion compensation processing procedure of the block is controlled in accordance with the procedure shown in FIGS. 19A and 19B.

At STEP 321, it is determined whether or not the motion compensation is forward motion compensation. If forward motion compensation is performed, processing procedure proceeds to STEP 1611. If not, processing procedure proceeds to STEP 331.

At STEP 1611, the CPU 101 directs the image generating apparatus 104 to perform the image block determination processing procedure. By this direction, the position of the past image block in the past image, the position of the generated image block in the block image memory and the position of the differential image block in the differential image are specified.

At STEP 1612, the motion compensation processing procedure of the block is controlled in accordance with the procedure shown in FIGS. 19A and 19B.

At STEP 331, it is determined whether the motion compensation is backward motion compensation or not. If backward motion compensation is performed, processing procedure to STEP 1621. If not, processing procedure proceeds to STEP 341 for bidirectional motion compensation.

At STEP 1621, the CPU 101 directs the image generating apparatus 104 to perform the image block determination processing procedure. By this direction, the position of a future image block in the future image, the position of a generated image block in the block image memory, and the position of a differential image block in the differential image are specified.

At STEP 1622, the motion compensation processing procedure of the blocks will be controlled in accordance with the procedure shown in FIGS. 19A–19B.

At STEP 1631, the CPU 101 directs the image generating apparatus 104 to perform the image block determination processing procedure. By this direction, the position of a past image block in the past image, the position of a generated image block in the block image memory, and the position of a differential image block in the differential image are specified.

At STEP 1632, the motion compensation processing procedure of the block will be controlled in accordance with the procedure shown in FIGS. 19A–19B.

At STEP 1633, the CPU 101 directs the image generating apparatus 104 to perform the image block determination processing procedure. By this direction, the position of a future image block in the future image, the position of a generated image block in the block image memory, and the position of a differential image block in the differential image are specified.

At STEP 1634, the motion compensation processing procedure of the blocks will be controlled in accordance with the procedure shown in FIGS. 19A and 19B.

At STEP 302, it is determined whether or not motion compensation processing is completed for all of the image blocks in the generated image. If motion compensation processing procedure is completed, processing proceeds to STEP 303. If not, processing proceeds to STEP 311 where a next image block is subjected to processing procedure.

At STEP 303, it is determined whether or not motion compensation processing is completed for all of the images. If not, processing proceeds to STEP 301 where a next image is subjected to processing procedure.

Next, the procedure for controlling the image generating apparatus 104 by the CPU 101 so as to perform motion compensation of image blocks will be described in detail with reference to FIGS. 19A and 19B.

At STEP 351, the CPU 101 directs the image generating apparatus 104 to perform the image block determination processing procedure. By this direction, a differential image block next to be subjected to processing is transferred from the differential image in the frame memory 109 to the block image memory 205.

At STEP 361, it is determined whether or not half-pixel precision motion compensation is to be performed. If not, processing proceeds to STEP 1651. If half-pixel precision motion compensation is to be performed, processing proceeds to STEP 371.

At STEP 1651, the CPU 101 directs the image generating apparatus 104 to perform the image block determination processing procedure so as to specify the position of a generated image block to the position in the generated image within the frame memory 109.

At STEP 362, the CPU 101 directs the image generating apparatus 104 to perform the block motion compensation processing procedure. By this direction, the position of the reference image block in the reference image is specified to the image generating apparatus 104.

At STEP 371, it is determined whether or not the reference image block is specified with half-pixel precision only in a horizontal direction. In the case where half-pixel precision is performed only in a horizontal direction, processing proceeds to STEP 372. If not, processing proceeds to STEP 381.

At STEP 372, the CPU 101 directs the image generating apparatus 104 to perform the block motion compensation processing procedure. By this direction, the position of a reference image block is specified to the image generating apparatus 104. The position of the reference image block is shifted by a half pixel to the left from the position of the reference image block specified with half-pixel precision for motion compensation.

At STEP 1661, the CPU 101 directs the image generating apparatus 104 to perform the image block determination processing procedure. By this direction, the position of a generated image block is specified to the position in a generated image in the frame memory 109.

At STEP 374, the CPU 101 directs the image generating apparatus 104 to perform the block motion compensation processing procedure. By this direction, the position of the reference image block in the reference image is specified to the image generating apparatus 104. The position of the reference image block is shifted by a half-pixel to the right from the position of the reference image block specified with half-pixel precision for motion compensation.

At STEP 381, it is determined whether or not the position of a reference image block is specified with half-pixel precision only in a vertical direction. In the case where the position is specified only vertically, processing procedure proceeds to STEP 382. If not, processing procedure proceeds to STEP 391.

At STEP 382, the CPU 101 directs the image generating apparatus 104 to perform block motion compensation processing procedure. By this processing procedure, the position of a reference image block in the reference image is specified to the image generating apparatus 104. The specified position of the reference image block is shifted by a half pixel upward from the position of the reference image block specified with half-pixel precision for motion compensation.

At STEP 1671, the CPU 101 directs the image generating apparatus 104 to perform the image block determination processing procedure. By this processing procedure, the position of a generated image block is specified to the position in the generated image in the frame memory 109.

At STEP 384, the CPU 101 directs the image generating apparatus 104 to perform the block motion compensation processing procedure. By this processing procedure, the position of a reference image block is specified to the image generating apparatus 104. The specified position of the reference image block is shifted by a half-pixel downward from the position specified with half-pixel precision for motion compensation.

At STEP 391, the CPU 101 directs the image generating apparatus 104 to perform the block motion compensation processing procedure. By this processing procedure, the position of a reference image block in the reference image is specified to the image generating apparatus 104. The specified position of the reference image block is shifted by a half pixel to the left and upward from the position of the reference image block specified for motion compensation.

At STEP 393, the CPU 101 directs the image generating apparatus 104 to perform the block motion compensation processing procedure. By this processing procedure, the position of a reference image block in the reference image block is specified to the image generating apparatus 104. The specified position of the reference image block is shifted by a half pixel to the right and upward from the position of the reference image block specified with half-pixel precision for motion compensation.

At STEP 395, the CPU 101 directs the image generating apparatus 104 to perform the block motion compensation processing procedure. By this processing procedure, the position of a reference image block in the reference image block is specified to the image generating apparatus 104. The specified position of the reference image block is shifted by a half pixel to the left and downward from the position of the reference image block specified with half-pixel precision for motion compensation.

At STEP 1681, the CPU 101 directs the image generating apparatus 104 to perform the image block determination processing procedure. By this processing procedure, the position of the generated image block is specified to the position in the generated image in the frame memory 109.

At STEP 397, the CPU 101 directs the image generating apparatus 104 to perform the block motion compensation processing procedure. By this processing procedure, the position of a reference image block in the reference image block is specified to the image generating apparatus 104. The specified position of the reference image block is shifted by a half pixel to the right and downward from the position of the reference image block specified with half-pixel precision for motion compensation.

The operation procedure of the image generating apparatus 104 controlled by the CPU 101 as described above so as to perform the motion compensation processing procedure will be described with reference to FIG. 20.

The operation procedure of the image generating apparatus 104 in the case where the CPU 101 directs the image generating apparatus 104 to perform the block motion compensation processing procedure is shown in FIG. 20. In this processing procedure, the direction by the CPU 101 is analyzed by the control circuit 201 of the image generating apparatus 104. As a result, a command signal for controlling the operation of the pixel position specifying circuit 1501 and the multiplier generator 207 of the pixel calculation circuit 203 is output.

The pixel position specifying circuit 1501 operates according to the following procedure as illustrated in FIG. 20.

At STEP 401, the pixel position (first pixel position) in the reference image block is obtained. The pixel position is output to the image memory access circuit 1502 as the first pixel position signal 20b.

Simultaneously, at STEP 402, the pixel position (third pixel position) in the differential image block is obtained. The pixel position is output to the image memory access circuit 1502 as the third pixel position specifying signal 20d.

Simultaneously, at STEP 1701, the pixel position (second pixel position) in the generated image block is obtained. The pixel position is output to the image memory access circuit 1502 as the second pixel position signal 150a. The second pixel position indicates, as is indicated by the pixel block determination processing procedure, the pixel position in the frame memory 109 or in the block image memory.

At STEP 404, after the second image data is written to the second pixel position output at STEP 403, it is determined whether or not processing is completed for all of the pixels in the generated image block. If not, processing proceeds to STEP 401, STEP 402 and STEP 1701.

The image memory access circuit 1502 operates according to the following procedure.

First, the first image memory access section 1504 operates in the following manner.

At STEP 411, the first pixel position signal 20b is input so as to readout the pixel data at the specified pixel position. The pixel data is output as the first pixel data signal 20e.

At STEP 1711, the first image memory access section 1504 receives the second pixel position signal 150a, and determines whether or not the pixel position indicates the position in the frame memory 109. In the case where the second pixel position indicates the position in the frame memory 109, processing proceeds to STEP 412. If not, processing proceeds to STEP 411.

At STEP 412, the first image memory access section 1504 receives the second pixel position signal 150a and the second image data signal 150b so as to write the image data to the specified pixel position in the frame memory 109.

The second image memory access section 1503 operates in the following manner.

At STEP 413, the second image memory access section 1503 receives the third pixel position signal 20d so as to read out the image data at the specified pixel position of the block image memory 205. Then, the second image memory access section 1503 outputs the image data as the third image data signal 20g.

At STEP 1712, the second image memory access section 1503 receives the second pixel position signal 150a, and determines whether or not the pixel position indicates the position in the block image memory 205. In the case where the second pixel position indicates the position in the block image memory 205, processing proceeds to STEP 1713. If not, processing proceeds to STEP 413.

At STEP 1713, the second image memory access section 1503 receives the second pixel position signal 150a and the second image data signal 150b so as to write the image data to the specified pixel position in the block image memory.

The pixel calculation circuit 203 operates in the following manner.

At STEP 421, the pixel calculation circuit 203 outputs the first multiplier and the second multiplier from the multiplier generator 207 as shown in Table 1 in accordance with the type of motion compensation processing procedure directed by the CPU 101 via the control circuit 201.

At STEP 422, the first multiplication section 209 multiplies the image data input as the first image data signal 20e by the first multiplier.

At STEP 423, the second multiplication section 208 multiplies the image data input as the third image data signal 20g by the second multiplier.

At STEP 424, the addition section 210 adds the result of the first multiplication section 209 and the result of the second multiplication section 208, and outputs the result of the addition as the second image data signal 150b.

In the case where the CPU 101 directs the image generating apparatus 104 to perform the image block determination processing procedure, the direction by the CPU 101 is analyzed by the control circuit 201 of the image generating apparatus 104 so as to control the operation of the pixel position specifying circuit 1501 and the image transfer circuit 206.

The positions of a differential image block, a reference image block and a generated image block, which are required to be generated so as next to perform motion compensation processing procedure or texture mapping (described below), or the positions of a texture image and a generated polygon are determined in to the pixel position specifying circuit 1501. The pixel position specifying circuit 1501 generates the pixel position in accordance with the determined image block position when the block motion compensation processing procedure or the texture mapping processing procedure is performed. In Example 2, the position not only in the frame memory 109 but also in the block image memory 205 is specified as the position of a generated image block. In accordance with this position of the generated image block, it is determined the pixel position either in the frame memory 109 or in the block image memory 205 is to be generated as the second pixel position.

In the image transfer circuit 206, the operation shown in FIG. 6 is performed so as to transfer the image block from the frame memory 109 to the block image memory 205. Since this operation is described in detail in Example 1, the description thereof is herein omitted.

By the above procedure, the image generating apparatus 104 according to Example 2 realizes the motion compensation processing procedure.

In accordance with the operation procedure of the aforementioned motion compensation processing procedure, the operation for performing the forward motion compensation processing procedure is described in detail with reference to FIG. 7. In this case, it is assumed that an image is 8×8 pixels in size, and an image block for motion compensation is 4×4 in size for simplification.

The past image 601 is stored in the frame memory 109. A storage area, which is to store the generated image 605, is included in the frame memory 109. The CPU 101 writes a differential image to the frame memory 109 (STEP 301).

Since the forward motion compensation processing procedure is performed, processing proceeds to STEP 1611 (STEP 311 to STEP 321).

The CPU 101 directs the image generating apparatus 104 to perform the image block determination processing procedure. An image block (0,1)-(3,4) in the past image 601 is specified as a past image block 602 and an image block in the generated image 605 is specified as a generated image block, thereby specifying the position of the differential image block 603 in the frame memory 109 (STEP 322).

The processing procedure shown in FIG. 19 is performed for the specified image blocks.

At STEP 351, the CPU 101 directs the block image memory to transfer the differential image block 603 to the block image memory as the image block determination processing procedure. In response to this direction, the control circuit 201 controls the image transfer circuit 206 so as to transfer the differential image block 603 in the frame memory 109 to the block image memory 205 (FIG. 6).

Since the specified position of the past image block 602 (0,1)-(3,4) in the past image 601 is not shifted by a half pixel from the position where the pixel is present, the half-pixel precision motion compensation procedure is not performed (STEP 361).

The CPU 101 directs the image generating apparatus 104 to perform the image block determination processing procedure (STEP 1651). By this direction, the image generating apparatus 104 specifies the position of the generated image block 604 to the position in the generated image 605.

The CPU 101 directs the image generating apparatus 104 to perform the block motion compensation processing procedure (STEP 1652). In response to this direction, the image generating apparatus 104 performs the processing procedure shown in FIG. 20.

The pixel position specifying circuit 1501 calculates the pixel position (first pixel position) (0,0) in the past image block 602, and outputs this pixel position as the first pixel position signal 20b. The pixel position specifying circuit 1501 calculates the pixel position (third pixel position) (0,0) in the differential image block 603, and outputs this pixel position as the third pixel position signal 20d. Then, the pixel position specifying circuit 202 calculates the pixel position (second pixel position) (0,0) in the generated image block 604, and outputs this pixel position as the second pixel position signal 150a (STEP 401, STEP 402, STEP 1701).

The first image memory access section 1504 in the image memory access circuit 1502 receives the first pixel position signal 20b so as to read out the pixel data of the pixel position (0,0) from the past image block 602 in the frame memory 109, and outputs this pixel data as the first pixel data signal 20e (STEP 411). The second image memory access section 1503 receives the third pixel position signal 20d so as to read out the pixel data of the pixel position (0,0) from the differential image block 603 in the block image memory 205, and outputs this pixel data as the third pixel data signal 20g (STEP 413).

The multiplier generator 207 in the pixel calculation circuit 203 generates 1.0 as the first multiplier and 1.0 as the second multiplier in accordance with Table 1 (STEP 421).

The first multiplication section 209 multiplies the pixel data input by the first pixel data signal 20e by the first multiplier, and outputs the result of the multiplication to the addition section 210 (STEP 422). The second multiplication section 208 multiplies the pixel data input by the third pixel data signal 20g by the second multiplier, and outputs the result of the multiplication to the addition section 210 (STEP 423). The addition section 210 adds the result of the multiplication in the first multiplication section 209 to the result of the multiplication in the second multiplication section 208, and outputs the result of the addition as the second pixel data signal 150b (STEP 424).

Next, the first image memory access section 1504 receives the second pixel position signal 150a and the second pixel data signal 150b. The first image memory access section 1504 determines that the second pixel position indicates the position in the frame memory (STEP 1711), and writes the pixel data to the pixel position (0,0) in the generated image block 604 (STEP 412). On the other hand, the second image memory access section 1503 determines that the second pixel position does not indicate the position in the block image memory (STEP 1711).

Until all of the pixels in the generated image block 604 are generated, the processing procedure shown in FIG. 20 is repeated for each pixel in the generated image block 604 (STEP 404).

By performing the processing procedure in this manner, the generated image block 604 is generated from the past image block 602 and the motion compensation differential image 603.

The operation for backward motion compensation processing procedure differs from that for the aforementioned forward motion compensation in that a future image is used as a reference image instead of the past image.

Next, the operation of the image generating apparatus 104 for bidirectional motion compensation processing procedure will be described. Only the steps different from those in the operation of Example 1 will be solely described below.

For the bidirectional motion compensation processing procedure, the forward motion compensation processing procedure is followed by the backward motion compensation processing procedure. In the image block determination processing procedure at STEP 1631, the position in the block image memory 205 is specified as the position where a generated image block is to be present. In forward direction motion compensation, a generated image block is generated in the block image memory 205. More specifically, the image block resulting from the forward motion compensation processing procedure is stored in the block image memory 205. The image data is of a differential image block in the backward motion compensation processing procedure which follows the forward motion compensation processing procedure, and has already been stored in the block image memory 205 when the forward motion compensation processing procedure is completed. Therefore, the transfer of a generated image block to the block image memory for backward motion compensation processing procedure, which is necessary in Example 1, is not required in Example 2. Since the position of the generated image block is specified to the position in the frame memory 109 in the backward motion compensation processing procedure, the resultant of the bidirectional motion compensation processing procedure is generated in the generated image in the frame memory 109.

Next, the operation of the image generating apparatus 104 for half-pixel precision motion compensation will be described with reference to FIG. 9. As in Example 1, it is assumed that the position is both vertically and horizontally specified with half-pixel precision.

According to Example 2, the interpolation and motion compensation of four image blocks 803, 804, 805 and 806 are simultaneously performed in the following procedure.

The generated image block is directed to be written to the block image memory 205 by the image block determination processing procedure.

At STEP 391, the image data of the reference image block 803 is multiplied by 0.25 in accordance with Table 1. The result is added to the differential image block read out from the block image memory 205, which is in turn written to the block image memory 205.

At STEP 393, the image data of the reference image block 804 is multiplied by 0.25 in accordance with Table 1. The result is added to the image block read out from the block image memory 205, which is in turn written to the block image memory 205.

At STEP 395, the image data of the reference image block 805 is multiplied by 0.25 in accordance with Table 1. The result is added to the image block read out from the block image memory 205, which is in turn written to the block image memory 205.

At this point, the position of the generated image block is transferred to the position in the generated image in the frame memory 109 (STEP 1681).

At STEP 397, the image data of the reference image block 804 is multiplied by 0.25 in accordance with Table 1. The result is added to the image block read out from the block image memory 205, which is in turn written to the block image memory 205 in the frame memory 109.

The unidirectional motion compensation processing procedure is described above. In the case where bidirectional motion compensation processing procedure is performed, the same block motion compensation processing procedure as that of the unidirectional motion compensation processing procedure is repeated eight times. In the case of bidirectional motion compensation processing procedure, the reference image data is multiplied by the first multiplier of 0.125. Moreover, the generated image blocks in the first seven iterations of the block motion compensation processing procedures are written to the block image memory 205, while the resultant is written to the generated image block in the generated image in the frame memory 109 for processing the last block motion compensation.

In this manner, in Example 2, it is possible to simultaneously perform the interpolation and motion compensation for obtaining a reference image block.

As described above, according to Example 2, the half-pixel precision motion compensation processing procedure can be realized.

The texture mapping processing procedure in Example 2 can be realized in the same procedure as that in Example 1. By taking the correspondence between the components of the image generating apparatus in Example 1 and those in Example 2, the operation for texture mapping in Example 2 is performed the same way as that in Example 1. Specifically, the pixel position specifying circuit 202, the image memory access circuit 204, the first image memory access section 212 and the first image memory access section 211 in Example 1 correspond to the pixel position specifying circuit 1501, the image memory access circuit 1502, the first image memory access section 1504 and the first memory access section 1503 in Example 2, respectively.

Therefore, the description of the operation for texture mapping processing procedure is herein omitted.

According to the image generating apparatus of Example 2, texture mapping of a semi-transparent texture image can be performed together with anti-aliasing of a polygon edge portion.

The simultaneous implementation of motion compensation and texture mapping in Example 2 is the same as that in Example 1 except for the following points, like the aforementioned features of motion compensation of Example 2.

The operation of Example 2 differs from that of Example 1 in the following two points.

(i) In at least one block motion compensation processing procedure required for motion compensation, the result of the calculation of image data of a reference image block and a differential image block is written to the pixel position forming a generated polygon in the frame in the last block motion compensation processing procedure (or simultaneous implementation of motion compensation and texture mapping).

(ii) In the block motion compensation prior to the last block motion compensation processing procedure (or simultaneous implementation of motion compensation and texture mapping), the result of calculation of image data of a reference image block and a differential image block is written to the block image memory 205.

By the operation as described above, it is possible to simultaneously implement motion compensation and texture mapping. In the case where the block motion compensation processing procedure is performed a plurality of times, it is not necessary to transfer the image block from the frame memory 109 to the block image memory 205. Thus, the processing procedure can be performed at increased speed as compared with the image generating apparatus of Example 1.

The time of operation and the processing procedure time when performing motion compensation and simultaneously performing motion compensation and texture mapping in the image generating apparatus 104 will be described below. The operation of the image generating apparatus 104 will be described for the case where a moving picture compressed by MPEG-1 standard is expanded and the case where the expansion and the texture mapping of a compressed moving picture are simultaneously performed.

An image (frame) according to the MPEG-1 standard consists of 320×240 pixels. A block for motion prediction consists of 16×16 pixels. As a result, one frame consists of 20×15=300 pixels. An image consisting of 30 frames is included for one second. In this case, it is assumed that a polygon generated by texture mapping consists of 256 pixels and that a reference image and a differential image are written to the frame memory 109 prior to the motion compensation.

The performance of each block of the image generating apparatus according to Example 2 will be assumed as follows.

The first image memory access section 1504 is constituted so as to simultaneously read/write two pixels from/to the frame memory 109 in a parallel manner. Furthermore, the first image memory access section 1504 is constituted so as to execute a read cycle or a write cycle with one clock.

The block image memory 205 is constituted by a dual-port memory. The second image memory access section 1503 can simultaneously read the data from the block image memory 205 and write the data thereto.

It is assumed that the first multiplication section 209, the second multiplication section 208 and the addition section 210 can perform a calculation with one clock. Each circuit of the image generating apparatus 104 is constituted so as to enable pipeline operation. More specifically, the memory access, the multiplication, the addition and the pixel position generation can be processed in parallel. The image generating apparatus 104 is constituted by an LSI operating at 50 MHz clock. These performances can be realized by currently available techniques.

Based on the aforementioned assumptions, the processing procedure of two types of images will be described.

(i) A P picture compressed by MPEG-1 is expanded, or is subjected to texture mapping while being expanded. All of the image blocks constituting a P picture are compressed by using forward motion prediction. Moreover, the case where the motion compensation for all of the image blocks is performed with half-pixel precision both vertically and horizontally is considered. This means that the case where the amount of processing procedure becomes the maximum is considered.

(ii) A B picture compressed by MPEG-1 is expanded, or is subjected to texture mapping while being expanded. All of the image blocks constituting a B picture are compressed by using bidirectional motion prediction. Moreover, the case where the motion compensation for all of the image blocks is performed with half-pixel precision both vertically and horizontally is considered. This means that the case where the amount of processing procedure becomes the maximum is considered.

The processing procedure of motion compensation of an image of the case (i) is as follows.

1: A differential image block is transferred from the frame memory 109 to the block image memory 205.

2: Pixel data for one pixel is read out from the differential image block (in the block image memory 205).

3: Pixel data for one pixel is read out from the reference image block (in the frame memory 109).

4: The differential image data is multiplied by a multiplier.

5: The reference image data is multiplied by a multiplier.

6: The results of the multiplications are added.

7: The pixel data of the result of the calculation is written to the block image memory 205.

8: Steps 2 to 7 are repeated for each pixel in the block (256 (=16×16) times in total)

9: Steps 2 to 8 are repeated twice while the position of the reference image block is shifted by one pixel to the right and downward.

10: The position of the reference image block is shifted to the lower right.

11: The pixel data for one pixel is read out from the differential image block.

12: The pixel data for one pixel is read out from the reference image block.

13: The differential image data is multiplied by a multiplier.

14: The reference image data is multiplied by a multiplier.

15: The results of the calculations are added.

16: The pixel data obtained by the calculation is written to the frame memory 109.

17: Steps 11 to 16 are repeated for each pixel in the block.

18: Steps 1 to 17 are repeated for each of the blocks constituting the image (300 times). The operation timing of steps 1 to 17 is shown in the timing chart of FIG. 28.

Figure 28:
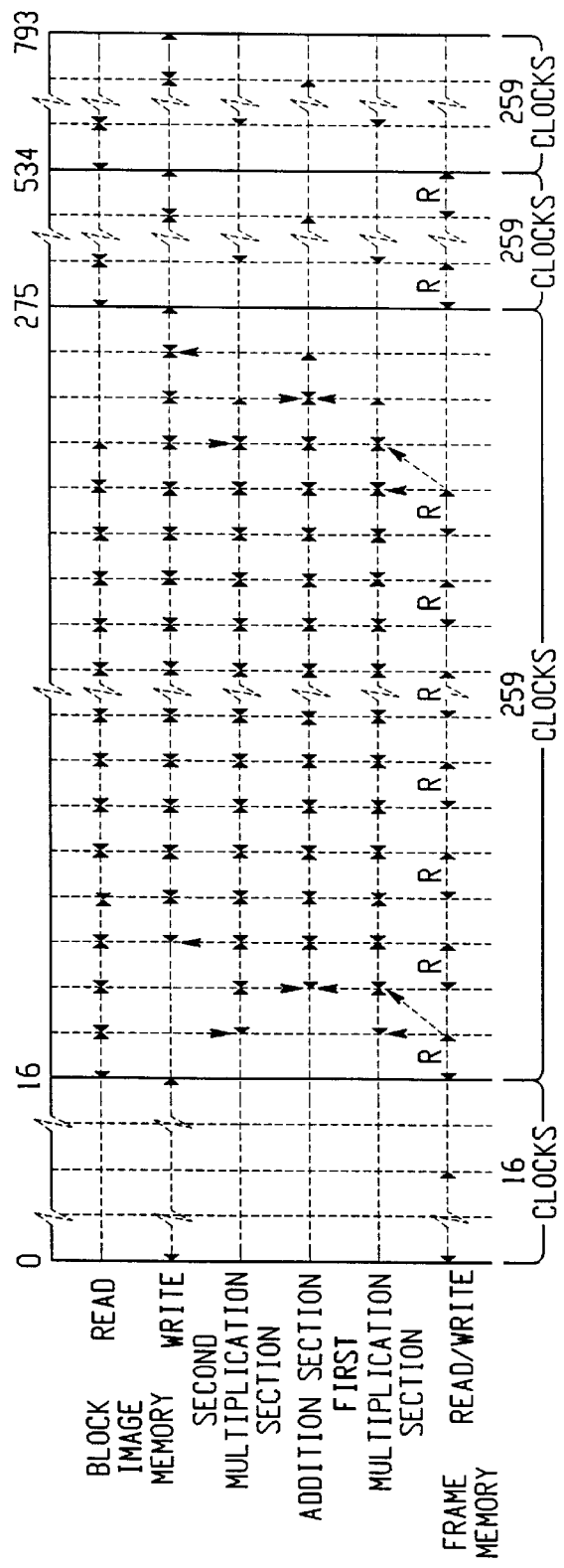
FIG. 28 is a timing chart in the case where a motion compensation processing procedure is performed for a P picture by MPEG-1.
Figure 28:
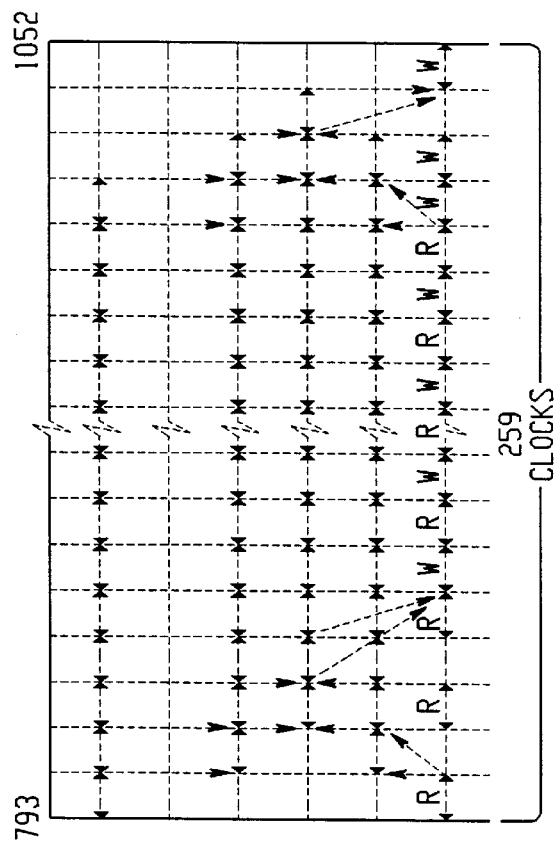

As can be seen from FIG. 28, the operation time for each step is as follows.

Step 1 . . . 16 clocks
Steps 2 to 8 . . . 259 clocks
Steps 2 to 9 . . . 777 clocks (=259×3)
Steps 11 to 17 . . . 259 clocks
Step 18 . . . 315600 clocks (=(16+259×4)×300)

One clock cycle of an LSI operating at 50 MHz is 20 ns. Thus, the processing procedure time is 6.312 ms.

The processing speed of 30 frames/second is sufficient to decompress an MPEG-1 image.

More specifically, when the processing procedure time for one frame is 33 ms or less, the required performance can be obtained. Thus, the image generating apparatus 104 of Example 2 can perform the motion compensation processing procedure at sufficiently high speed.

Next, the simultaneous implementation of motion compensation and texture mapping for the image (i) will be described.

In a P picture, it is necessary to leave a generated image for subsequent motion compensation of a B picture. The processing procedure is as follows.

1: Steps 1 to 17 of motion compensation are performed.

2: A generated image block is transferred to the block image memory 205.

3: Pixel data for one pixel is read out from the texture image (block image memory 205).

4: Pixel data for one pixel is read out from a generated polygon (frame memory 109).

5: The texture image data is multiplied by a semi-transparent multiplier.

6: The generated polygon image data is multiplied by a semi-transparent multiplier.

7: The results of the multiplications are added.

8: The pixel data obtained by the calculation is written to the generated polygon in the frame memory 109.

9: Steps 3 to 8 are repeated for each pixel in the block (256 times).

10: Steps 1 to 9 are repeated for each of the blocks constituting the image (300 times).

Figure 29:
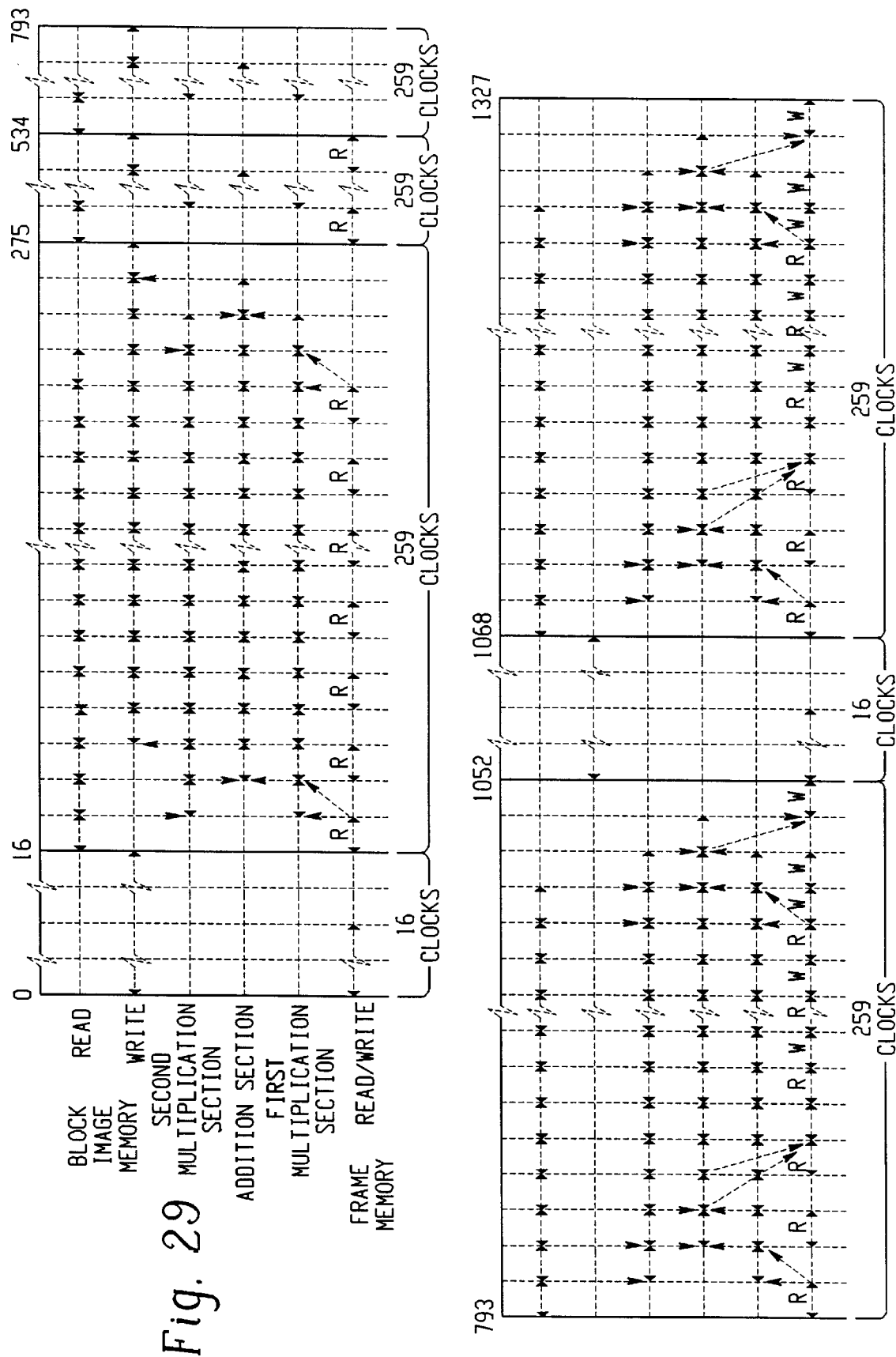
FIG. 29 is a timing chart in the case where a motion compensation processing procedure and a texture mapping procedure are simultaneously performed for a P picture by MPEG-1.

The operation timing of steps 1 to 9 is shown in the timing chart of FIG. 29.

From FIG. 29, the operation time for each step is as follows.

| | |
|---|---|
| Step 1 | 1052 clocks (777 + 259) |
| Step 2 | 16 clocks |
| Steps 3 to 9 | 259 clocks |
| Steps 1 to 10 | 398100 clocks |
| | = (1052 + 16 + 259) × 300 |

The processing procedure time for one frame is 7.962 ms. Thus, it is understood that this processing procedure time satisfies the processing procedure time required for expansion of MPEG-1.

Next, the motion compensation processing procedure of the image (ii) will be described.
The processing procedure is as follows.

1: A differential image block is transferred from the frame memory 109 to the block image memory 205.

2: Pixel data for one pixel is read from the differential image block (in the block image memory 205).

3: Pixel data for one pixel is read out from the reference image block (frame memory 109).

4: The differential image data is multiplied by a multiplier.

5: The reference image data is multiplied by a multiplier.

6: The results of the multiplications are added.

7: The pixel data obtained by the calculation is written to the block image memory 205.

8: Steps 2 to 7 are repeated for each pixel in the block (256 times (=16×16)).

9: The position of the reference image block is successively shifted by one pixel to the right, downward and to the lower right, and steps 2 to 8 are repeated three times.

10: A future image is determined as a reference image.

11: Pixel data for one pixel is read out from the differential image block (in the block image memory 205).

12: Pixel data for one pixel is read out from the reference image block (in the frame memory 109).

13: The differential image data is multiplied by a multiplier.

14: The reference image data is multiplied by a multiplier.

15: The results of the multiplications are added.

16: The pixel data obtained by the calculation is written to the block image memory 205.

17: Steps 11 to 16 are repeated for each pixel in the block (256 (=16×16) times in total).

18: The position of the reference image block is sequentially shifted by one pixel to the right and downward, and steps 11 to 17 are repeated twice.

19: The position of the reference image block is shifted to the lower right.

20: Pixel data for one pixel is read out from the differential image block (in the block image memory 205).

21: Pixel data for one pixel is read out from the reference image block (in the frame memory 109).

22: The differential image data is multiplied by a multiplier.

23: The reference image data is multiplied by a multiplier.

24: The results of the multiplications are added.

25: The pixel data obtained by the calculation is written to the frame memory 109.

26: Steps 20 to 25 are repeated for each pixel in the block.

27: Steps 1 to 26 are repeated for each of the block constituting the image (300 times).

Figure 30:
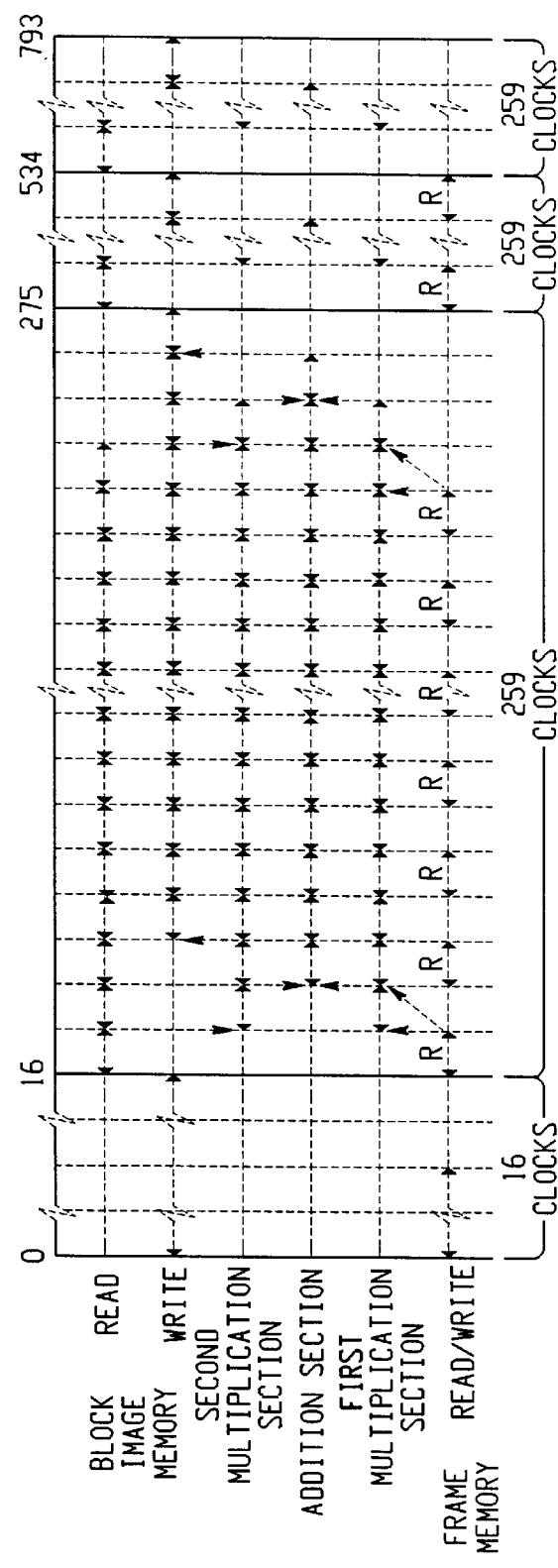
FIG. 30 is a timing chart in the case where a motion compensation processing procedure is performed, or a motion compensation processing procedure and a texture mapping procedure are simultaneously performed for a B picture by MPEG-1.
Figure 30:
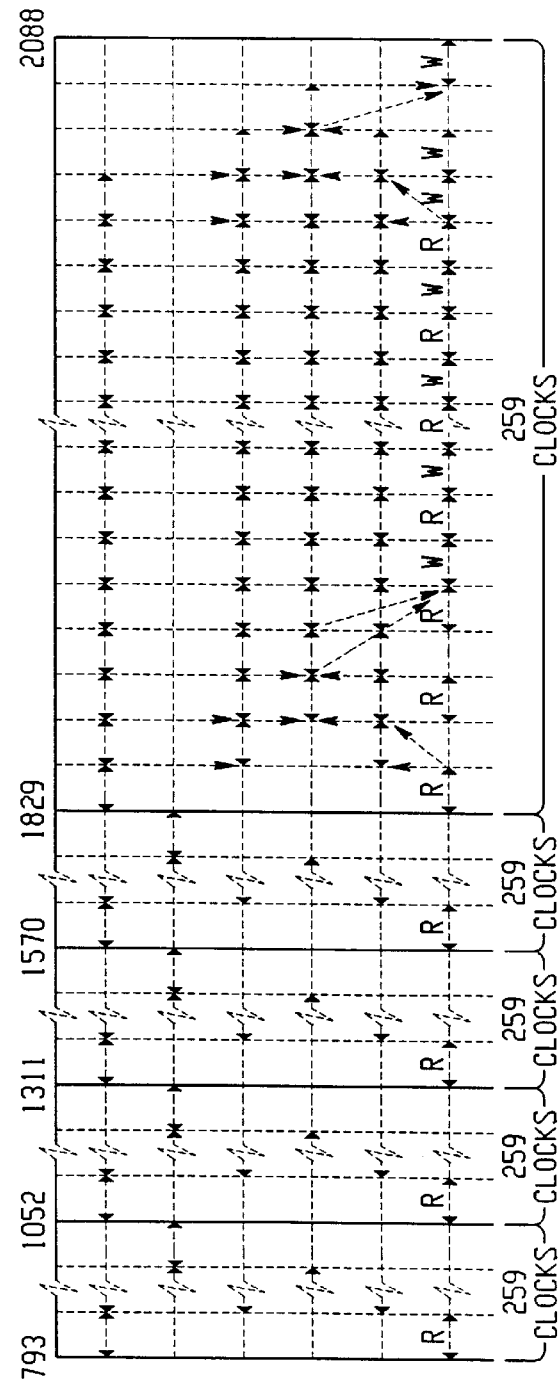

The operation timing of steps 1 to 17 is shown in the timing chart of FIG. 30.

From FIG. 30, the operation time for each step is as follows.

| | |
|---|---|
| Step 1 | 16 clocks |
| Steps 2 to 8 | 259 clocks |
| Steps 2 to 9 | 1036 clocks ( = 259 × 4) |
| Steps 11 to 17 | 259 clocks |
| Steps 11 to 18 | 777 clocks ( = 259 × 3) |
| Steps 20 to 26 | 259 clocks |
| Step 27 | 626400 clocks |
| | ( = (16 + 259 × 4 + 259 × 4) × 300) |

One clock cycle of an LSI operating at 50 MHz is 20 ns. Thus, the processing procedure time is 12.528 ms.

The processing speed of 30 frame/second is sufficient for expanding an MPEG-1 image.

More specifically, the processing procedure time of 33 ms or less for one image is sufficient. Thus, it is understood that the image generating apparatus of the present invention can perform the motion compensation processing procedure at sufficiently high speed.

Next, the simultaneous implementation of motion compensation and texture mapping for the image (ii) will be described.

In a B picture, it is not necessary to leave a generated image for subsequent motion compensation. Therefore, the processing procedure is as follows.

1: Steps 1 to 19 of motion compensation are performed.

2: A generated polygon is determined.

3: Pixel data for one pixel is read out from block image memory 205.

4: Pixel data for one pixel is read out from a reference image block (frame memory 109).

5: The differential image data (=texture image data) is multiplied by a multiplier.

6: The reference image data is multiplied by a multiplier.

7: The results of the multiplications are added.

8: The pixel data obtained by the calculation is written to the generated polygon in the frame memory 109.

9: Steps 3 to 8 are repeated for each pixel in the block (256 times).

10: Steps 1 to 9 are repeated for each of the blocks constituting the image (300 times).

The aforementioned procedure differs from that of the case where the motion compensation alone is performed only in that the generated pixel data is written to the generated polygon in steps 3 to 8. Thus, the operation timing of steps 1 to 9 is the same as the timing chart of FIG. 30.

The operation time for each step is as follows.

| Step 1 | 1829 clocks |
| --- | --- |
|  | ( = 16 + 259 × 4 + 259 × 3) |
| Steps 3 to 9 | 259 clocks |
| Steps 1 to 10 | 626400 clocks |
|  | ( = (1829 + 259) × 300) |

One clock cycle of an LSI operating at 50 MHz is 20 ns. Therefore, the processing speed is 12.528 ms. Thus, high processing speed is obtained.

In the case where the image generating apparatus of the present invention is realized as a circuit operating at 50 MHz as described above, the motion compensation processing procedure is performed in real time in the expansion processing procedure of an image compressed by MPEG-1. Moreover, it is possible to simultaneously perform motion compensation and texture mapping in real time using an expanded image as a texture image.

In the case where an operation clock is set at 50 MHz, the motion compensation processing procedure of a compressed image and the texture mapping of an image obtained by the motion compensation can be performed at about 13 ms at maximum. As compared with 33 ms, which is the processing time for one frame (1 s/30 frames), there is excess time of 20 ms. By using this excess time, it is possible to perform texture mapping for other texture images and motion compensation processing of images with higher resolution.

As described above, according to Example 2, the image generating apparatus includes: the block image memory 205 for storing a texture image, a differential image and an intermediate image of motion compensation processing procedure; the image memory access circuit 1502 for accessing the pixel data in the block image memory 205 and in the frame memory 109 storing a differential image, a generated polygon and a generated image; the pixel calculation circuit 203 for calculating the third pixel data read out from the block image memory 205 and the first pixel data read out from the frame memory 109 between pixels; the pixel position specifying circuit 1501 for generating and specifying the pixel position of pixel data to be calculated and the pixel position, to which the pixel data obtained by calculation is written, in accordance with the processing procedure such as motion compensation, texture mapping and simultaneous implementation of motion compensation and texture mapping; and the image transfer circuit 206 for transferring an image block in the frame memory 109 to the block image memory 205. With such a configuration, the expansion processing procedure of a moving picture compressed by using motion prediction such as forward motion compensation, bidirectional motion compensation and half-pixel motion compensation, the texture mapping processing procedure including texture mapping of a semi-transparent texture image and anti-aliasing processing procedure of a polygon edge, and simultaneous implementation of the motion compensation and the texture mapping can be realized.

Furthermore, according to Example 2, since the block image memory 205 stores an intermediate result of the motion compensation processing procedure, the number of memory accesses is remarkably reduced as compared with the image generating apparatus of Example 1. As a result, high speed processing procedure can be realized. Since the block image memory 205 is required to store only one differential image block, a capacitance of the block image memory 205 may be small. Thus, it is possible to integrate the block image memory with the circuits for motion compensation processing procedure/texture mapping processing procedure on an LSI. This signifies that the block image memory 205 can access at higher speed. Thus, the processing procedure at extremely high speed can be realized as compared with Example 1.

In Example 2, for simplification of the description, an image block used for motion compensation has the size of 4×4 pixels. However, the size of the image block is not limited to 4×4 pixels. The image block may have other sizes such as 16×16 pixels and 8×8 pixels. In addition, although an image has the size of 8×8 pixels in Example 2, the image may have any other size. Furthermore, the processing procedure order of the image block described in the procedure of motion compensation is not limited to that described in Example 2, and may be changed appropriately. Moreover, the pixels have only one semi-transparency of a semi-transparent texture in the description of texture mapping in Example 2. However, each of the pixels constituting a texture may have a respectively different semi-transparency. Furthermore, although the case where the backward motion compensation processing procedure is performed is not described in Example 2, the backward motion compensation processing procedure can be realized with the configuration of the image generating apparatus described in Example 2 since the backward motion compensation processing procedure requires the same processing procedure.

EXAMPLE 3

Figure 31:
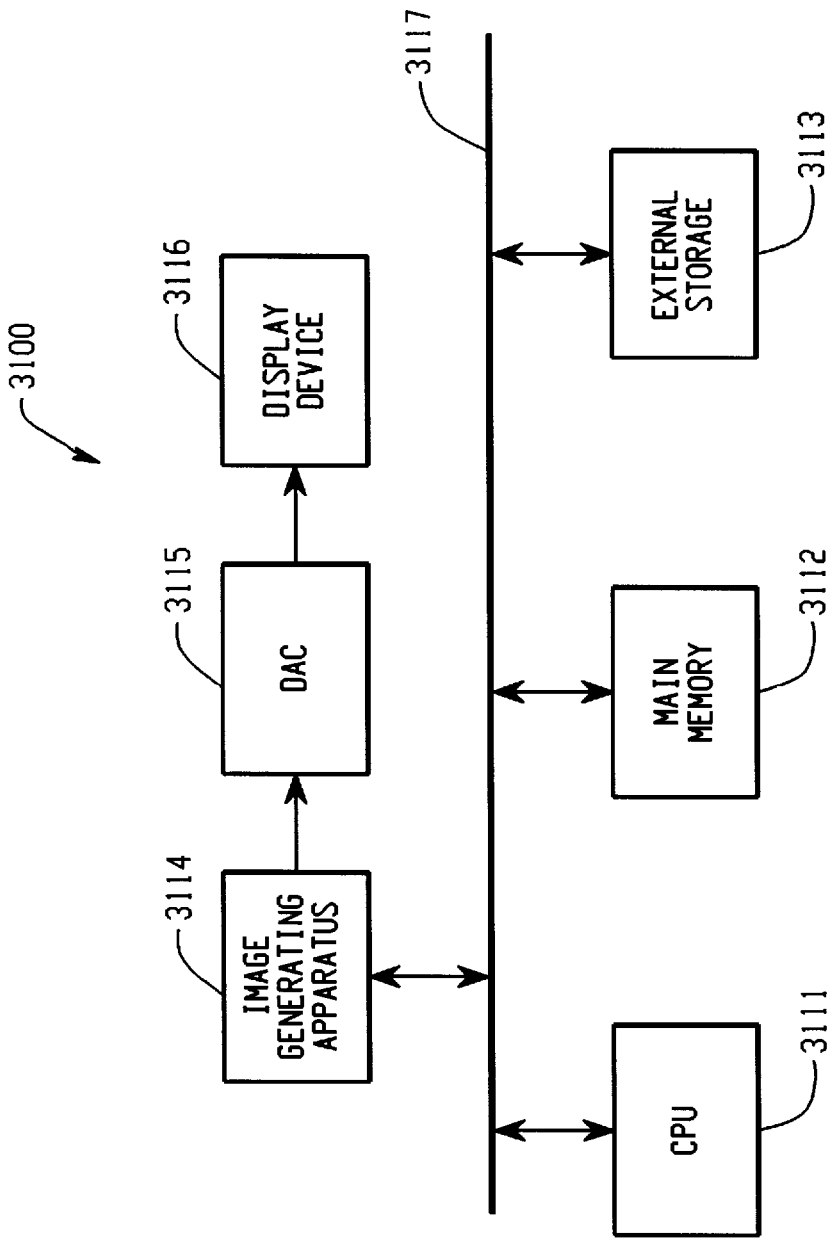
FIG. 31 is a diagram showing the configuration of an image generating system 3100 according to the present invention.

FIG. 31 shows the configuration of an image generating system 3100 according to the present invention. The configuration and operation of the image generating system 3100 will be described below in the following order.

1. The configuration of the image generating system 3100.

2. The configuration of an image generating apparatus 3114.

3. Texture mapping processing procedure in the image generating apparatus 3114.

4. Motion compensation processing procedure in the image generating apparatus 3114.

5. Conclusion

1. The configuration of the image generating system 3100

The image generating system 3100 includes a CPU 3111, a main memory 3112, an external storage 3113, the image generating apparatus 3114, a digital-analog converter (DAC) 3115, a display device 3116, and a system bus 3117;

The CPU 3111 controls the entire system, the image generating apparatus 3114, the external storage system 3113 and the like.

The main memory 3112 stores a program for image generating system control which is executed by the CPU 3111, a program including information for operation of each section of the system, an image and other data read out from the external storage 3113, and data used in a program.

The external storage 3113 stores compressed image data, texture image data, a plotting program and the like.

The configuration and operation of the image generating apparatus 3114 will described later.

The DAC 3115 performs DA conversion on the image data output from the image generating apparatus 3114 so that the image data can be displayed on the display device 3116.

The system bus 3117 connects the CPU 3111, the main memory 3112, the external storage 3113 and the image generating apparatus 3114 to each other so as to transmit the data therebetween.

2. The configuration of the image generating apparatus 3114

Figure 32:
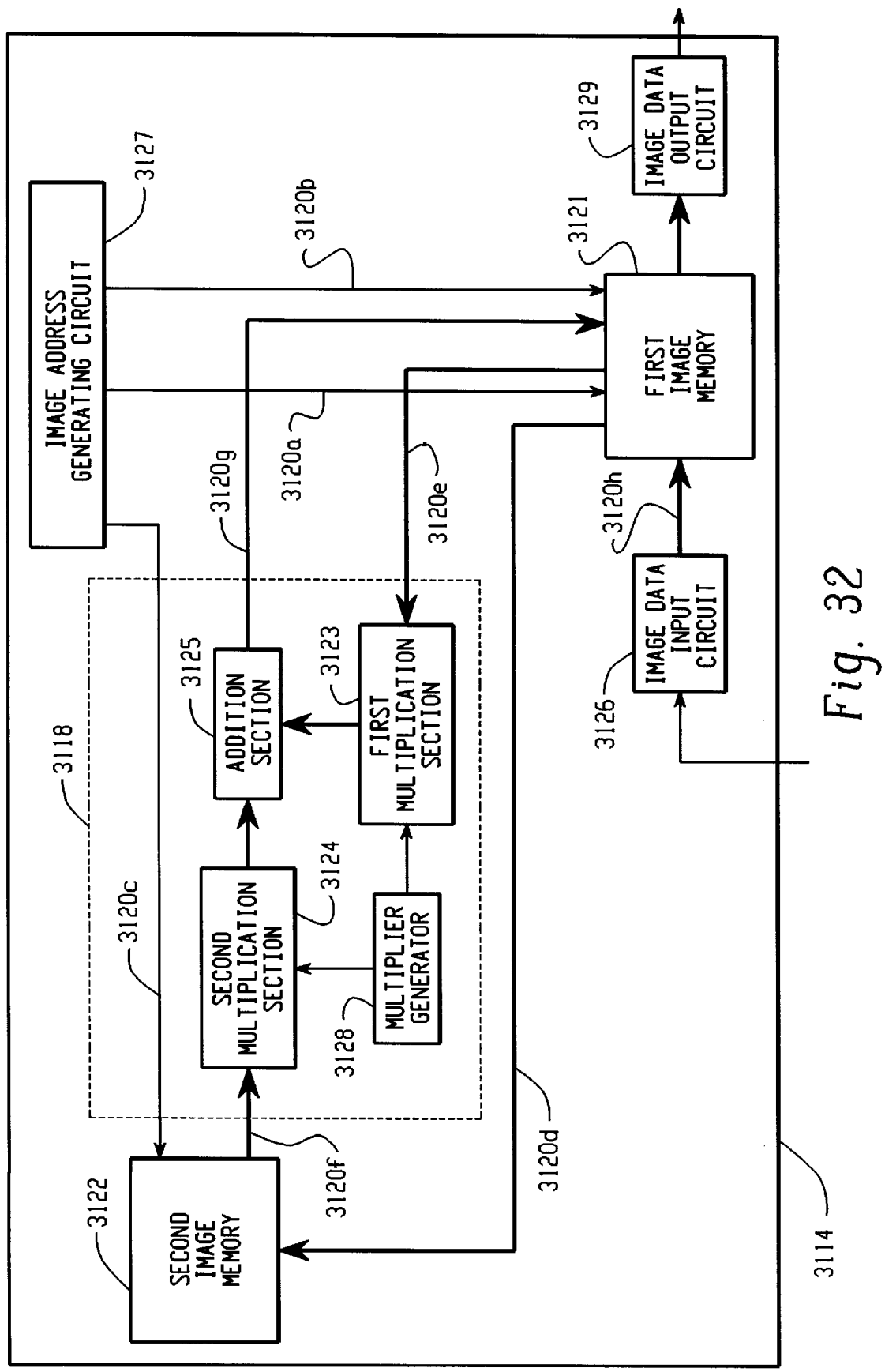
FIG. 32 is a diagram showing the configuration of an image generating apparatus 3114 included in the image generating system 3100.

FIG. 32 shows the configuration of the image generating apparatus 3114 shown in FIG. 31.

A first image memory 3121 has a region for storing image data for forward motion compensation prediction, a region for storing image data for backward motion compensation prediction and texture image data, and a region for storing currently generated image data.

A pixel position specifying circuit 3127 specifies one pixel position among a plurality of pixels stored in the first image memory 3121 by using a first image address signal 3120a. When the position of the pixel to be stored in the first image memory 3121 is specified by the pixel position specifying circuit 3127, the first image memory 3121 reads out the data corresponding to the specified position. Then, the first image memory 3121 outputs the data to a second image memory 3122 as a first image data signal 3120d.

The pixel position specifying circuit 3127 specifies one pixel position among a plurality of pixels stored in the first image memory 3121 by using a second image address signal 3120b. When the position of the pixel to be stored in the first image memory 3121 is specified by the pixel position specifying circuit 3127, the first image memory 3121 reads out the data corresponding to the specified position. Then, the first image memory 3121 outputs the data to a first multiplication section 3123 as a second image data signal 3120e, and writes a generated image data signal 3120g output from an addition section 3125 to the specified position.

A second image memory 3122 stores the image data to be written by the first image data signal 3120d read out from the first image memory 3121. The pixel position specifying circuit 3127 specifies one pixel position among a plurality of pixels to be stored in the second image memory 3122. The second image memory 3122 reads out the data corresponding to the specified position, and outputs the data to a second multiplication section 3124 as a third image data signal 3120f.

An image data input circuit 3126 writes texture image data or motion compensation differential image data specified by the CPU 3111 to the first image memory 3121 by using an image data input signal 3120h.

A first multiplication section 3123 multiplies the image data read out from the first image memory 3121 as the second image data signal 3120e by a first multiplication coefficient specified by a multiplier generator 3128, and outputs the result of the multiplication to an addition section 3125.

The second multiplication section 3124 multiplies the image data read from the second image memory 3122 as the third image data signal 3120f by a second multiplication coefficient specified by the multiplier generator 3128, and outputs the result of the multiplication to the addition section 3125.

The addition section 3125 adds a first multiplication image data signal output from the first multiplication section 3123 to a second multiplication image data signal output from the second multiplication section 3124, and outputs the result of the addition to the first image memory 3121 as a generated image data signal 3120g.

A pixel position specifying circuit 3127 outputs the first image address signal 3120a, the second image address signal 3120b and a third image address signal 3120c to the first image memory 3121. The first image address signal 3120a is used for indicating the position of a pixel to be read in the first image memory 3121 in accordance with the pixel position in a texture image to be texture mapped or the pixel position in a reference image block in motion compensation processing procedure. The second image address signal 3120b is used for indicating the position of a pixel to be read/written in the first image memory 3121 in accordance with the pixel position in a polygon to be texture mapped or the pixel position in motion compensation differential image data during moving picture expansion processing procedure. The third image address signal 3120c is used for indicating the position of a pixel to be read in the second image memory 3122 in accordance with the pixel position in a texture image to be texture mapped or the pixel position in a reference image block during motion compensation.

The multiplier generator 3128 generates a first multiplier signal indicating the first multiplier coefficient and a second multiplier signal indicating the second multiplier coefficient in accordance with a semi-transparency of a texture image in texture mapping, a semi-transparency in anti-aliasing processing procedure and a processing procedure in motion compensation. The first multiplier signal is output to the first multiplication section 3123, while the second multiplier signal is output to the second multiplication section 3124.

An image data output circuit 3129 sequentially reads out the image data stored in the first image memory 3121 for displaying an image, and outputs the read out image data to the DAC 3115.

Next, the operation of the thus configured image generating apparatus 3114 will be described.

3. Texture mapping processing procedure in the image generating apparatus 3114

The texture mapping processing procedure in the image generating apparatus 3114 will be described below.

Figure 34:
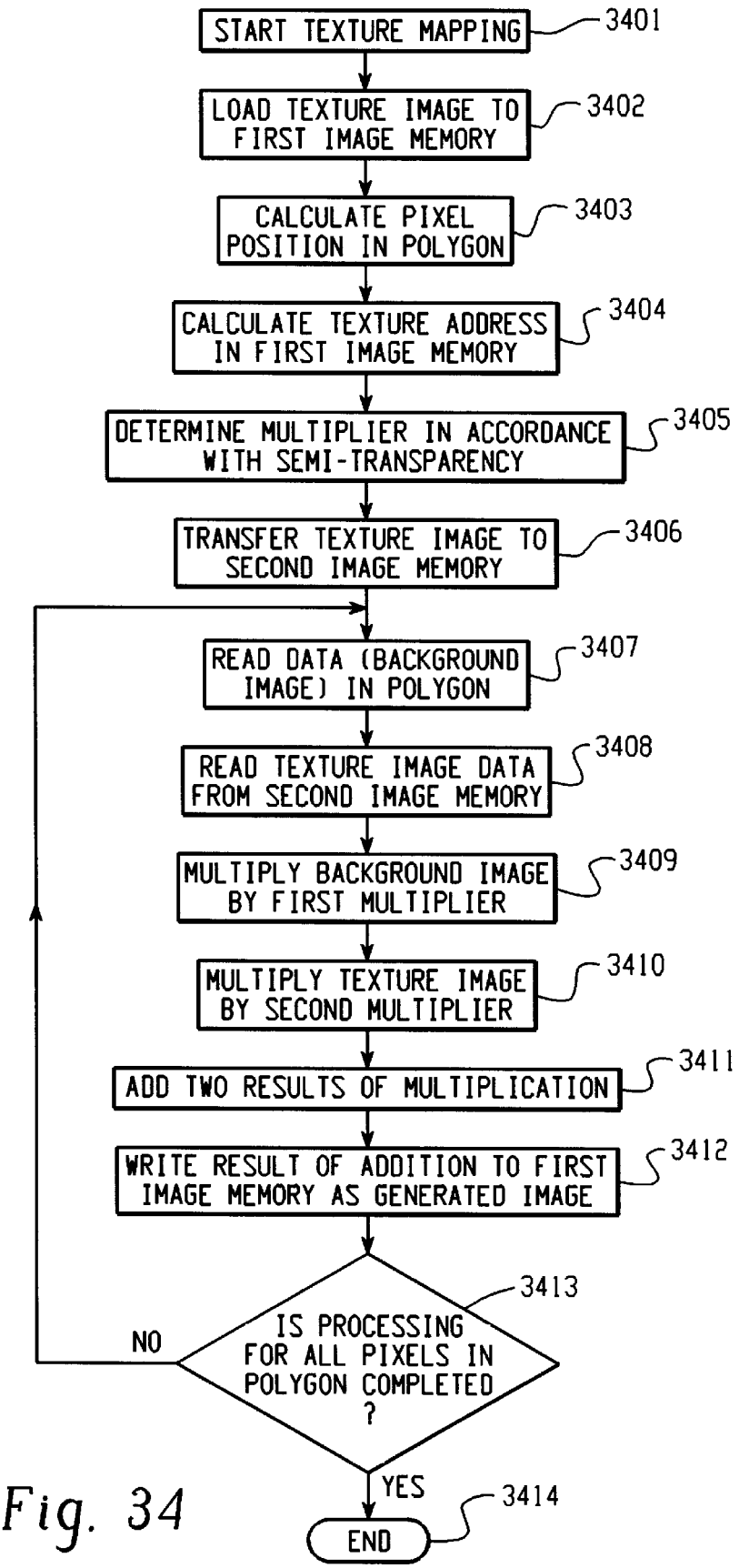
FIG. 34 is a flow chart showing a procedure of a texture mapping processing procedure when a texture image is mapped to one polygon in the image generating apparatus 3114.

FIG. 34 shows a procedure of texture mapping when a texture image is mapped to a polygon.

When the CPU 3111 issues a command for starting texture mapping (STEP 3401), the image data input circuit 3126 stores the texture image data to the first image memory 3121 (STEP 3402).

The pixel position specifying circuit 3127 calculates the position of each of the pixels constituting a polygon, to which a texture is to be mapped, based on vertex coordinates of the polygon. Then, the pixel position specifying circuit 3127 prepares to output a signal indicating the pixel position as the second image address signal 3120b (STEP 3403).

The pixel position specifying circuit 3127 calculates the pixel position in a texture image to be mapped to the polygon, and outputs a signal indicating the position as the first image address signal 3120a (STEP 3404).

The multiplier generator 3128 generates a first multiplier and a second multiplier in accordance with whether or not the texture image is semi-transparent or whether or not the generated pixel constitutes an edge of the polygon (STEP 3405). In the case where a semi-transparency of the texture image is α (1, if the texture image is opaque, 1; and 0, if the texture image is transparent), the second multiplier having a value of α is generated and input to the second multiplication section 3124, while the first multiplier having a value of (1−α) is generated and input to the first multiplication section 3123. In the case where the currently processed pixel constitutes an edge of the polygon, a semi-transparency coefficient β for anti-aliasing is calculated. Then, a multiplier coefficient having a value of αβ is output to the second multiplication section 3124, while a multiplier coefficient having a value of (1−αβ) is output to the first multiplication section 3123. In the case where the texture image is neither semi-transparent nor subjected to anti-aliasing processing procedure for an edge of the polygon, a multiplier "0" is input to the first multiplication section 3123 while a multiplier "1" is input to the second multiplication section 3124.

Next, the image data at the pixel position specified by the first image address signal 3120a (that is, the texture image) is read out from the first image memory 3121, and is written to the second image memory 3122 (STEP 3406).

In accordance with the second image address signal 3120b indicating each pixel position in the polygon obtained at STEP 3403, the pixel data of a corresponding pixel is read out from the first image memory 3121, and is input to the first multiplication section 3123 as the second image data signal 3120e (STEP 3407). The image data is previously present prior to mapping of the texture image to the specified position. Hereinafter, such image data is referred to as "background image data".

Simultaneously, the pixel position specifying circuit 3127 outputs an address of the texture image to be mapped to the pixel position indicated by the second image address signal 3120b in the second image memory 3122 as the third image address signal 3120c, and reads out a corresponding texture image for one pixel from the second image memory 3122 (STEP 3408). The image data read out from the second image memory 3122 is input to the second multiplication section 3124 as the third image data signal 3120f.

The first multiplication section 3123 multiplies the background image data read out from the first image memory 3121 by the first multiplier specified by the multiplier generator 3128 (STEP 3409).

The second multiplication section 3124 multiplies the image data read out from the second image memory 3122 by the second multiplier specified by the multiplier generator 3128 (STEP 3410).

The addition section 3125 adds the result of the multiplication output from the first multiplication section 3123 to the result of the multiplication output from the second multiplication section 3124 (STEP 3411).

The result of the addition in the addition section 3125 is written to the generated image pixel position in the first image memory 3121 as the generated image data signal 3120g (STEP 3412). The generated image pixel position is indicated by the second image address signal 3120b. In this way, mapping processing procedure for one pixel in the polygon is completed.

At STEP 3413, it is determined whether or not all of the pixels in the polygon are processed. If not, STEP 3407 to STEP 3412 are repeated.

If all the pixels in the polygon are processed, the texture mapping processing procedure for one polygon is completed (STEP 3414).

By performing the above operation for all of the polygons constituting the generated image, the image generating apparatus 3414 realizes the texture mapping processing procedure.

Figure 35D:
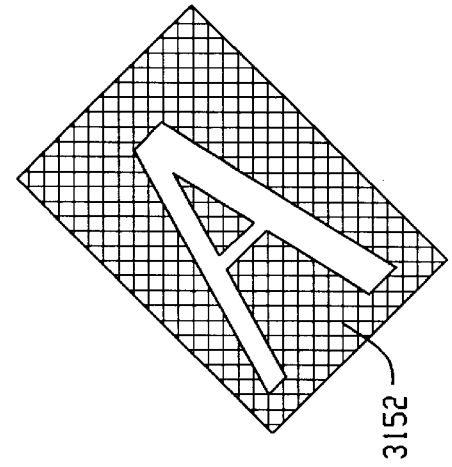
FIG. 35D shows the state of a polygon to which a texture image is mapped.
Figure 35A:
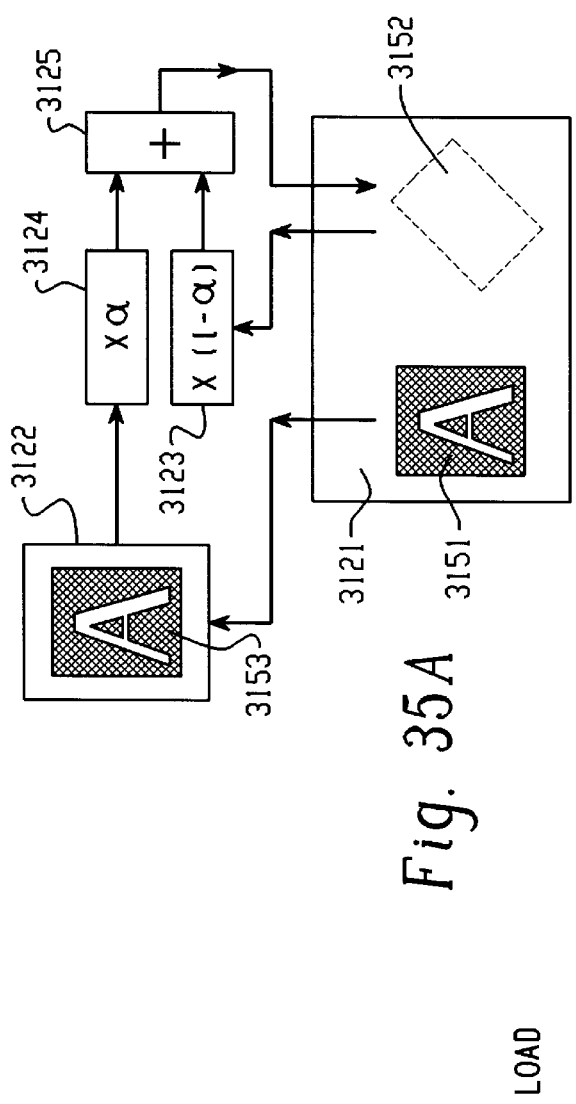
FIG. 35A is a diagram specifically showing the flow of image data in a texture mapping processing procedure.

FIG. 35A specifically shows the flow of image data in the aforementioned texture mapping processing procedure. In FIG. 35A, the same components as those in FIG. 32 are denoted by the same reference numerals.

More specifically, the reference numeral 3121 denotes the first image memory; the reference numeral 3122 denotes the second image memory; the reference numeral 3123 denotes the first multiplication section; the reference numeral 3124 denotes the second multiplication section; and the reference numeral 3125 denotes the addition section.

The reference numerals 3151 and 3153 denote texture images. The reference numeral 3152 denotes a generated image (polygon) to which the texture image 3151 is to be mapped. The texture image 3151 is read out to the first image memory 3121 at STEP 3402 above.

At STEP 3406, the texture image 3151 in the first image memory 3121 is transferred to the second image memory 3122.

In the case where a semi-transparent polygon having a transparency of α is processed, the background image in the polygon 3152 is sequentially read out at STEP 3407 to STEP 3412. Then, the background image is multiplied by (1−α) by the first multiplication section 3123. Simultaneously, the pixel to be mapped to this pixel position is read out from the texture image 3153 in the second image memory 3122, and is multiplied by α by the second multiplication section 3124 to be input to the addition section 3125. The generated image data output from the addition section 3125 is written to the same pixel position in the polygon 3152.

Figure 35C:
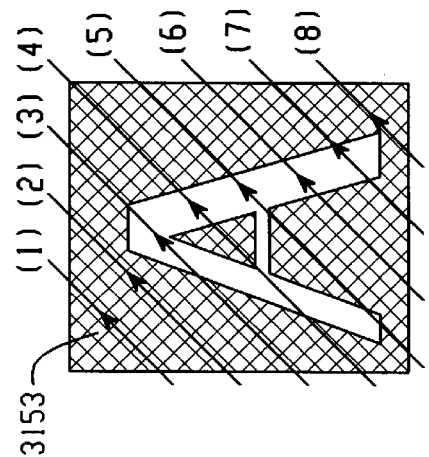
FIG. 35C shows the order of pixels to be read in the texture image.
Figure 35B:
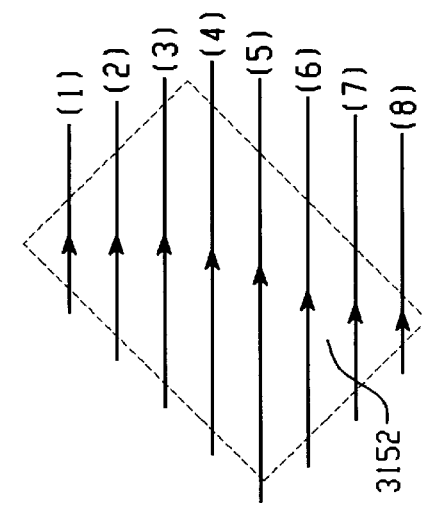
FIG. 35B shows the order of pixels to be read/written.

FIG. 35B shows horizontal lines indicating the order of pixels to be read/written, which are overwritten on the polygon 3152. The pixels in the polygon 3152 are read out in the order of the horizontal lines (1) to (8), and the generated image data is written to the position of the read out pixel. FIG. 35C shows the order of reading the pixels in the texture image 3153, which corresponds to the order shown in FIG. 35B. The pixels in the texture image are read out in order or straight lines (1) to (8).

The order of the pixel positions specified by the second image address signal 3120a and the third image address signal 3120b output from the pixel position specifying circuit 3127 corresponds to the order of accessing the pixels shown in FIGS. 35B and 35C.

FIG. 35D shows the state of the polygon 3152 after the texture image 3153 is mapped thereto. In FIG. 35D, the background image is omitted for simplification of the description.

The texture image to be transmitted to the second image memory 3122 has sufficient size so as to be mapped to one polygon in the above description. However, the texture image to be transmitted to the second image memory 3122 may have any size regardless of the size of the polygon.

In the case where the second image memory 3122 is smaller than the texture image to be mapped to one polygon, the size of the texture image which can be transmitted to the second image memory 3122 at a time is not sufficient to be mapped to one polygon. Therefore, the texture image to be mapped to one polygon should be transmitted to the second image memory 3122 over a plurality of times. In such a case, STEP 3406 for transferring the texture image from the first image memory 3121 to the second image memory 3122 is included in STEPs 3407 to 3412, and this transfer operation is repeated a plurality of times as needed.

In the case where the size of the second image memory 3122 is larger than that of the texture image to be mapped to one polygon, it is possible to transfer all texture images required to be mapped to one polygon by performing STEP 3406 once. As a result, since the number of times the first image memory 3121 is accessed is reduced, the processing speed is improved.

4. Moving picture expansion processing procedure in the image generating apparatus 3114

Next, the moving picture expansion processing procedure in the image generating apparatus 3114 will be described. The moving picture compressed by inter-frame motion compensation prediction coding is successively expanded for each of the image blocks constituting the image.

Figure 36:
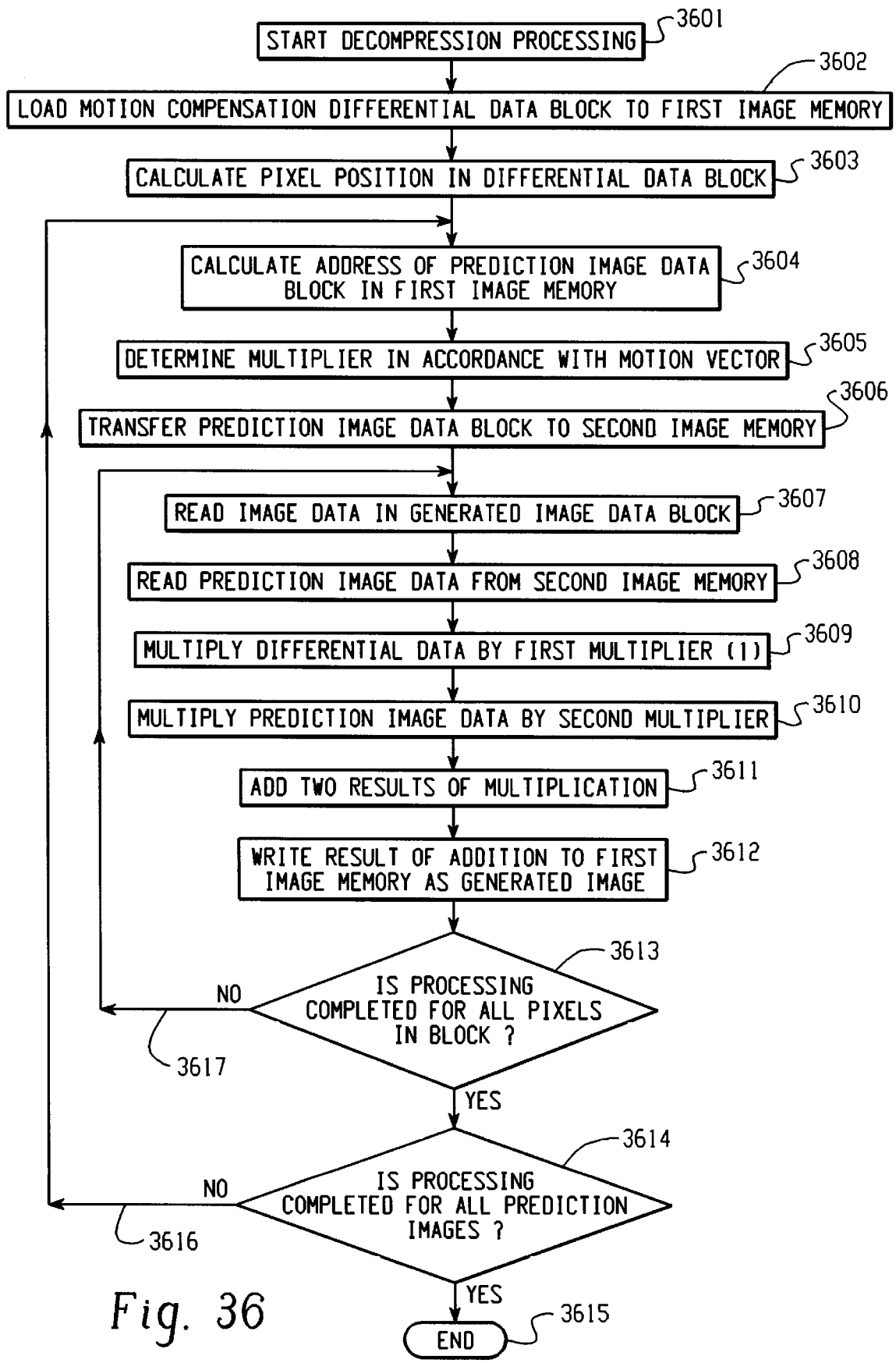
FIG. 36 is a flow chart showing a procedure of a moving picture expansion processing procedure for one image block in the image generating apparatus 3114.

FIG. 36 shows a procedure of the moving picture expansion processing procedure for one image block.

When the CPU 3111 issues a command for expanding an image block (STEP 3601), the image data input circuit 3126 stores the motion compensation differential data of the image block into the first image memory 3121 (STEP 3602). The first image memory 3121 stores a forward prediction image or a backward prediction image with respect to the image to be expanded, as needed. These prediction images are either read out from the external storage 3113 and written to the image generating apparatus 3114 by the CPU 3111 or are previously generated in the image generating apparatus 3114.

The pixel position specifying circuit 3127 calculates the position of each of the pixels constituting the image block to be expanded (that is, the pixel position to which motion compensation differential data is written), and prepares to output a signal indicating the pixel position to the first image memory 3121 as the second image address signal 3120b (STEP 3603).

The pixel position specifying circuit 3127 calculates the pixel position of an image of the prediction image data block from the first prediction image in accordance with a value of a motion vector, and outputs a signal indicating the pixel position to the first image memory 3121 as the first image address signal 3120a (STEP 3604).

The number of times to read out the prediction image data block to be added to a generated image block is calculated in accordance with the type of prediction image used for motion prediction and the value of the motion vector. Based on the thus calculated number of reads, a second multiplier is generated (STEP 3605). A method for calculating the second multiplier will be described later in detail. A first multiplier is always determined to be "1" during motion expansion processing procedure.

Next, the image data at the pixel position specified by the first image address signal 3120a (that is, the image data of a prediction image data block) is read out from the first image memory 3121, and is written to the second image memory 3122 (STEP 3606).

The pixel data of a corresponding pixel (that is, motion compensation differential data) is read out from the first image memory 3121 in accordance with the second address image signal 3120b indicating the position of each of the pixels constituting the image block, which is obtained at STEP 3603. Then, the pixel of data is input to the first multiplication section 3123 as the second image data signal 3120e (STEP 3607).

Simultaneously, the pixel position specifying circuit 3127 outputs the address of the prediction image in the second image memory 3122, corresponding to the motion compensation differential data at the pixel position indicated by the second image address signal 3120b as the third image address signal 3120c, and reads out a corresponding pixel in the prediction image from the second image memory 3122 (STEP 3608). The image data read out from the second image memory 3122 is input to the second multiplication section 3124 as the third image data signal 3120f.

The first multiplication section 3123 multiplies the differential data read out from the first image memory 3121 by the first multiplier specified by the multiplier generator 3128 (STEP 3609). As determined at STEP 3605, the first multiplier is always "1".

The second multiplication section 3124 multiplies the image data read out from the second image memory 3122 by the second multiplier specified by the multiplier generator 3128 (STEP 3610).

The addition section 3125 adds the result of the multiplication output from the first multiplication section 3123 to the result of the multiplication output from the second multiplication section 3124 (STEP 3611).

The result of the addition by the addition section 3125 is written to the generated image pixel position in the first image memory 3121 as the generated image data signal 3120g (STEP 3612). The generated image pixel position is a pixel indicated by the second image address signal 3120b. In this way, processing procedure of one pixel in the image block for one prediction image is completed.

At STEP 3613, it is determined whether or not all of the pixels in the image block are processed. If the processing procedure for all of the pixels is not completed, STEP 3607 to STEP 3612 are repeated.

At STEP 3614, it is determined whether or not processing is completed for all of the required prediction images. If the currently processed image block is required to be added for another prediction image, STEP 3604 to STEP 3613 are repeated.

In this way, the expansion processing procedure for one image block is completed (STEP 3615).

By performing the aforementioned operation for all of the image blocks constituting the generated image, the image generating apparatus 3414 realizes the moving picture expansion processing procedure.

Figures 37A, 37B, 37C:
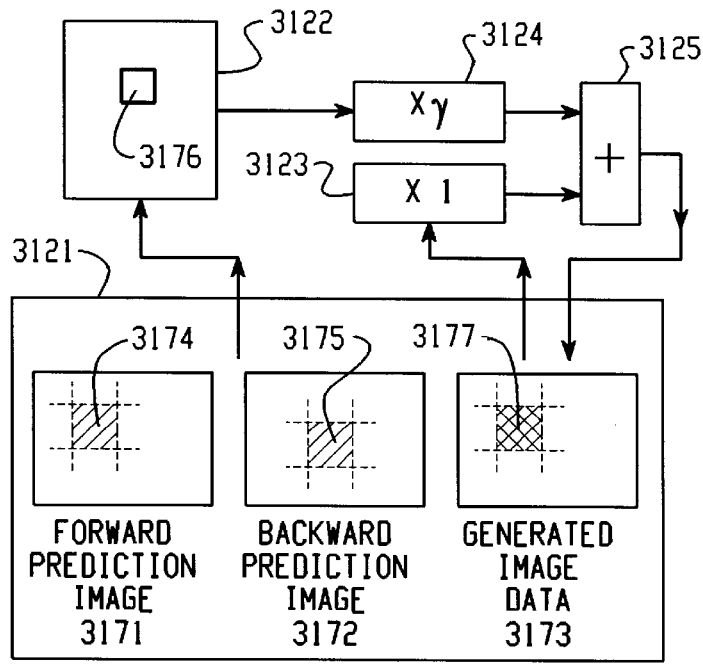
FIG. 37A is a diagram specifically showing the flow of image data in a moving picture expansion processing procedure.
FIG. 37B shows the result of a processing procedure by using a forward motion prediction image block.
FIG. 37C shows the result of processing procedure performed for the image shown in FIG. 37B by using a backward motion prediction image block.

FIG. 37A specifically shows the flow of image data in moving picture expansion processing procedure in the case where the image blocks to be expanded are compressed by using forward and backward prediction images. In FIG. 37A, the same components as those in FIG. 35A are denoted by the same reference numerals.

More specifically, the reference numeral 3121 denotes the first image memory; the reference numeral 3122 denotes the second image memory; the reference numeral 3123 denotes the first multiplication section; the reference numeral 3124 denotes the second multiplication section; and the reference numeral 3125 denotes the addition section.

The reference numeral 3171 denotes forward prediction image data, while the reference numeral 3172 denotes backward prediction image data. The reference numeral 3173 denotes a region storing the generated image data. The reference numeral 3174 denotes a forward prediction image data block; the reference numeral 3175 denotes a backward prediction image data block; the reference numeral 3176 denotes a prediction image data block; and the reference numeral 3177 denotes a generated image data block.

FIG. 37A shows the image data in the image generating apparatus 3114 when processing procedure at STEP 3602 is completed, that is, when a motion compensation differential data block is loaded into the first image memory 3121. More specifically, the contents of the generated image data block 3177 correspond to motion prediction differential data.

FIG. 37B shows the result of processing procedure using the forward prediction image block. More specifically, the result is obtained by performing STEP 3604 to STEP 3614 shown in FIG. 36 for the forward prediction image block. The pixel data in the motion compensation differential data block stored in the generated image data block 3177 is represented by D(x, y), and the pixel data stored in the forward prediction image data block 3174 is represented by F(x, y). As a result of processing procedure by using the forward prediction image block, the image data G1(x, y) expressed by Equation 9 is written to the generated image data block 3177.

$$G1(x, y)=D(x, y)+F(x, y)\times\gamma \qquad \text{[Equation 9]}$$

where $\gamma$ is a multiplier supplied to the second multiplication section 3124. In this case, $\gamma$ is 0.5.

FIG. 37C shows the result of processing procedure the result of FIG. 37B by using the backward prediction image block, that is, the result obtained by performing STEP 3604 to STEP 3613 shown in FIG. 36 for the backward prediction image block. The pixel data stored in the backward prediction image data block 3175 is represented by R(x, y). As a result of processing procedure the pixel data by using the backward prediction image block, the pixel data G2(x, y) as expressed by Equation 10 is written to the generated image data block 3177.

$$G2(x, y)=G1(x, y)+R(x, y)\times\gamma \qquad \text{[Equation 10]}$$

where $\gamma$ is a multiplier supplied to the second multiplication section 3124. In this case, $\gamma$ is 0.5.

When Equation 10 is reduced to Equation 11, it is understood that the pixel value of the generated image data block is equal to a value obtained by adding the motion compensation data to the average of the two prediction image blocks.

[Equation 11]

$$\begin{aligned} G2(x, y) &= G1(x, y) + R(x, y) \times \gamma \\ &= \{D(x, y) + F(x,y) \times \gamma\} + R(x, y) \times \gamma \\ &= \{F(x, y) + R(x, y)\} \times \gamma + D(x, y) \end{aligned}$$
Since $\gamma = 0.5$,
$$G2(x,y) = \{F(x, y) + R(x, y)\}/2 + D(x, y)$$

FIGS. 37A to 37C show the expansion processing procedure in the case where the image block to be expanded is compressed by using two prediction images, i.e., forward prediction image and backward prediction image. Next, the expansion processing procedure in the case where the image block to be expanded is compressed by using either forward prediction image or backward prediction image is described.

STEP 3604 to STEP 3613 shown in FIG. 36 are performed for either forward prediction image block or backward prediction image block. The result G1(x, y) is as expressed by Equation 12.

$$G1(x, y)=D(x, y)+F(x, y)\times\gamma \qquad \text{[Equation 12]}$$

where $\gamma$ is 1.

Next, the expansion processing procedure in the case where a value of a motion vector is supplied in a unit of a half-pixel will be described. Also in this case, STEP 3604 to STEP 3613 are repeated for both or any one of forward prediction image and backward prediction image used for compression. In this case, however, for the prediction image to which a value of a motion vector is supplied in a unit of a half-pixel, STEP 3604 to STEP 3613 are repeated twice or four times for a prediction image block shifted by one pixel. In accordance with the number of repeated steps and whether or not both forward prediction image and backward prediction image are used, the multiplier $\gamma$ supplied to the second multiplication section 3124 is changed.

FIGS. 38A to 38C show prediction image blocks in the case where a value of a motion vector is supplied by a unit of a half-pixel. In FIGS. 38A to 38C, it is assumed that one image block is constituted by 4×4 pixels. A horizontal direction is indicated by x, and a vertical direction is indicated by y. ○ represents one pixel constituting a prediction image block. The numbers 16 to 20 above the image block and the numbers 21 to 25 on the right of the image block are addresses indicating the pixel positions.

As shown in FIG. 38A, regarding the prediction image block for which a motion vector is horizontally specified by a unit of a half-pixel, a prediction block Q0(x, y) is first processed. Next, a prediction block Q1(x, y) is processed. In this way, the processing procedure is performed twice.

As shown in FIG. 38B, regarding the prediction image block for which a motion vector is vertically specified by a unit of a half-pixel, the prediction block Q0(x, y) is first processed. Next, a prediction block Q2(x, y) is processed. In this way, the processing procedure is performed twice.

As shown in FIG. 38C, regarding the prediction image block for which a motion vector is both horizontally and vertically specified by a unit of a half-pixel, a prediction blocks Q0(x, y), Q1(x, y), Q2(x, y) and Q3(x, y). In this way, the processing procedure is performed four times. A value of $\gamma$ set to the second multiplication section 3124 when performing the above processing procedure is shown in Table 2.

TABLE 2

|  | One prediction image | Two prediction images | Corresponding Figure |
| --- | --- | --- | --- |
| No half-pixel shift | 1.0 | 0.5 | FIG. 37 |
| Half-pixel shift (vertically or horizontally) | 0.5 | 0.25 | FIGS. 38A and 38B |
| Half-pixel shift (vertically and horizontally) | 0.25 | 0.125 | FIG. 38C |

As shown in Table 2, a value of $\gamma$ changes in accordance with the number of prediction images used for compressing an original image block.

Equation 13 expresses the intermediate and final results of the expansion processing procedure in the case where the forward prediction image block is specified vertically and horizontally by a unit of a half-pixel in the image block compressed by using the forward prediction image and backward prediction image and the backward prediction image block is specified only horizontally by a unit of a half-pixel. G1(x, y), G2(x, y), G3(x, y), G4(x, y) and G5(x, y) represent pixel values of the generated image block which is currently expanded, and G6(x, y) represents the final result of the expansion processing procedure. As can be inferred from FIG. 38C, F0(x, y), F1(x, y), F2(x, y) and F3(x, y) represent pixel values of four image blocks each being shifted by half-pixel in the prediction block of the forward prediction image, and R0(x,y) and R1(x,y) represent pixel values of two image blocks each being shifted by half-pixel in the prediction block of the backward prediction image.

$$G1(x,y)=D(x,y)+F0(x,y)\times 0.125$$

$$G2(x,y)=G1(x,y)+F1(x,y)\times 0.125$$

$$G3(x,y)=G2(x,y)+F2(x,y)\times 0.125$$

$$G4(x,y)=G3(x,y)+F3(x,y)\times 0.125$$

$$G5(x,y)=G4(x,y)+R0(x,y)\times 0.25$$

$$G6(x,y)=G5(x,y)+R1(x,y)\times 0.25 \qquad \text{[Equation 13]}$$

When the result $G6(x,y)$ is reduced, Equation 14 is obtained. According to Equation 14, the pixel value of the generated image data block is equal to a value obtained by adding the average of a plurality of prediction image blocks shifted by one pixel which are read out in accordance with the motion vectors for forward and backward prediction images to the motion compensation differential data.

$$G6(x,y)=[\{F0(x,y)+F1(x,y)+F2(x,y)+F3(x,y)\}/4+\{R0(x,y)+R1(x,y)\}/2]/2+D(x,y) \qquad \text{[Equation 14]}$$

By performing similar processing procedure for the combinations other than that expressed by Equation 13, the expansion processing procedure of the image block can be realized.

5. Conclusion

As described above, according to the present invention, it is possible to perform expansion processing procedure of a moving picture compressed by using interframe motion compensation prediction coding and texture mapping processing procedure including texture mapping of a semi-transparent texture image and anti-aliasing processing procedure of a polygon edge by using a single image generating apparatus 3114.

The image generating apparatus 3114 described above includes the second multiplication section 3124 so as to enable an anti-aliasing processing procedure of the semi-transparent texture image and the polygon edge and an expansion processing procedure using a plurality of prediction images.

In the texture mapping processing procedure, however, in the case where the texture image is always opaque (that is, a semi-transparency is always 1), the second multiplication section 3124 may be omitted. In this case, the multiplier generator 3128 outputs a multiplier "0" to the first multiplication section 3123. As a result, the generated image data signal output from the addition section 3125 contains no background image component but texture image components.

In the expansion processing procedure, in the case where the image block is compressed by using either the forward prediction image data or the backward prediction image data and a value of the motion vector is specified by a unit of pixel, the second multiplication section 3124 may be omitted. In this case, the multiplier generator 3128 outputs a multiplier "1" to the first multiplication section 3123. As a result, the generated image data signal output from the addition section 3124 contain the result obtained by adding data of one prediction image and motion compensation differential image data.

In this way, even the image generating apparatus lacking the second multiplication section 3124 can realize both texture mapping processing procedure and moving picture expansion processing procedure under specific conditions. The realizable processing procedure may be basic processing.

EXAMPLE 4

The configuration and operation of an image generating system 3100' will be described below in the following order.

1. The configuration of the image generating system 3100'.
2. The configuration of an image generating apparatus 3114'.
3. Texture mapping processing procedure in the image generating apparatus 3114'.
4. Motion compensation processing procedure in the image generating apparatus 3114'.
5. Conclusion 1. The configuration of the image generating system 3100'

The configuration of the image generating system 3100' is the same as that of the image generating system 3100 except for an image generating apparatus 3114'. Therefore, the same components are denoted by the same reference numerals, and the description thereof is herein omitted.

2. The configuration of the image generating apparatus 3114'

Figure 33:
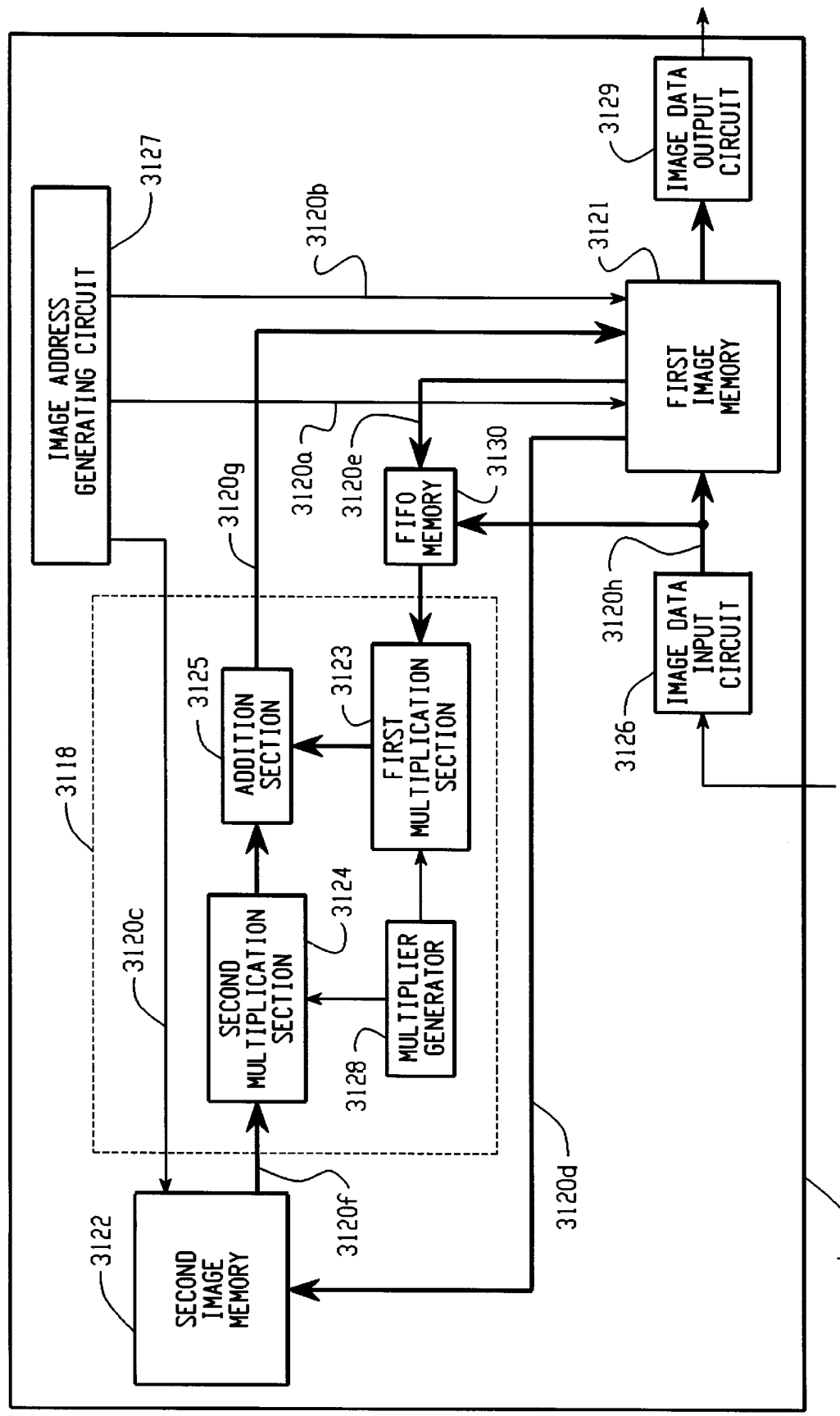
FIG. 33 is a diagram showing the configuration of an image generating apparatus 3114' included in an image generating system 3100'.

FIG. 33 shows the configuration of the image generating apparatus 3114'. The configuration of the image generating apparatus 3114' is the same as that of the image generating apparatus 3114 shown in FIG. 32 except that a FIFO memory 3130 is added. Therefore, the same components are denoted by the same reference numerals, and the description thereof is herein omitted.

The second image data signal 3120e read out from the position specified by the second image address signal 3120d is input to the FIFO memory 3130 prior to being input to the first multiplication section 3123, and is held therein. Furthermore, the image generating apparatus 3114' is configured so as to directly write the image data input signal received from the image data input circuit 3126 to the FIFO memory 3130. Therefore, in response to the image data input signal, the image data input circuit 3126 writes the texture image data or the motion compensation differential image data to the first image memory 3121 or the FIFO memory 3130. The FIFO memory 3130 stores the image data written by the image data input signal output from the image data input circuit 3126 or the image data input from the first image memory 3121 as the second image data signal 3120e, and outputs them as a fourth image data signal.

Hereinafter, the operation of the thus configured image generating apparatus 3114' will be described. The operation of the image generating apparatus 3114' differs from that of the image generating apparatus 3114 only in part. Therefore, only the operation of the image generating apparatus 3114' differing from that of the image generating apparatus 3114 will be described below in detail.

3. Texture mapping processing procedure in the image generating apparatus 3114'

Hereinafter, the texture mapping processing procedure in the image generating apparatus 3114' will be described.

The procedure of the texture mapping for mapping a texture image to one polygon is as shown in FIG. 34.

The FIFO memory 3130 serves as a buffer memory. The second image data signal (image data in the polygon which is present at the generated image position prior to mapping of the texture image, that is, background image data) read out from the position specified by the second image address signal 3120b is temporarily stored in the FIFO memory 3130 before being input to the first multiplication section 3123.

The operation of the FIFO memory 3130 is included in STEP 3407 shown in FIG. 34. At STEP 3407, in accordance with the second image address signal 3120b indicating each pixel position in the polygon obtained at STEP 3403, the image data of a corresponding pixel is read out from the first image memory 3121 as the second image data signal 3120e. Then, the image data is input to the first multiplication section 3123 as the fourth image data signal via the FIFO memory 3130.

The other operations in the texture mapping processing procedure are the same as those of the image generating apparatus 3114 shown in FIG. 32. In this way, the texture mapping processing procedure including the texture mapping of a semi-transparent texture image and anti-aliasing processing procedure of a polygon edge can be realized.

4. Moving picture expansion processing procedure in the image generating apparatus 3114'

Next, the moving picture expansion processing procedure in the image generating apparatus 3114' will be described.

Figure 39:
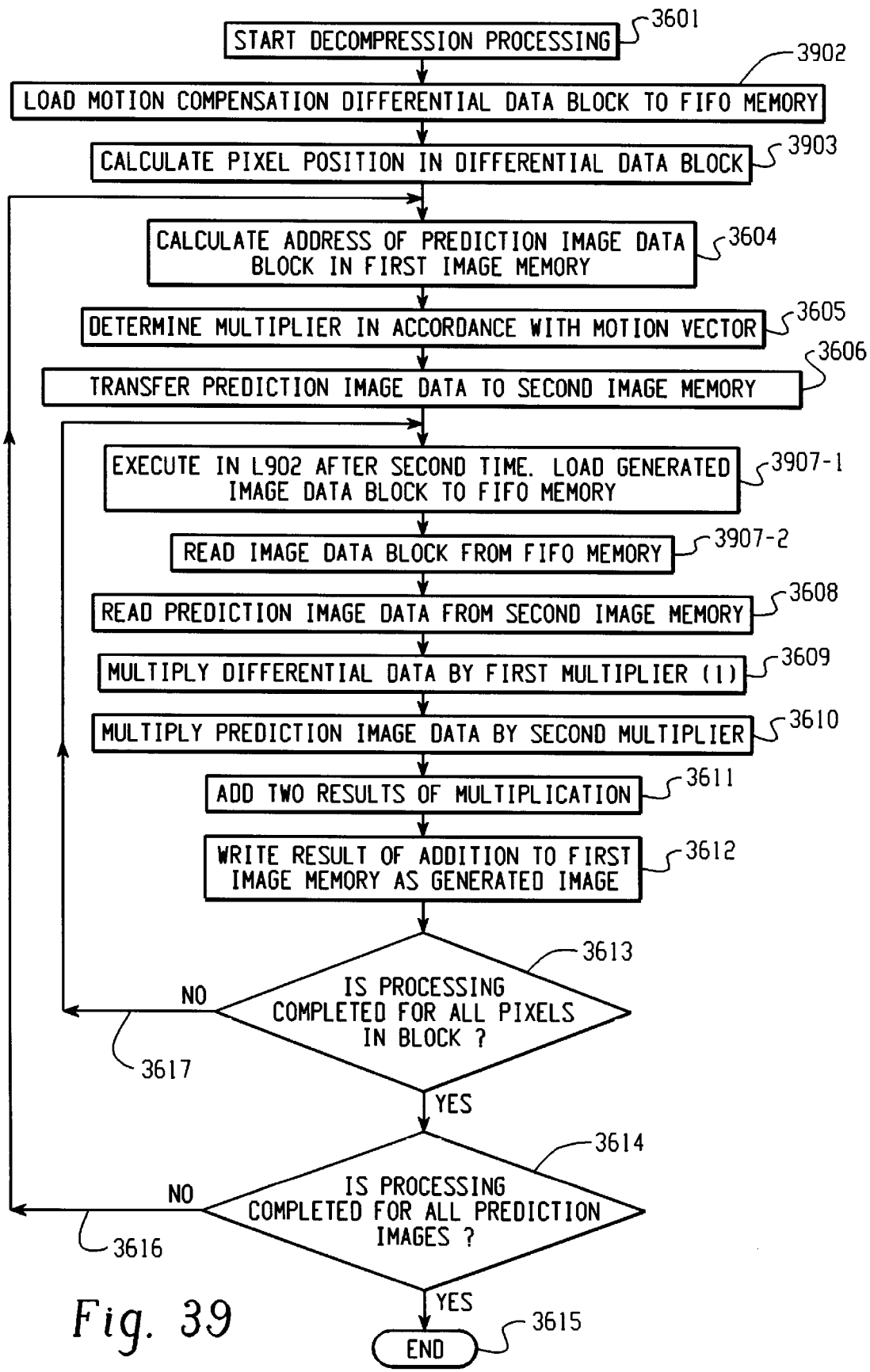
FIG. 39 is a flow chart showing a procedure of a moving picture expansion processing procedure for one image block in the image generating apparatus 3114'.
Figure 40:
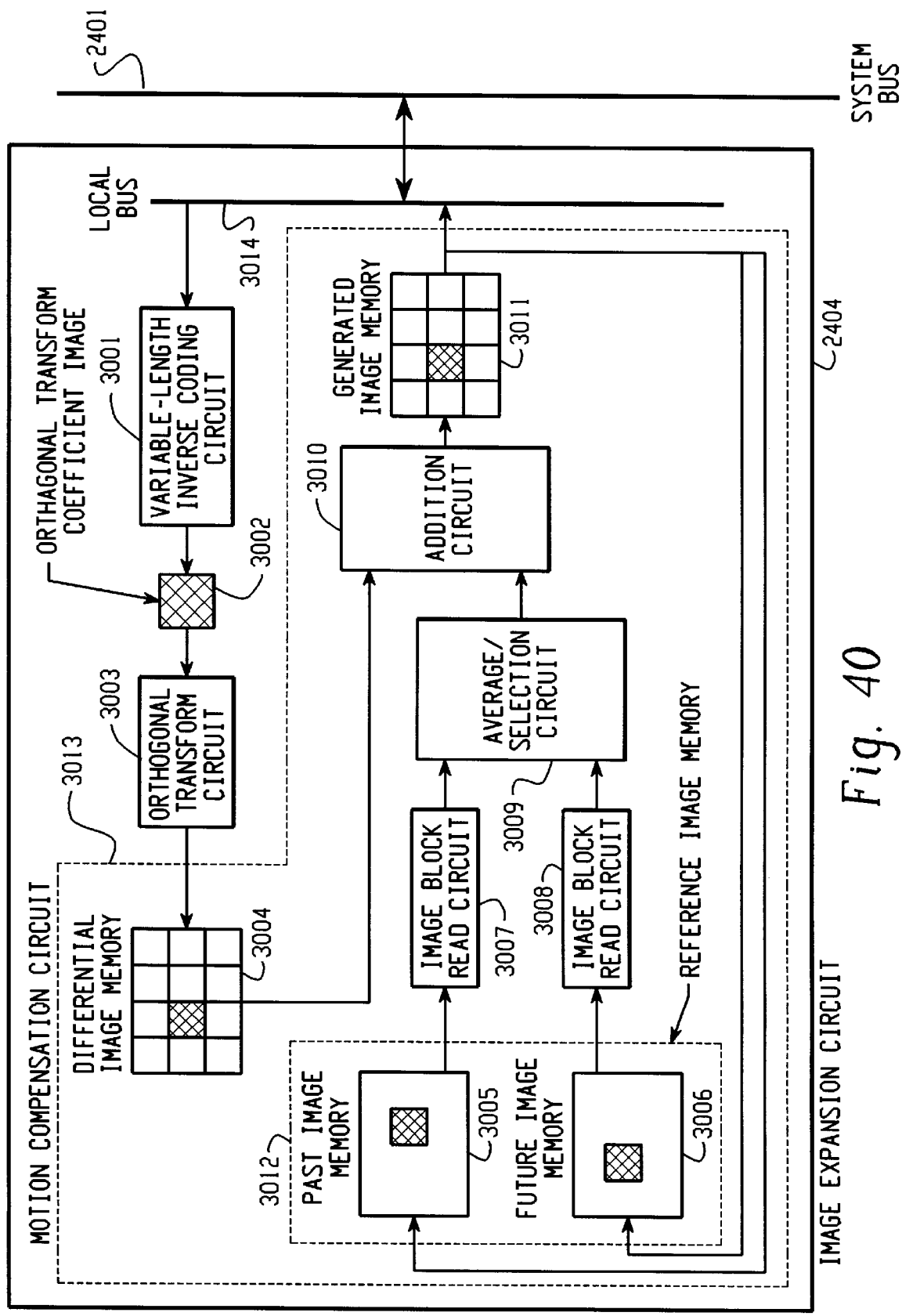
FIG. 40 is a diagram showing the inner configuration of an image expansion circuit 2404 shown in FIG. 27.
Figure 41:
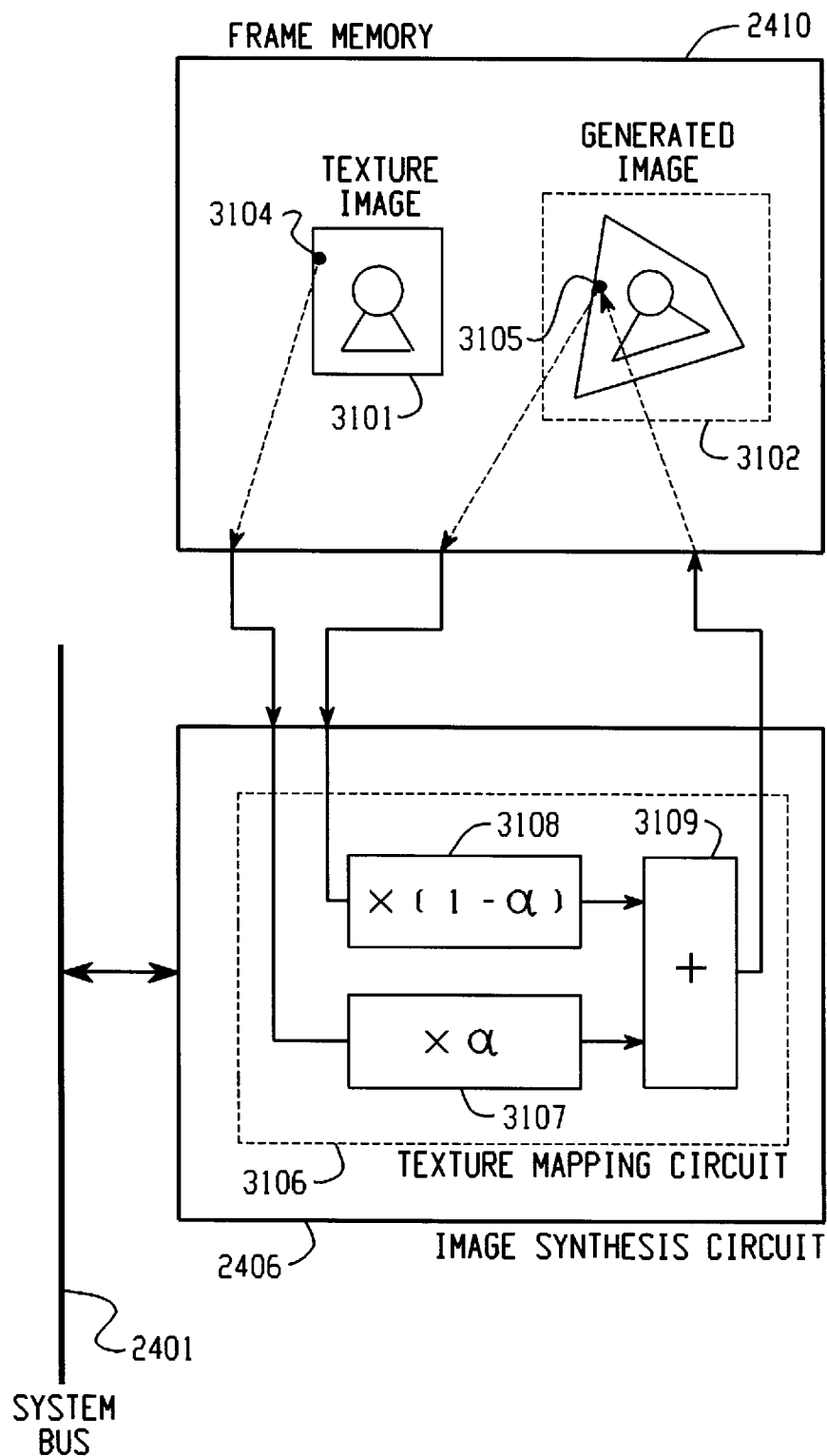
FIG. 41 is a diagram for illustrating the operation of a conventional texture mapping processing procedure performed in an image synthesis circuit 2406 and a frame memory 2410 as shown in FIG. 27.

FIG. 39 shows the operation procedure of expansion processing procedure for one image block. The operations shown in FIG. 39 are the same as those in FIG. 36 except for STEP 3902, STEP 3903, STEP 3907-1 and STEP 3907-2. In FIG. 39, the same operations as those in FIG. 36 are denoted by the same reference numerals.

When a command for expanding the image block is issued from the CPU 3111 (STEP 3601), the image data input circuit 3126 stores the motion compensation differential data of the image block into the FIFO memory 3130 (STEP 3902). The first image memory 3121 stores the forward prediction image or the backward prediction image for the image to be expanded as needed. These prediction images are either images read from the external storage 3113 and written to the image generating apparatus 3114' or are previously generated in the image generating apparatus 3114'.

The pixel position specifying circuit 3127 calculates the position of each pixels constituting the image block to be expanded (that is, the pixel position to which motion compensation differential data is written), and prepares to output a signal indicating the position to the first image memory 3121 as the second image address signal 3120b (STEP 3903). The order of the pixel positions indicated by the second image address signal 3120b corresponds to the order of reading out the motion compensation differential data of the image block to be expanded from the FIFO memory 3130.

Next, the pixel position specifying circuit 3127 calculates the pixel position of the image of the prediction image data block in accordance with a value of the motion vector from the first prediction image, and outputs the signal indicating the position to the first image memory 3121 as the first image address signal 3120a (STEP 3604).

In accordance with the type of a prediction image used for motion prediction and a value of the motion vector, the number of times the prediction image data block to be added to the generated image block will be read is calculated. Based on the thus calculated number of reads, the second multiplier is generated (STEP 3605). A method for calculating the second multiplier is described in Example 3 in detail. The first multiplier is always set at "1" during moving picture expansion processing procedure.

Next, the image data at the pixel position specified by the first image address signal 3120a (that is, the image data of the prediction image data block) is read out from the first image memory 3121, and is written to the second image memory 3122 (STEP 3606).

In accordance with the second image address signal 3120b indicating the position of each of the pixels constituting the image block obtained at STEP 3603, the pixel data of a corresponding pixel (that is, motion compensation differential data) is read out from the FIFO 3130. Then, the pixel data is input to the first multiplication section 3123 as the fourth image data signal (STEP 3907-2).

The processing procedure at STEP 3608 to STEP 3613 is the same as that in Example 3.

At STEP 3614, it is determined whether or not processing is completed for all of the required prediction images. If the currently processed image block is required to be added for other prediction image, processing at STEP 3604 to STEP 3613 is repeated.

In Example 4, in the processing operation at STEP 3907 for the second and subsequent images, the image data is read out from the pixel position in the generated image region in the first image memory 3131, and is input to the first multiplication section 3123 as the fourth image data signal via the FIFO memory 3130 (STEP 3907-1 to STEP 3907-2).

5. Conclusion

As described above, in Example 4, the motion compensation differential image data block first written from the image data input circuit 3126 is directly written to the FIFO memory 3130 instead of being stored in the first image memory 3121. Thus, the operation for reading out the motion compensation differential image data block from the first image memory 3121 as the second image data signal 3120e can be omitted. As a result, the number of times the first image memory 3121 is accessed is reduced so as to increase the speed of the processing procedure. This effect is conspicuous when the image data block compressed by using any one of forward prediction image and backward prediction image in the motion compensation prediction is expanded. More specifically, the number of times the first image memory 3121 is accessed which are required to decompress the image data block compressed by using one prediction image is four in total, that is, twice for read and twice for write. On the other hand, in the case where the FIFO memory 3130 is used, the number of times the first image memory 3121 is accessed which are required to decompress the image data block compressed by using one prediction image is two in total, that is, once for read and once for write. In this way, by providing the FIFO memory 3130, the number of times to the first image memory 3121 is accessed can be halved.

The image generating apparatus 3114' described above includes the second multiplication section 3124 so as to enable an anti-aliasing processing procedure of the semi-transparent texture image and the polygon edge and an expansion processing procedure using a plurality of prediction images.

In the texture mapping processing procedure, however, in the case where the texture image is always opaque (that is, a semi-transparency is always 1), the second multiplication section 3124 may be omitted. In this case, the multiplier generator 3128 outputs a multiplier "0" to the first multiplication section 3123. As a result, the generated image data signal output from the addition section 3125 contains no background image component but texture image components.

In the expansion processing procedure, in the case where the image block is compressed by using any one of the forward prediction image data and the backward prediction image data and a value of the motion vector is specified by a unit of pixel, the second multiplication section 3124 may be omitted. In this case, the multiplier generator 3128 outputs a multiplier "1" to the first multiplication section 3123. As a result, the generated image data signal output from the addition section 3125 contains the result obtained by adding data of one prediction image and motion compensation differential image data.

In this way, even the image generating apparatus lacking the second multiplication section 3124 can realize both texture mapping processing procedure and moving picture expansion processing procedure under specific conditions. The realizable processing procedure may be basic processing.

EXAMPLE 5

Hereinafter, an image generating apparatus 4110 according to the present invention will be described.

The image generating apparatus 4110 includes the pixel calculation circuit 4120 and the image memory 4130. The image generating apparatus 4110 realizes a texture mapping processing procedure and a motion compensation procedure with a single configuration.

Figure 42:
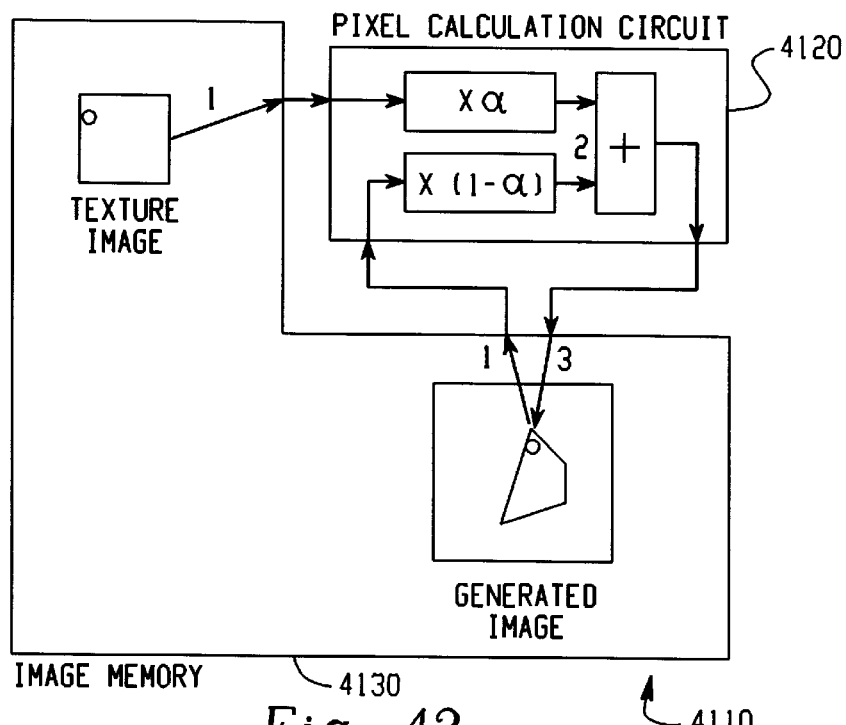
FIG. 42 is a diagram for illustrating a procedure of a texture mapping processing procedure in the image generating apparatus 4110.

The texture mapping processing procedure in the image generating apparatus 4110 will be described with reference to FIG. 42. In FIG. 42, arrows 1 to 3 in FIG. 42 correspond the processing procedure described below.

0: Write a texture image to the image memory 4130. Set a generated image region in the image memory 4130.
1: Read out pixel data from the texture image. Read out pixel data on coordinates of the polygon to be texture mapped in the generated image.
2: Multiply the texture image data and the polygon image data by multiplier coefficients, and add the results of the multiplications.
3: Write the pixel data obtained by the addition to the coordinates to be texture mapped in the generated image.
4: Steps 1 to 3 are repeated until processing for all of the pixels in the polygon to be texture mapped is completed.

Figure 43:
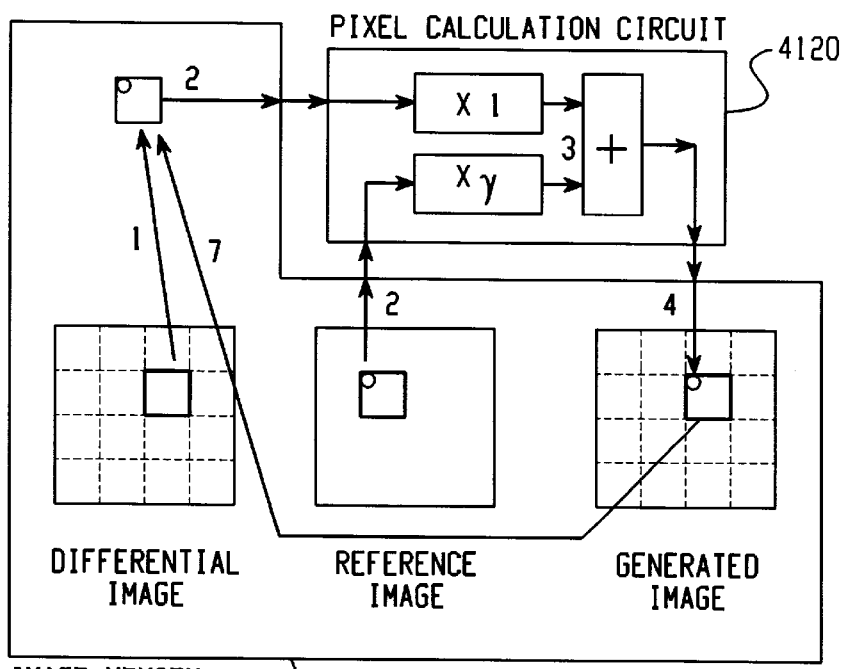
FIG. 43 is a diagram for illustrating a motion compensation processing procedure in the image generating apparatus 4110.

Hereinafter, the motion compensation processing procedure in the image generating apparatus 4110 will be described with reference to FIG. 43. Arrows 1 to 4 and 7 in FIG. 43 correspond to the processing procedure described below.

0: Write a differential image to the image memory 4130. Write a reference image to the image memory 4130. Set a generated image region to the image memory 4130.
1: Select an image block to be subjected to motion compensation from the differential image (In FIG. 43, the image block is copied. Instead of copying the image block, the location of the image block may be specified). Set a reference image block in the reference image. Set a generated image block in the generated image.
2: Read out the pixel data from the differential image block. Read out the pixel data from the reference image block.
3: Multiply the pixel data read out from the reference image block by a multiplier coefficient (The coefficient may differ depending on whether or not the motion compensation is bidirectionally performed and whether or not the position of the reference image block is specified with half-pixel precision). Add the result of the addition to the pixel data read out from the differential image block.
4: Write the pixel data obtained by the addition to the generated image block.
5: Repeat Steps 2 to 4 until processing is completed for all of the pixels in the image block.
6: Repeat processing for all of the image blocks in the generated image if motion compensation processing for the image block is completed.
7: Set a new reference image block in the case where the motion compensation processing procedure is bidirectionally performed or the position of the reference image block is specified with half-pixel precision. Select the generated image block as a differential image block (In FIG. 43, the image block is copied. Instead of copying the image block, the location of the image block may be specified).
8: Repeat Steps 2 to 7 in accordance with the bidirectional motion compensation processing procedure and the specified position of the reference image block with half-pixel precision.

Figure 44:
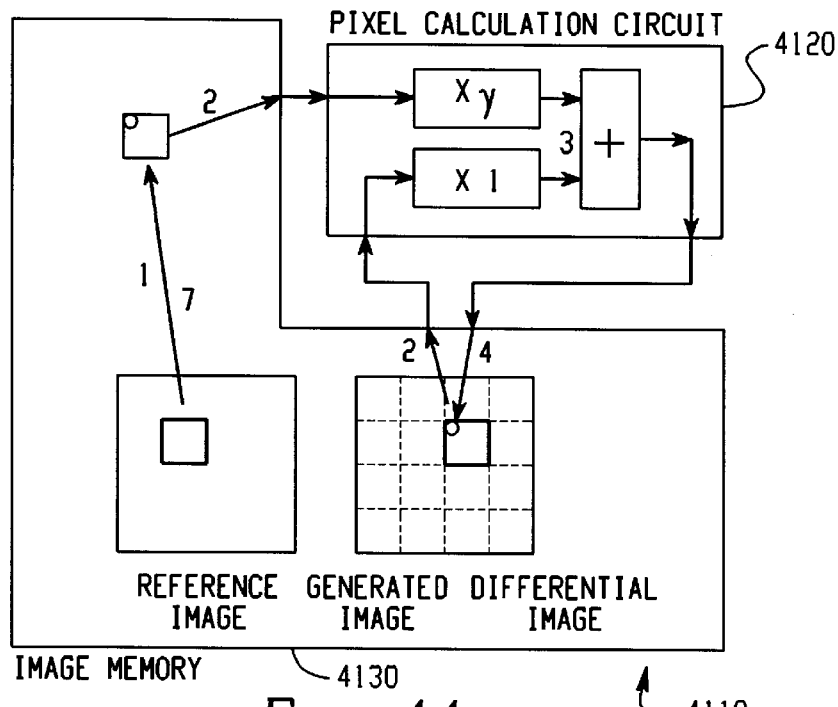
FIG. 44 is a diagram for illustrating another motion compensation processing procedure in the image generating apparatus 4110.

Next, another motion compensation processing procedure in the image generating apparatus 4110 will be described with reference to FIG. 44. Arrows 1 to 4 and 7 in FIG. 44 correspond to the processing procedure described below.

0: Write a differential image to the image memory 4130. Write a reference image to the image memory 4130. Determine a generated image region (the same region as the differential image) to the image memory 4130.
1: Select an image block to be subjected to motion compensation from the differential image (In FIG. 44, the image block is copied. Instead of copying the image block, the location of the image block may be specified). Set a differential image block in the differential image. Set the same image block as the differential image block as a generated image block.
2: Read out the pixel data from the differential image block. Read out the pixel data from the reference image block.
3: Multiply the pixel data read out form the reference image block by a multiplier coefficient (The coefficient may differ depending on whether or not the motion compensation is bidirectionally performed and whether or not the position of the reference image block is specified with half-pixel precision). Add the result of the multiplication to the pixel data read out from the differential image block.
4: Write the pixel data obtained by the addition to the same coordinates as differential pixel data reading coordinates in the generated image block.
5: Repeat Steps 2 to 4 until processing is completed for all of the pixels in the image block.
6: Repeat the processing procedure for all of the image blocks in the generated image when motion compensation for the image block is completed.
7: Set a new reference image block in the case where motion compensation processing procedure is bidirectionally performed or the position of the reference image block is specified with half-pixel precision (In FIG. 44, the image block is copied. Instead of copying the image block, the location of the image block may be specified). Set the generated image block as a differential image block.
8: Repeat Steps 2 to 7 in accordance with the bidirectional motion compensation processing procedure and the specified position of the reference image block with half-pixel precision.

Figure 45:
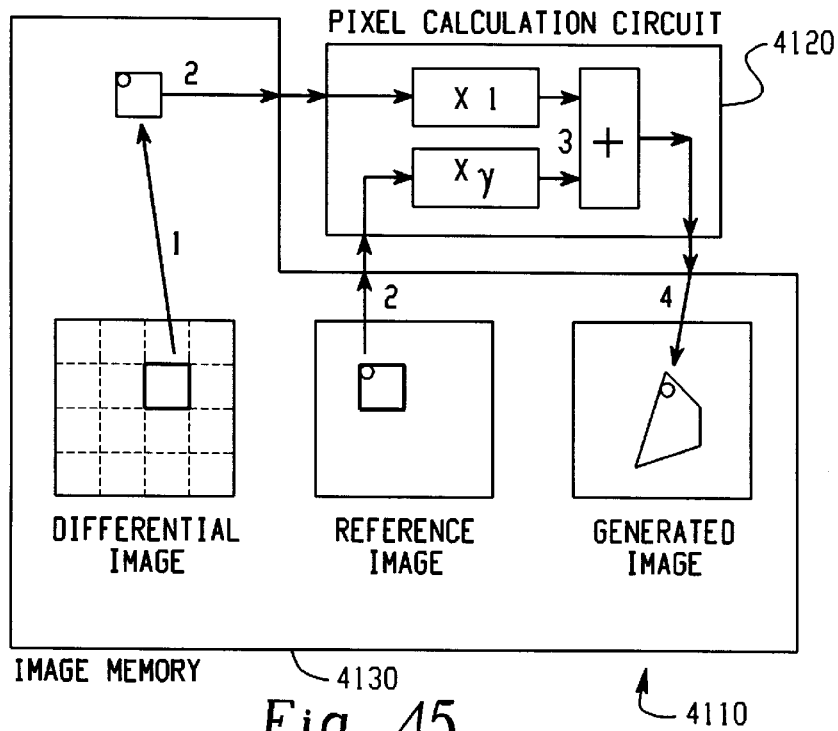
FIG. 45 illustrates a processing procedure in the case where a texture mapping processing procedure and a motion compensation processing procedure are simultaneously performed in the image generating apparatus 4110.

Hereinafter, a processing procedure in the case where texture mapping and motion compensation are simultaneously performed in the image generating apparatus 4110 will be described with reference to FIG. 45. Arrows 1 to 4 in FIG. 45 correspond to the processing procedure described below.

0: Write a differential image to the image memory 4130. Write a reference image to the image memory 4130. Set a generated image region in the image memory 4130.
1: Select an image block to be subjected to motion compensation from the differential image (In FIG. 45, the image block is copied. Instead of copying the image block, the location of the image block may be specified). Determine a reference image block in the reference image. Determine a polygon to be subjected to texture mapping in the generated image.
2: Read out the pixel data from the differential image block. Read out the pixel data from the reference image block.
3: Multiply the pixel data read out from the reference image block by a multiplier coefficient (The coefficient may differ depending on whether or not the motion compensation is bidirectionally performed and whether or not the position of the reference image block is specified with half-pixel precision). Add the result of the multiplication to the pixel data read out from the differential image block.

4: Write the pixel data obtained by the addition to the generated polygon.

5: Repeat Steps 2 to 4 until processing is completed for all of the pixels in the generated polygon.

6: Repeat the processing procedure for all of the image blocks in the generated image when processing for the generated polygon is completed.

The image generating apparatus according to the present invention can realize the motion compensation processing procedure, that is, forward or backward motion compensation processing procedure, bidirectional motion compensation processing procedure and motion compensation processing procedure with half-pixel precision, and the texture mapping processing procedure in a single device.

Furthermore, it is possible to simultaneously perform the motion compensation processing procedure and the texture mapping processing procedure in parallel in a single device.

By storing the intermediate result of the motion compensation processing procedure into the block image memory, it is possible to remarkably reduce the number of times the memory is accessed, which is required for motion compensation processing procedure.

Furthermore, by integrating the block image memory and the pixel calculation means on an LSI, it is possible to greatly increase the speed of memory access required for motion compensation and texture mapping.

As described above, the image generating apparatus enabling a compressed moving picture expansion processing procedure by motion compensation and a texture mapping procedure and the simultaneous implementation of these processing procedures is realized in a single device. As a result, it is possible to simplify the configurations of a moving picture expansion mapping device and a multimedia apparatus using the image generating apparatus, reduce the circuit area, reduce the amount of memory required for processing procedure, and reduce the amount of data to be transferred by omitting the moving picture data transfer between the memories.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image generating apparatus comprising a pixel calculation circuit for performing a calculation by using two sets of image data,
   wherein the pixel calculation circuit performs a calculation for a motion compensation processing procedure by using pixel data of a reference image and pixel data of a differential image in the case where the motion compensation processing procedure is performed, and performs a calculation for a texture mapping processing procedure by using pixel data of a mapping image and pixel data in a polygon in the case where the texture mapping processing procedure is performed.

2. An image generating apparatus comprising:
   a pixel position specifying circuit for receiving a command signal indicating at least one of a motion compensation processing procedure and a texture mapping processing procedure and for outputting a signal indicating a first pixel position, a signal indicating a second pixel position and a signal indicating a third pixel position, in accordance with the command signal,
   the first pixel position being a position of a pixel in a reference image block, the second pixel position being a position of a pixel in a generated image block, and the third pixel position being a position of a pixel in a differential image block when the command signal indicates the motion compensation processing procedure,
   the first pixel position and the second pixel position being positions of pixels in a polygon which is subjected to mapping, and the third pixel position being a position of a pixel in a texture image when the command signal indicates the texture mapping procedure;
   an image memory access section for outputting a pixel value of the first pixel position as first pixel data in response to a signal indicating the first pixel position; for outputting a pixel value of the third pixel position as third pixel data in response to a signal indicating the third pixel position, and for writing the second pixel data to the second pixel position in response to a signal indicating the second pixel position and second pixel data; and
   a pixel calculation circuit for performing a calculation between the first pixel data and the third pixel data to output a result of the calculation as the second pixel data.

3. An image generating apparatus according to claim 2, wherein when the command signal indicates the motion compensation processing procedure, the second pixel position is the same as the third pixel position.

4. An image generating apparatus according to claim 2, wherein when the command signal indicates the motion compensation processing procedure, the second pixel position is different from the third pixel position.

5. An image generating apparatus according to claim 2, wherein the pixel position specifying circuit outputs a position of a pixel in the reference image block as the first pixel position, a position of a pixel in a generated polygon to be texture mapped as the second pixel position, and a position of a pixel in the differential image block as the third pixel position when the command signal indicates simultaneous implementation of the motion compensation processing procedure and the texture mapping processing procedure.

6. An image generating apparatus according to claim 2, wherein, in response to the command signal, the pixel calculation circuit calculates the first pixel data and the third pixel data as data with precision with code in the case where the command signal indicates the motion compensation processing procedure or the simultaneous implementation of the motion compensation processing procedure and the texture mapping processing procedure, and calculates the first pixel data and the third pixel data as data with precision without code in the case where the command signal indicates the texture mapping processing procedure.

7. An image generating apparatus according to claim 2, wherein, in response to the command signal, the pixel position specifying circuit specifies pixel portions so that a relative position of the first pixel position in the reference image block, a relative position of the third pixel position in the differential image block and a relative position of the second pixel position in the generated image block are the same in the case where the command signal indicates the motion compensation processing procedure.

8. An image generating apparatus according to claim 7, wherein, in response to the command signal, the pixel position specifying circuit sequentially calculates a pixel position of each pixel on a horizontal line in the generated polygon, specifies the pixel positions as the first pixel position and the second pixel position, calculates a pixel position in the texture image corresponding to the first pixel position and the second pixel position, and specifies the calculated pixel position as the third pixel position in the case where the command signal indicates the texture mapping processing procedure, and wherein, in response to the command signal, the pixel position specifying circuit sequentially calculates a pixel position of each pixel on a horizontal line in the generated image block, specifies the pixel position as the second pixel position, and specifies the third pixel position and the first pixel position so that a relative position of the third pixel position in the differential image block and a relative position of the first pixel position in the reference image block are the same as a relative position of the second pixel position in the generated image block in the case where the command signal indicates the motion compensation processing procedure.

9. An image generating apparatus according to claim 7, wherein, in response to the command signal, the pixel position specifying circuit sequentially calculates a pixel position of each pixel on a horizontal line in the texture image, specifies the pixel position as the third pixel position, calculates a pixel position in the generated polygon corresponding to the third pixel position, and specifies the pixel position as the first pixel position and the second pixel position in the case where the command signal indicates the texture mapping processing procedure, and wherein, in response to the command signal, the pixel position specifying circuit sequentially calculates a pixel position of each pixel on a horizontal line in the differential image block, specifies the pixel position as the third pixel position, and specifies the first pixel position and the second pixel position so that a relative position of the first pixel position in the reference image block and a relative position of the second pixel position in the generated image block are the same as a relative position of the third pixel position in the differential image block in the case where the command signal indicates the motion compensation processing procedure.

10. An image generating apparatus according to claim 5, wherein, in response to the command signal, the pixel position specifying circuit sequentially calculates a pixel position of each pixel on a horizontal line in the generated polygon, specifies the pixel position as the second pixel position, obtains a pixel position to be mapped to pixel data at the second pixel position in the differential image block, specifies the obtained pixel position as the third pixel position, and specifies the first pixel position so that a relative position of the third pixel position in the differential image block and a relative position of the first pixel position in the reference image block are the same in the case where the command signal indicates simultaneous implementation of the motion compensation processing procedure and the texture mapping processing procedure.

11. An image generating apparatus according to claim 5, wherein, in response to the command signal, the pixel position specifying circuit sequentially calculates a pixel position of each pixel on a horizontal line in the differential image block, specifies the pixel position as the third pixel position, obtains a pixel position in the generated polygon which corresponds to the third pixel position, specifies the obtained pixel position as the second pixel position, and specifies the first pixel position so that a relative position of the third pixel position in the differential image block and a relative position of the first pixel position in the reference image block are the same in the case where the command signal indicates simultaneous implementation of the motion compensation processing procedure and the texture mapping processing procedure.

12. An image generating apparatus according to claim 2, wherein, in response to the command signal, the pixel calculation circuit reads out the first pixel position data from the first pixel position in the reference image block, reads out the third pixel data from the third pixel position in the differential image block, and performs a calculation by using the first pixel data and the third pixel data, performing a block motion compensation processing procedure, which writes the second pixel data serving as the result of the calculation to the second pixel position indicating the pixel position in the generated image block, for all pixels in one image block, and then performing an image block determination processing procedure for specifying a pixel position by using the generated image block as a new differential image block and an image block which is shifted by one pixel from the reference image block as a new reference image block in the case where the command signal indicates the motion compensation processing procedure.

13. An image generating apparatus according to claim 12, wherein the pixel position specifying circuit performs a pixel block determination processing procedure for determining an image block shifted to the right by one pixel from the reference image block as the new reference image block.

14. An image generating apparatus according to claim 12, wherein the pixel position specifying circuit performs a pixel block determination processing procedure for determining an image block shifted downward by one pixel from the reference image block as the new reference image block.

15. An image generating apparatus according to claim 12, wherein the pixel position specifying circuit repeats twice or more the image block determination processing procedure for determining the generated image block as a new differential image block and an image block shifted by one pixel from the reference image block as a new reference image block, and wherein the reference image block is shifted in a different direction for each image block determination processing procedure in the twice or more of the image block determination processing procedure.

16. An image generating apparatus according to claim 15, wherein, in the case where the image block determination processing procedure is repeated twice or more, the pixel position specifying circuit uses any one of an image block shifted to the right by one pixel from the reference image block, an image block shifted downward by one pixel from the reference image block, and an image block shifted to the right and downward by one pixel from the reference image block as the new reference image block.

17. An image generating apparatus according to claim 2, wherein, after a block motion compensation processing procedure which is a motion compensation processing procedure for one image block is performed, the pixel position specifying circuit determines a generated image block generated by the block motion compensation processing procedure as a texture image and performs an image block determination processing procedure for determining a new generated polygon, wherein the image memory access section reads out the first pixel data from the first pixel position in the generated polygon and the third pixel data from the third pixel position in the texture image, and wherein the pixel calculation circuit performs a calculation by using the first pixel data and the third pixel data, writes the second image data obtained by the calculation to the second pixel position in the generated polygon, and sequentially performs the calculation and the write for pixel data in the generated polygon.

18. An image generating apparatus comprising:

a control circuit for outputting a command signal indicating a process to be performed in the image generating apparatus;

a pixel position specifying circuit, in response to the command signal, for calculating a pixel position in a reference image block for motion compensation to output the pixel position as a first pixel position signal, calculating a pixel position in a generated image block to output the pixel position as a second pixel position signal, and calculating a pixel position in a differential image block which is difference data between the reference image block and the generated image block to output the pixel position as a third pixel position signal in the case where the command signal indicates a motion compensation processing procedure, the pixel position specifying circuit, in response to the command signal, for calculating a pixel position in a texture image to output the pixel position as the third pixel position signal, and calculating a pixel position in a generated polygon to which pixel data at the pixel position indicated by the third pixel position is mapped and written so as to output the pixel position as the first pixel position signal and the second pixel position signal in the case where the command signal indicates a texture mapping processing procedure, the pixel position specifying circuit, in response to the command signal, for newly determining positions of the differential image block, the generated image block and the differential image block or positions of the generated polygon and the texture image in the case where the command signal indicates an image block determination processing procedure and an image block position;

an image memory access section, in response to the first pixel position signal, the second pixel position signal and the third pixel position signal, for reading out pixel data from the pixel position indicated by the first pixel position signal to output the pixel data as a first pixel data signal, for reading out pixel data from the pixel position indicated by the third pixel position signal to output the pixel data as a third pixel data signal, and for writing pixel data input by a second pixel data signal to the pixel position indicated by the second pixel position signal; and a pixel calculation circuit, with respect to the pixel data indicated by the input first pixel data signal and the input third pixel data signal, for performing a calculation indicated by the command signal for the pixel data as data with code by a unit of a pixel in the case where the command signal indicates a motion compensation processing procedure, and for performing a calculation indicated by the command signal for the pixel data as data without code by a unit of a pixel in the case where the command signal indicates a texture mapping processing procedure, and for outputting a result of the calculation as the second pixel data signal, wherein the control circuit receives and interprets a control command for image generation operation to indicate contents of processing procedure to the pixel position specifying circuit and the pixel calculation circuit.

19. An image generating apparatus according to claim 18, wherein the image memory access section includes: a first image memory access section for receiving the first pixel position signal and the second pixel position signal, for reading out pixel data from the pixel position indicated by the first pixel position signal to output the pixel position as the first pixel data signal, and for writing pixel data input by the second pixel data signal to the pixel position indicated by the second pixel position signal; and a second image memory access section for receiving the third pixel position signal, reading out pixel data from the pixel position indicated by the third pixel position signal to output the pixel data as the third pixel data signal, and the image generating apparatus includes a block image memory for storing a texture image or a differential image block and outputting pixel data from the pixel position specified by the second image memory access section.

20. An image generating apparatus according to claim 18, wherein the image memory access section includes: a first image memory access section for receiving the first pixel position signal, the second pixel position signal and a fourth pixel position signal, for reading pixel data from the pixel position indicated by the first pixel position signal to output the pixel data as the first pixel data signal, for reading out pixel data from the pixel position indicated by the fourth pixel position signal to output the pixel data as a fourth pixel data signal, and for writing pixel data input by the second pixel data signal to the pixel position indicated by the second pixel position signal; and a second image memory access section for receiving the third pixel position signal and a fifth pixel position signal, for reading out pixel data from the pixel position indicated by the third pixel position signal to output the pixel data as the third pixel data signal and for writing pixel data input by the fifth pixel data signal to a pixel position indicated by the fifth pixel position signal, wherein the image generating apparatus includes: a block image memory for storing a texture image or a differential image block and for inputting and outputting pixel data from the pixel position specified by the second image memory access section; and an image transfer circuit for receiving the command signal, for sequentially outputting a pixel reading position in the differential image block or the texture image as the fourth pixel position signal, for sequentially outputting a pixel writing position in the block image memory as the fifth pixel position signal, and for outputting pixel data input as the fourth pixel data signal as the fifth pixel data signal so as to transfer the differential image block or the texture image block to the block image memory in the case where the command signal indicates an image block determination processing procedure and an image block position.

21. An image generating apparatus according to claim 18, wherein the image memory access section includes: a first image memory access section for receiving the first pixel position signal and the second pixel position signal, for reading out pixel data from the pixel position indicated by the first pixel position signal to output the pixel data as the first pixel data signal, and for writing pixel data input by the second pixel data signal to the pixel position indicated by the second pixel position signal; and a second image memory access section for receiving the third pixel position signal, for reading out pixel data from the pixel position indicated by the third pixel position signal to output the pixel data as the third pixel data signal, for receiving the second pixel position signal and for writing pixel data input by the second pixel data signal to the block image memory in the case where the second pixel position signal indicates a pixel position in the block image memory, wherein the image generating apparatus includes the block image memory for storing a texture image or a differential image block and for inputting and outputting pixel data from the pixel position specified by the second image memory access section.

22. An image generating apparatus according to claim 18, wherein the pixel position specifying circuit obtains a pixel position in a reference image block for motion compensation to output the pixel position as the first pixel position signal, obtains a pixel position in a generated polygon to output the pixel position as the second pixel position signal, and obtains a pixel position in a differential image block as the third pixel position signal in the case where the control circuit indicates simultaneous implementation of the motion compensation processing procedure and the texture mapping processing procedure.

23. An image generating apparatus according to claim 18, wherein the pixel calculation circuit includes a multiplier generating section for generating a multiplier in accordance with a calculation indicated by the control circuit, a multiplication section for multiplying pixel data input by the first pixel data signal by the multiplier generated in the multiplier generating section, an addition section for adding pixel data input by the third pixel data signal to a result of the calculation in the multiplication section to output a result of the addition as the second pixel data signal.

24. An image generating apparatus according to claim 18, wherein the pixel calculation circuit includes a multiplier generating section for generating a first multiplier and a second multiplier in accordance with a calculation indicated by the control circuit, a first multiplication section for multiplying pixel data input by the first multiplier generated in the multiplier generating section, a second multiplication section for multiplying pixel data input by the third pixel data signal by the second multiplier generated in the multiplier generating section, and an addition section for adding a result of the calculation in the first multiplication section to a result of the calculation in the second multiplication section to output a result of the addition as the second pixel data signal.

25. An image generating apparatus according to claim 23, wherein the multiplication section or the first multiplication section multiplies the pixel data by 1, ½, ¼ and ⅛.

26. An image generating apparatus according to claim 19, wherein the number of pixels of image data capable of being stored in the block image memory is the same as that of a reference image block, a generated image block and a differential image block.

27. An image generating apparatus according to claim 19, wherein image data capable of being stored in the block image memory is rectangular image data of 16×16 pixels in size.

28. An image generating apparatus according to claim 19, wherein the block image memory is realized on the semiconductor element on which at least the pixel calculation circuit is placed.

29. A moving picture expansion mapping apparatus comprising:

a variable-length inverse coding section for performing a variable-length inverse coding processing procedure for a compressed image block obtained by orthogonally transforming and variable-length coding a differential image block obtained by a difference with a reference image block by motion prediction;

an orthogonal transform section for receiving and orthogonally transforming a result of the variable-length inverse coding processing procedure; and an image generating apparatus according to claim 1 for receiving a result of the orthogonal transform section, performing a motion compensation processing procedure, and performing a texture mapping processing procedure by using image data obtained by the motion compensation processing procedure, thereby simultaneously implementing an expansion processing procedure and a texture mapping processing procedure for compressed moving picture data.

30. A multimedia apparatus comprising:

a CPU;

a main memory;

a moving picture expansion mapping apparatus according to claim 29; and a frame memory, wherein the frame memory is connected to the moving picture expansion mapping device, stores at least a reference image and a generated image, and expands compressed moving picture data while texture mapping an image obtained by expansion to a surface of a three-dimensional object.

* * * * *